US012636751B2

(12) United States Patent  
Evans et al.

(10) Patent No.: US 12,636,751 B2  
(45) Date of Patent: May 26, 2026

(54) GRINDER WITH LOSS OF CONTROL DETECTION

(71) Applicant: MILWAUKEE ELECTRIC TOOL CORPORATION, Brookfield, WI (US)

(72) Inventors: Zachary Evans, Waukesha, WI (US); Alex P. Grotelueschen, Watertown, WI (US); Karly M. Schober, Milwaukee, WI (US); Jacob C. Strachan, New Berlin, WI (US); Alexander C. Ghouse, Ixonia, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 190 days.

(21) Appl. No.: 18/637,694

(22) Filed: Apr. 17, 2024

(65) Prior Publication Data

US 2024/0359289 A1 Oct. 31, 2024

Related U.S. Application Data

(60) Provisional application No. 63/562,859, filed on Mar. 8, 2024, provisional application No. 63/498,935, filed on Apr. 28, 2023.

(51) Int. Cl.  
*H02P 29/02* (2016.01)  
*B24B 23/02* (2006.01)  
(Continued)

(52) U.S. Cl.  
CPC ............ *B24B 49/006* (2013.01); *B24B 23/02* (2013.01); *B24B 55/00* (2013.01); *H02P 29/024* (2013.01)

(58) Field of Classification Search  
CPC ....... B24B 55/00; B24B 23/02; B24B 49/006; H02P 29/024

(Continued)

(56) References Cited

U.S. PATENT DOCUMENTS 6,626,735 B2 9/2003 Ammi  
9,314,900 B2 4/2016 Vanko et al.  
(Continued)

FOREIGN PATENT DOCUMENTS

CN 200942512 Y 9/2007  
DE 102011007403 A1 10/2012  
(Continued)

OTHER PUBLICATIONS

Chinese Patent Office Action for Application No. 202420908250.4 dated Dec. 24, 2024 (6 pages including English translation).

(Continued)

*Primary Examiner* — Gabriel Agared  
(74) *Attorney, Agent, or Firm* — Michael Best & Friedrich LLP

(57) ABSTRACT

A power tool includes a housing, a motor positioned within the housing, an output shaft driven by the motor, the output shaft configured to be coupled to an accessory for operation thereof, a sensing circuit configured to detect, during operation of the power tool, an operating characteristic of the motor, and a controller. The controller is configured to receive a signal from the sensing circuit representing the operating characteristic of the motor, compare the operating characteristic of the motor to a first predetermined threshold, and in response to the operating characteristic exceeding the predetermined threshold, perform a loss of control check on the power tool. Performing the loss of control check includes comparing a detected motion of the power tool to a second predetermined threshold, and tripping loss of control functionality based on whether the detected motion of the power tool exceeds the second predetermined threshold.

19 Claims, 24 Drawing Sheets

(51) Int. Cl.
    *B24B 49/00*      (2012.01)
    *B24B 55/00*      (2006.01)
    *H02P 29/024*    (2016.01)

(58) Field of Classification Search
    USPC ................................................... 318/400.22
    See application file for complete search history.

(56)            References Cited

U.S. PATENT DOCUMENTS

| | | | |
|---|---|---|---|
| 9,406,915 | B2 | 8/2016 | White et al. |
| 9,452,520 | B2 | 9/2016 | Sawano et al. |
| 9,464,893 | B2 | 10/2016 | Vanko et al. |
| 9,583,745 | B2 | 2/2017 | White et al. |
| 9,583,793 | B2 | 2/2017 | White et al. |
| 9,762,153 | B2 | 9/2017 | Forster et al. |
| 9,769,984 | B2 | 9/2017 | Osawa et al. |
| 9,769,985 | B2 | 9/2017 | Nakadate et al. |
| 9,871,484 | B2 | 1/2018 | White et al. |
| 9,893,384 | B2 | 2/2018 | Velderman et al. |
| 9,962,807 | B2 | 5/2018 | Klee et al. |
| 9,998,893 | B2 | 6/2018 | Esenwein et al. |
| 10,050,572 | B2 | 8/2018 | Pant et al. |
| 10,056,582 | B2 | 8/2018 | White et al. |
| 10,177,701 | B2 | 1/2019 | White et al. |
| 10,193,111 | B2 | 1/2019 | Varipatis et al. |
| 10,236,819 | B2 | 3/2019 | White et al. |
| 10,243,491 | B2 | 3/2019 | Cox et al. |
| 10,250,178 | B2 | 4/2019 | White et al. |
| 10,291,173 | B2 | 5/2019 | Cox et al. |
| 10,322,502 | B2* | 6/2019 | Wirnitzer .............. B25D 16/00 |
| 10,333,453 | B2 | 6/2019 | Forster et al. |
| 10,333,454 | B2 | 6/2019 | Forster et al. |
| 10,361,651 | B2 | 7/2019 | White et al. |
| 10,411,558 | B2 | 9/2019 | Forster et al. |
| 10,469,006 | B2 | 11/2019 | Pant et al. |
| 10,486,281 | B2 | 11/2019 | Selfors et al. |
| 10,523,087 | B2 | 12/2019 | Lewis et al. |
| 10,541,639 | B2 | 1/2020 | White et al. |
| 10,608,574 | B2 | 3/2020 | White et al. |
| 10,615,733 | B2 | 4/2020 | Cox et al. |
| 10,630,223 | B2 | 4/2020 | Yamaguchi et al. |
| 10,658,903 | B2 | 5/2020 | Forster et al. |
| 10,661,423 | B2 | 5/2020 | Schlegel et al. |
| 10,680,494 | B2 | 6/2020 | Lewis et al. |
| 10,840,559 | B2 | 11/2020 | Velderman et al. |
| 10,883,660 | B2* | 1/2021 | Nishimiya ................ F16P 3/00 |
| 10,965,229 | B2 | 3/2021 | Pant |
| 10,972,041 | B2 | 4/2021 | White et al. |
| 10,978,746 | B2 | 4/2021 | Velderman et al. |
| 2012/0279742 | A1 | 11/2012 | Roser |

| | | | |
|---|---|---|---|
| 2017/0008159 | A1 | 1/2017 | Boeck et al. |
| 2017/0126051 | A1 | 5/2017 | Cox et al. |
| 2017/0338753 | A1 | 11/2017 | Forster et al. |
| 2018/0090979 | A1 | 3/2018 | Forster et al. |
| 2018/0099399 | A1* | 4/2018 | Sunabe ..................... B25F 5/02 |
| 2018/0248507 | A1 | 8/2018 | Vanko et al. |
| 2018/0345433 | A1 | 12/2018 | Sudo et al. |
| 2019/0126456 | A1* | 5/2019 | Abbott ..................... B25F 5/00 |
| 2019/0341872 | A1 | 11/2019 | Cox et al. |
| 2019/0341873 | A1 | 11/2019 | Cox et al. |
| 2020/0036307 | A1 | 1/2020 | Pant |
| 2020/0078920 | A1 | 3/2020 | Ikeda |
| 2020/0091797 | A1 | 3/2020 | Lewis et al. |
| 2020/0133229 | A1 | 4/2020 | Girt et al. |
| 2020/0162011 | A1 | 5/2020 | Cox et al. |
| 2020/0180132 | A1 | 6/2020 | Schlegel et al. |
| 2020/0186006 | A1 | 6/2020 | Vanko et al. |
| 2020/0228046 | A1 | 7/2020 | White et al. |
| 2020/0235694 | A1 | 7/2020 | White et al. |
| 2020/0259395 | A1 | 8/2020 | Lewis et al. |
| 2020/0266752 | A1 | 8/2020 | White et al. |
| 2020/0335834 | A1 | 10/2020 | Velderman et al. |
| 2020/0382045 | A1 | 12/2020 | White et al. |
| 2020/0403553 | A1 | 12/2020 | White et al. |
| 2020/0412294 | A1 | 12/2020 | Cox |
| 2021/0121967 | A1 | 4/2021 | Vetter |
| 2021/0123737 | A1 | 4/2021 | Vetter |
| 2021/0127327 | A1 | 4/2021 | Vetter et al. |
| 2021/0299843 | A1* | 9/2021 | Abbott ................... B25D 16/00 |
| 2023/0356381 | A1* | 11/2023 | Widder .................... B25F 5/00 |

FOREIGN PATENT DOCUMENTS

| | | | |
|---|---|---|---|
| DE | 102012112832 | A1 | 6/2014 |
| DE | 102013211997 | A1 | 1/2015 |
| DE | 102015208252 | A1 | 11/2016 |
| DE | 102015221685 | A1 | 5/2017 |
| DE | 102018214811 | A1 | 3/2020 |
| WO | 2010067789 | A1 | 6/2010 |
| WO | 2013072201 | A2 | 5/2013 |
| WO | 2019057639 | A1 | 3/2019 |
| WO | 2019137818 | A1 | 7/2019 |
| WO | 2020260069 | A1 | 12/2020 |
| WO | 2020260079 | A1 | 12/2020 |
| WO | 2021043558 | A1 | 3/2021 |

OTHER PUBLICATIONS

Chinese Patent Office Action for Application No. 202420908250.4 dated Feb. 18, 2025 (4 pages including English translation).

* cited by examiner

Figure 21:
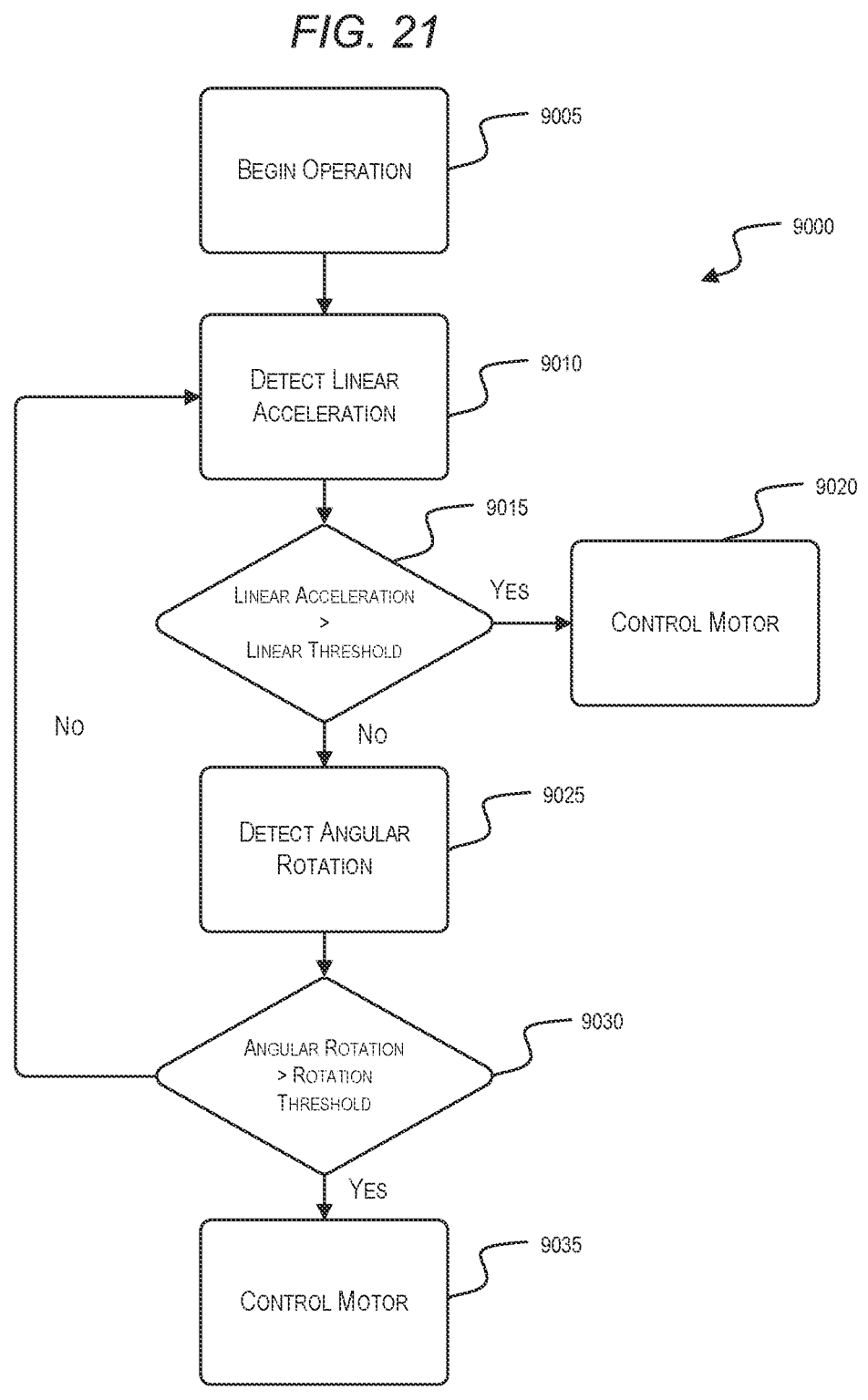

BEGIN OPERATION — 9005

DETECT LINEAR ACCELERATION — 9010

LINEAR ACCELERATION > LINEAR THRESHOLD — 9015

YES — CONTROL MOTOR — 9020

No

No

DETECT ANGULAR ROTATION — 9025

ANGULAR ROTATION > ROTATION THRESHOLD — 9030

YES

CONTROL MOTOR — 9035

9000

GRINDER WITH LOSS OF CONTROL DETECTION

CROSS-REFERENCE TO RELATED APPLICATIONS

This application claims priority to U.S. Provisional Patent Application No. 63/562,859, filed on Mar. 8, 2024, and U.S. Provisional Patent Application No. 63/498,935, filed on Apr. 28, 2023, the entire contents of which are incorporated by reference herein.

FIELD

Embodiments described herein provide battery pack powered power tools, including, for example, grinders.

SUMMARY

Embodiments described herein provide various systems and methods for operating a device, such as a grinder. In some embodiments, the grinder is configured for one-handed operation, wherein the grinder includes only a single grip (e.g., aligned with a body component of the grinder as described and illustrated herein) and does not include a handle extending radially from a body of the grinder. In other embodiments, the grinder is configured for two-handed operation, wherein the grinder includes two grips. During operation of such devices, a user may lose control of the device where the device moves in one or more unintended directions or planes. Modifying operation of the device, such as, for example, stopping a motor driving a grinding accessory (e.g., a grinding disc), may allow the user to regain control of the device without wasting battery power or damaging a working surface or environment. However, determining when loss of control occurs is difficult due to the grinder moving in multiple directions during normal operation. Therefore, a controller may incorrectly detect that a loss of control event has occurred.

In some aspects, the techniques described herein relate to a power tool including a housing, a battery pack interface configured to receive a rechargeable battery pack, a motor positioned within the housing and powered via the rechargeable battery pack, an output shaft driven by the motor, the output shaft configured to be coupled to an accessory for operation thereof, a sensing circuit configured to detect, during operation of the power tool, an operating characteristic of the motor, the operating characteristic being at least one of motor acceleration and battery current of the battery pack, and a controller configured to: receive a signal from the sensing circuit representing the operating characteristic of the motor, compare the operating characteristic of the motor to a first predetermined threshold, and in response to the operating characteristic exceeding the predetermined threshold, perform a loss of control check on the power tool, wherein performing the loss of control check includes: comparing a detected motion of the power tool to a second predetermined threshold, and tripping loss of control functionality based on whether the detected motion of the power tool exceeds the second predetermined threshold.

In some aspects, the techniques described herein relate to a power tool including a housing, a battery pack interface configured to receive a rechargeable battery pack, a motor positioned within the housing and powered via the rechargeable battery pack, an output shaft driven by the motor, the output shaft configured to be coupled to an accessory for operation thereof, a sensing circuit configured to detect, during operation of the power tool, a first rotational velocity of the power tool around a first axis, a second rotational velocity of the power tool around a second axis, and a third rotational velocity of the power tool around a third axis, and a controller configured to: receive one or more signals from the sensing circuit representing the first rotational velocity, the second rotational velocity, and the third rotational velocity, apply a first sensitivity value to the first rotational velocity, a second sensitivity value to the second rotational velocity, and a third sensitivity value to the third rotational velocity to obtain a first adjusted rotational velocity, a second adjusted rotational velocity, and a third adjusted rotational velocity, sum a square of the first adjusted rotational velocity, a square of the second adjusted rotational velocity, and a square of the third adjusted rotational velocity, compare the sum to a predetermined threshold, and trip loss of control functionality based on whether the sum exceeds the predetermined threshold.

In some aspects, the techniques described herein relate to a power tool including: a housing, a battery pack interface configured to receive a rechargeable battery pack, a motor positioned within the housing and powered via the rechargeable battery pack, an output shaft driven by the motor, the output shaft configured to be coupled to an accessory for operation thereof, a sensing circuit configured to detect, during operation of the power tool, linear acceleration of the power tool along an axis, and a controller configured to: (a) receive a signal from the sensing circuit representing the linear acceleration of the power tool along the axis, (b) compare the linear acceleration to a predetermined threshold, and (c) in response to the linear acceleration satisfying the predetermined threshold, stopping the motor.

Before any embodiments are explained in detail, it is to be understood that the embodiments are not limited in application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Unless explicitly described to the contrary, functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Similarly, one or more memory modules and communication channels or networks may be used even if embodiments described or illustrated herein have a single such device or element. Also, regardless of how they are combined or divided, hardware and software components may be located on the same computing device or may be distributed among multiple different devices. Accordingly, in the claims, if an apparatus, method, or system is claimed, for example, as including a controller, control unit, electronic processor, computing device, logic element, module, memory module, communication channel or network, or other element configured in a certain manner, for example, to perform multiple functions, the claim or claim element should be interpreted as meaning one or more of such elements where any one of the one or more elements is configured as claimed, for example, to make any one or more of the recited multiple functions, such that the one or more elements, as a set, perform the multiple functions collectively.

Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIG. 13B is a bottom view of the power tool of FIG. 1 according to some embodiments.

FIG. 15 illustrates a controller for the power tool of FIGS. 13A and 13B or 14 according to some embodiments.

FIG. 20 illustrates the power tool of FIG. 16, according to some embodiments.

FIG. 21 is a flowchart illustrating a method of controlling a power tool, according to some embodiments.

DETAILED DESCRIPTION

Figure 1:
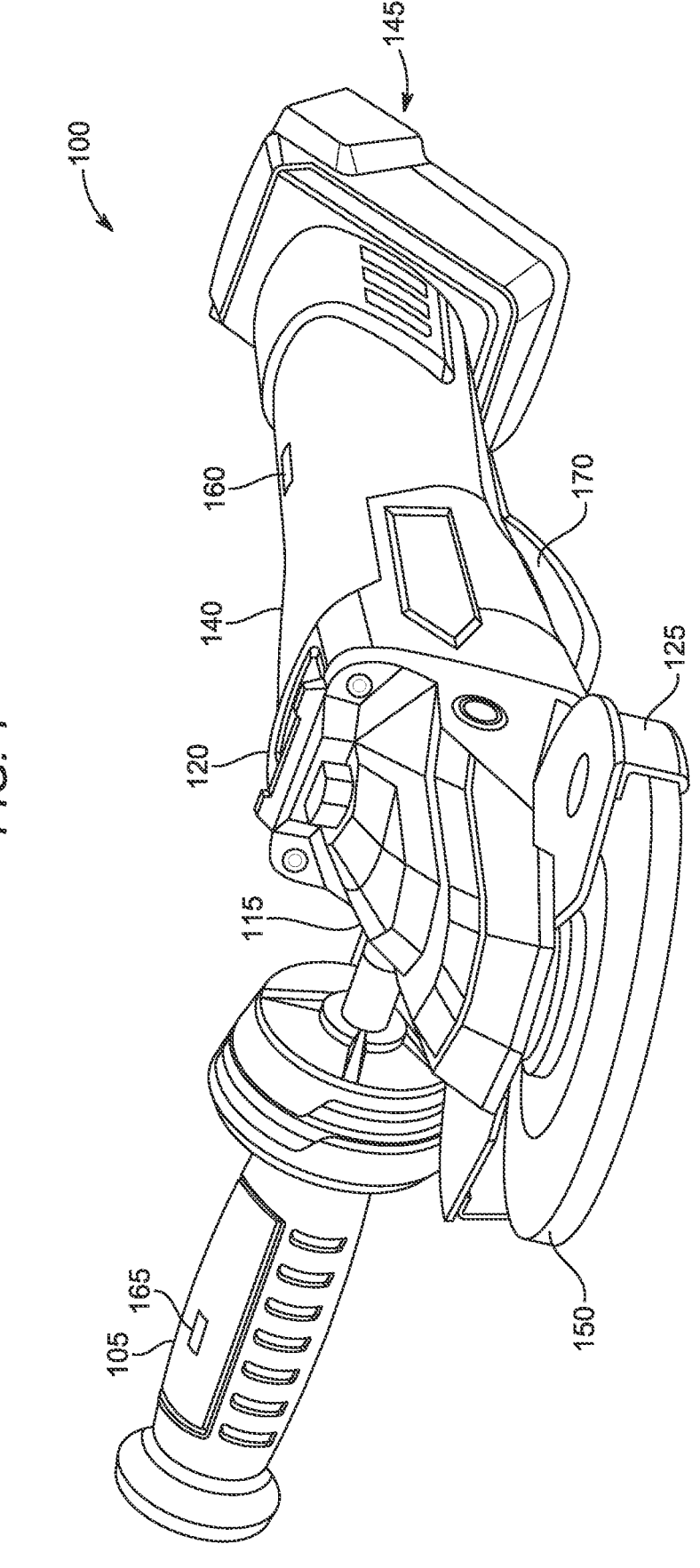
FIG. 1 is a perspective view of a power tool according to some embodiments.

FIG. 1 illustrates a power tool, such as a portable rotary power tool, that implements several different methods and systems to control the tool and a motor of the tool. In some embodiments, the portable power tool is a grinder 100. The grinder 100 may include a main tool housing 120, a first handle 140 that extends along the main tool housing 120, and a second handle 105 that extends transversely in an outward direction from the main tool housing 120 and may be connected to the main housing via a connection 115. A motor 210 (shown in FIG. 2) is located within the main tool housing 120. An output shaft 125, driven by the motor 210, is coupleable to a tool holder that may be configured to receive an accessory 150, such as a cutting tool, a grinding disc, a rotary burr, a sanding disc, etc. Various types of accessories may be interchangeably attached to the tool holder and may be designed with different characteristics to perform different types of operations. For example, the accessory 150 may be made of a material and have dimensions suitable for performing a specific type of task. The characteristics of an accessory may affect the performance of the grinder 100 or may impose constraints on operation of the tool. For example, different accessory types may be configured to work at different rotational speeds or applied torques depending on the characteristics of the accessory and the task to be performed. During operation of the grinder 100, the motor 210 and the output shaft 125 may be controlled to rotate at a wide range of speeds.

Due to the wide range of speeds, in some embodiments, the grinder 100 may include a guard 130 to protect a user or another object in the surrounding environment from the different accessory types that may be attached to the tool holder. In some embodiments, the guard 130 prevents a user from contacting the accessory 150. In some embodiments, the guard 130 provides protection against, for example, sparks.

In some embodiments, the first handle 140 may define a battery pack receptacle 145, which is positioned on an end of the first handle 140 opposite the main tool housing 120. The battery pack receptacle 145 is configured to selectively, mechanically, and electrically connect to a rechargeable battery pack (i.e., a power supply) for powering the motor 210. The battery pack is insertable into or attachable to the battery pack receptacle 145. The battery pack may include any of a number of different nominal voltages (e.g., 12V, 18V, 24V, 36V, 40V, 48V, etc.), and may be configured having any of a number of different chemistries (e.g., lithium-ion, nickel-cadmium, etc.). In some embodiments, the motor 210 may be powered by a remote power source (e.g., an AC electrical outlet) through a power cord and a power interface of the grinder 100. The first handle 140 further contains control electronics for the grinder 100.

The second handle 105 may allow a user to better control the operation of the grinder 100. In some embodiments, the first handle 140 and/or the second handle 105 include a variety of sensors to detect different operational characteristics and/or user characteristics (e.g., operator presence, grip pressure, etc.). For example, the first handle 140 includes a first sensor 160 for detecting the presence of a user's hand on the first handle 140, and the second handle 105 includes a second sensor 165 for detecting the presence of a user's second hand on the second handle 105. In some embodiments, the sensors 160, 165 are pressure sensors that detect the presence of a minimum grip pressure on the handles 140, 105. Various signals from the sensors located in the second handle 105 may be sent to the grinder 100's main control system and the operation of the motor 210 may be controlled based on the signals (e.g., enabling or disabling the motor 210, modifying a torque limit, etc.).

Figure 2:
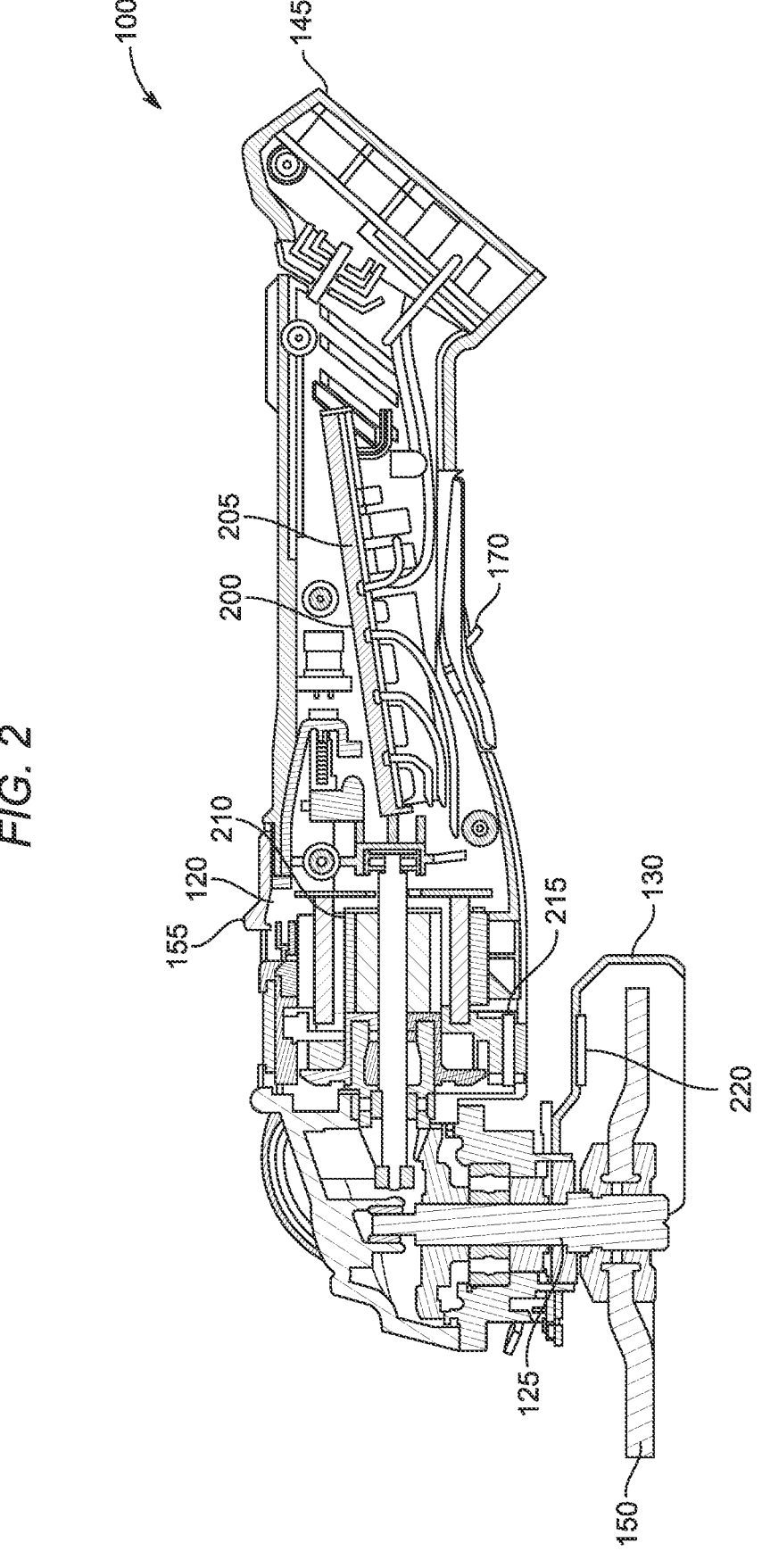
FIG. 2 is a side view of a power tool according to some embodiments.

FIG. 2 illustrates a side section view of the grinder 100. In some embodiments, a controller 200 (e.g., located on a printed circuit board) is located within the first handle 140. In some embodiments, various sensors 205 may also be located within the first handle 140. The output shaft 125 protrudes downwards, towards a potential workpiece. In some embodiments, the accessory 150 (e.g., a grinder blade) may be attached to the output shaft 125. Because an accessory 150, such as a grinder blade, is potentially hazardous to the user and the area surrounding the grinder, the guard 130 is also attached to the output shaft 125 and protrudes downward towards a workpiece and extends around the blade 150. This provides protection from the blade 150 and any potential debris that is produced during operation.

In some embodiments, the motor 210 is located between the output shaft 125 and the battery pack receptacle 145, and beneath a trigger 155 within the main tool housing 120. The trigger 155 is used to control the motor 210, which receives control signals from the controller 200 to control the output shaft 125 and other aspects of the grinder 100.

In some embodiments, the grinder 100 incudes a guard presence sensor 215 for detecting the presence of the guard 130. In some embodiments, the grinder 100 is prevented from operating (e.g., motor 210 is prevented from operating) when the guard presence sensor 215 does not detect the guard 130. The grinder 100 also includes a component type indicator 220. The component type indicator 220 is configured to provide an indication to the grinder 100 of the type of component (e.g., guard 130) that is connected to the grinder. For example, guards of different sizes may result in the grinder 100 operating differently. Although the component type indicator 220 is illustrated with respect to the guard 130, the component type indicator can additionally or alternatively be associated with another component of the grinder 100, such as the second handle 105, a dust hood, the accessory 150, etc.

The first handle 140 includes the switch or trigger 155 operable to electrically connect the power source (e.g., the battery pack) and the motor 210. In some embodiments, the trigger 155 may be a "lock-off" trigger having a paddle member and a lock-off member supported by the paddle member. The paddle member is operable to actuate a switch electrically connected to the controller 200. The switch is configured to control selective activation and deactivation of the motor 210 during operation of the grinder 100. The lock-off member is configured to selectively prevent operation of the paddle member (e.g., prevent activation of the switch). In some embodiments, the paddle member acts as the detection for a user's first hand on the first handle 140. In other embodiments, a user's hand is detected using other sensors (e.g., grip sensors, pressure sensors, touch sensors, electromechanical sensors, etc.). The first handle 140 further includes a second trigger 170 that turns on the grinder 100 in order to rotate the accessory 150.

Figure 3:
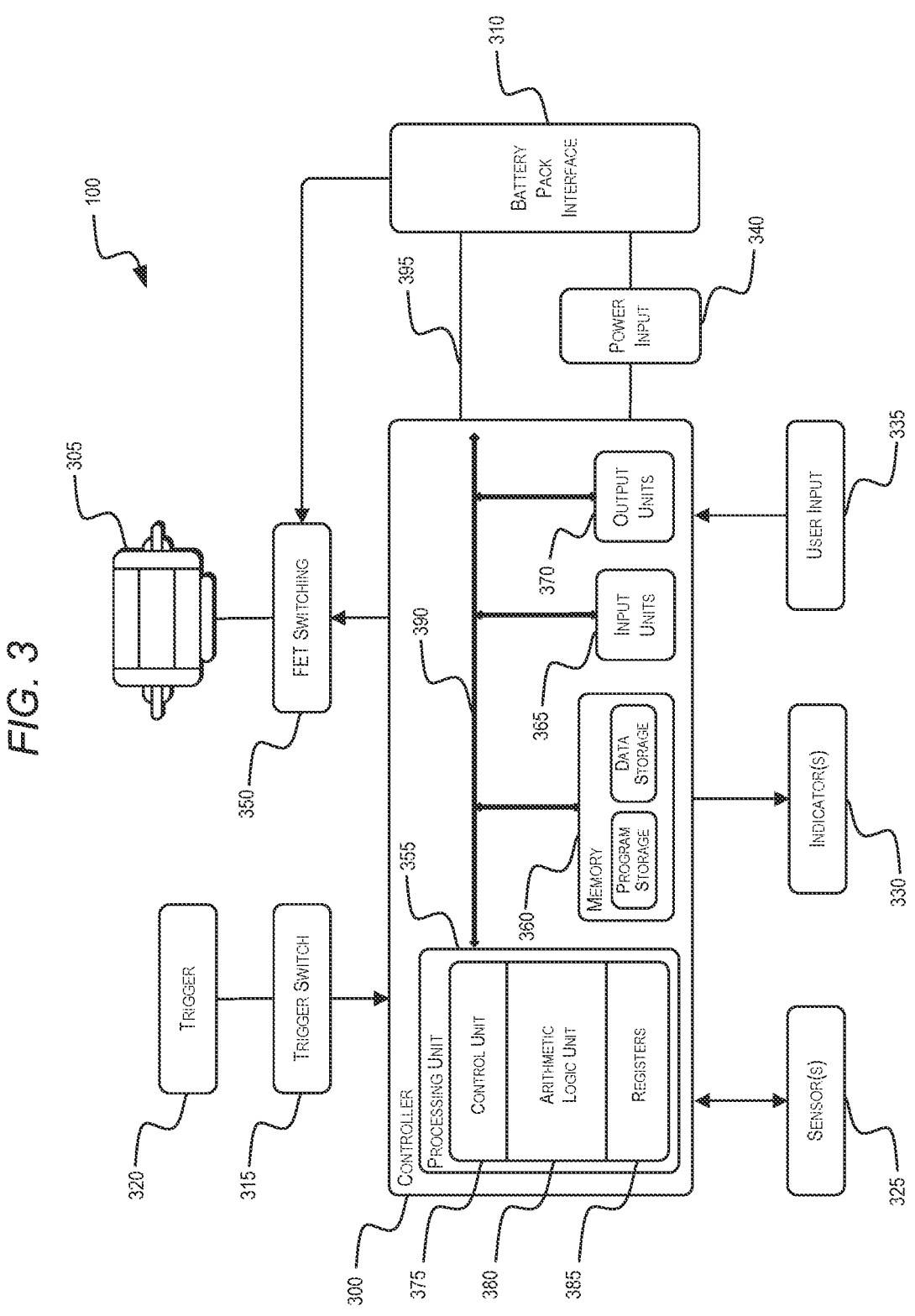
FIG. 3 illustrates a controller for the power tool of FIG. 1 according to some embodiments.

FIG. 3 illustrates a control system for the grinder 100. The control system includes a controller 300. The controller 300 is electrically and/or communicatively connected to a one or more modules or components of the grinder 100. For example, the illustrated controller 300 is electrically connected to a motor 305 (e.g., motor 210), a battery pack interface 310, a trigger switch 315 (connected to a trigger 320), one or more sensors or sensing circuits 325, one or more indicators 330, a user input module 335, a power input module 340, and a FET switching module 350 (e.g., including a plurality of switching FETs). The controller 300 includes combinations of hardware and software that are operable to, among other things, control the operation of the grinder 100, monitor the operation of the grinder 100, activate the one or more indicators 330 (e.g., an LED), etc.

The controller 300 includes a plurality of electrical and electronic components that provide power, operational control, and protection to the components and modules within the controller 300 and/or the grinder 100. For example, the controller 300 includes, among other things, a processing unit 355 (e.g., a microprocessor, a microcontroller, an electronic processor, an electronic controller, or another suitable programmable device), a memory 360, one or more input units 365, and one or more output units 370. The processing unit 355 includes, among other things, a control unit 375, an arithmetic logic unit ("ALU") 380, and a plurality of registers 385, and is implemented using a known computer architecture (e.g., a modified Harvard architecture, a von Neumann architecture, etc.). The processing unit 355, the memory 360, the input units 365, and the output units 370, as well as the various modules or circuits connected to the controller 300 are connected, such as, for example, by one or more control and/or data buses (e.g., common bus 390). The use of one or more control and/or data buses for the interconnection between and communication among the various modules, circuits, and components would be known to a person skilled in the art in view of the embodiments described herein.

The memory 360 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 355 is connected to the memory 360 and executes software instructions that are capable of being stored in a RAM of the memory 360 (e.g., during execution), a ROM of the memory 360 (e.g., on a generally permanent basis), or another non-transitory computer readable medium such as another memory or a disc. Software included in the implementation of the grinder 100 can be stored in the memory 360 of the controller 300. The software includes, for example, firmware, one or more applications, program data, filters, rules, one or more program modules, and other executable instructions. The controller 300 is configured to retrieve from the memory 360 and execute, among other things, instructions related to the control processes and methods described herein. In other constructions, the controller 300 includes additional, fewer, or different components.

The motor 305 includes a rotor and a stator that surrounds the rotor. In some embodiments, the motor 305 is a brushless direct current ("BLDC") motor in which the rotor is a permanent magnet rotor and the stator includes coil windings that are selectively energized to drive the rotor. In other embodiments, the motor 305 is a brushed motor. The stator is supported within the main tool housing 120 and remains stationary relative to the main tool housing 120 during operation of the grinder 100. The rotor is rotatably fixed to a rotor shaft and configured to rotate with the rotor shaft, relative to the stator, about a motor axis. A portion of the rotor shaft is associated with or corresponds to the output shaft 125 or 225 extending from the main tool housing 120. In some embodiments, the motor 305 is an outer rotor motor.

The battery pack interface 310 includes a combination of mechanical components (e.g., rails, grooves, latches, etc.) and electrical components (e.g., one or more terminals) configured to and operable for interfacing (e.g., mechanically, electrically, and communicatively connecting) the grinder 100 with a battery pack. For example, power provided by the battery pack to the grinder 100 is provided through the battery pack interface 310 to the power input module 340. The power input module 340 includes combinations of active and passive components to regulate or control the power received from the battery pack prior to power being provided to the controller 300. The battery pack interface 310 also supplies power to the FET switching module 350 to provide power to the motor 305. The battery pack interface 310 also includes, for example, a communication line 395 for provided a communication line or link between the controller 300 and the battery pack.

The indicators 330 include, for example, one or more light-emitting diodes ("LEDs"). The indicators 330 can be configured to display conditions of, or information associated with, the grinder 100. For example, the indicators 330 are configured to indicate measured electrical characteristics of the grinder 100, the status of the grinder 100, etc. The user input module 335 is operably coupled to the controller 300 to, for example, select a forward mode of operation or a reverse mode of operation, a torque and/or speed setting for the grinder 100 (e.g., using torque and/or speed switches), etc. In some embodiments, the user input module 335 includes a combination of digital and analog input or output devices required to achieve a desired level of operation for the grinder 100, such as one or more knobs, one or more dials, one or more switches, one or more buttons, etc.

The controller 300 is configured to determine whether a fault condition of the grinder 100 is present and generate one or more control signals related to the fault condition. The controller 300 may use input provided via the sensing circuits 325 to determine whether a fault condition is present. In some embodiments, the sensing circuits 325 includes one or more current sensors, one or more speed sensors, one or more Hall Effect sensors, one or more temperature sensors, an accelerometer, a gyroscope, an inertial measurement unit ["IMU"], one or more pressure sensors, one or more object presence sensors, etc., or a combination thereof. The IMU may determine accelerations and velocities of the grinder 100 in multiple axes. The controller 300 calculates or includes, within memory 360, predetermined operational threshold values and limits for operation of the grinder 100. In response to detecting one or more such fault conditions of the grinder 100 or detecting that a previously-detected fault condition of the grinder 100 no longer exists, the controller 300 may be configured to provide information and/or control signals to another component of the grinder 100 (e.g. the battery pack interface 310, the indicators 330, etc.).

Figure 4A:
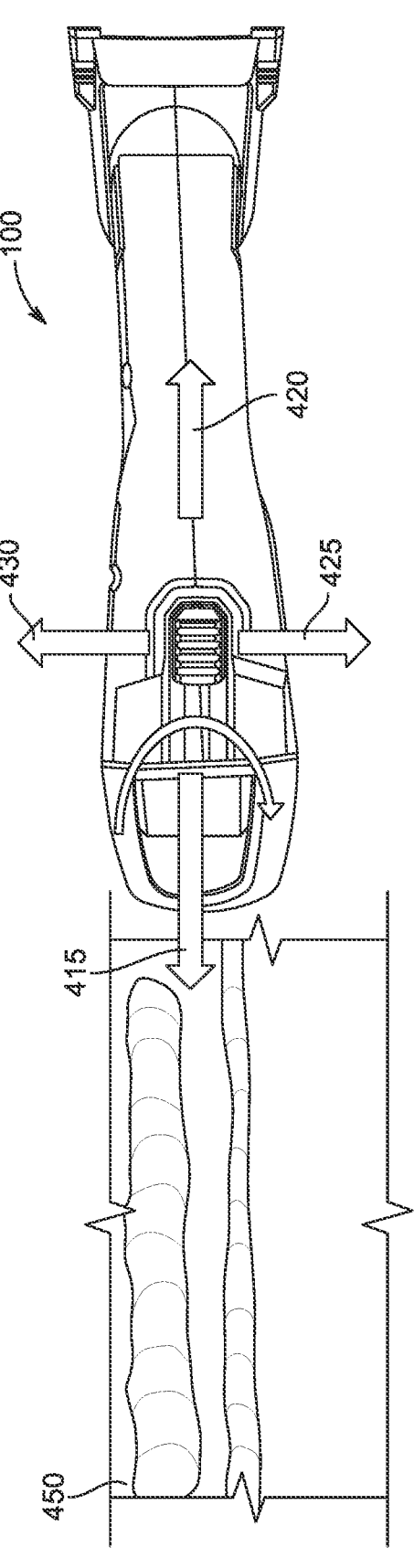
FIGS. 4A, 4B, and 5 illustrates various motions of the power tool of FIG. 1, according to some embodiments.
Figure 4B:
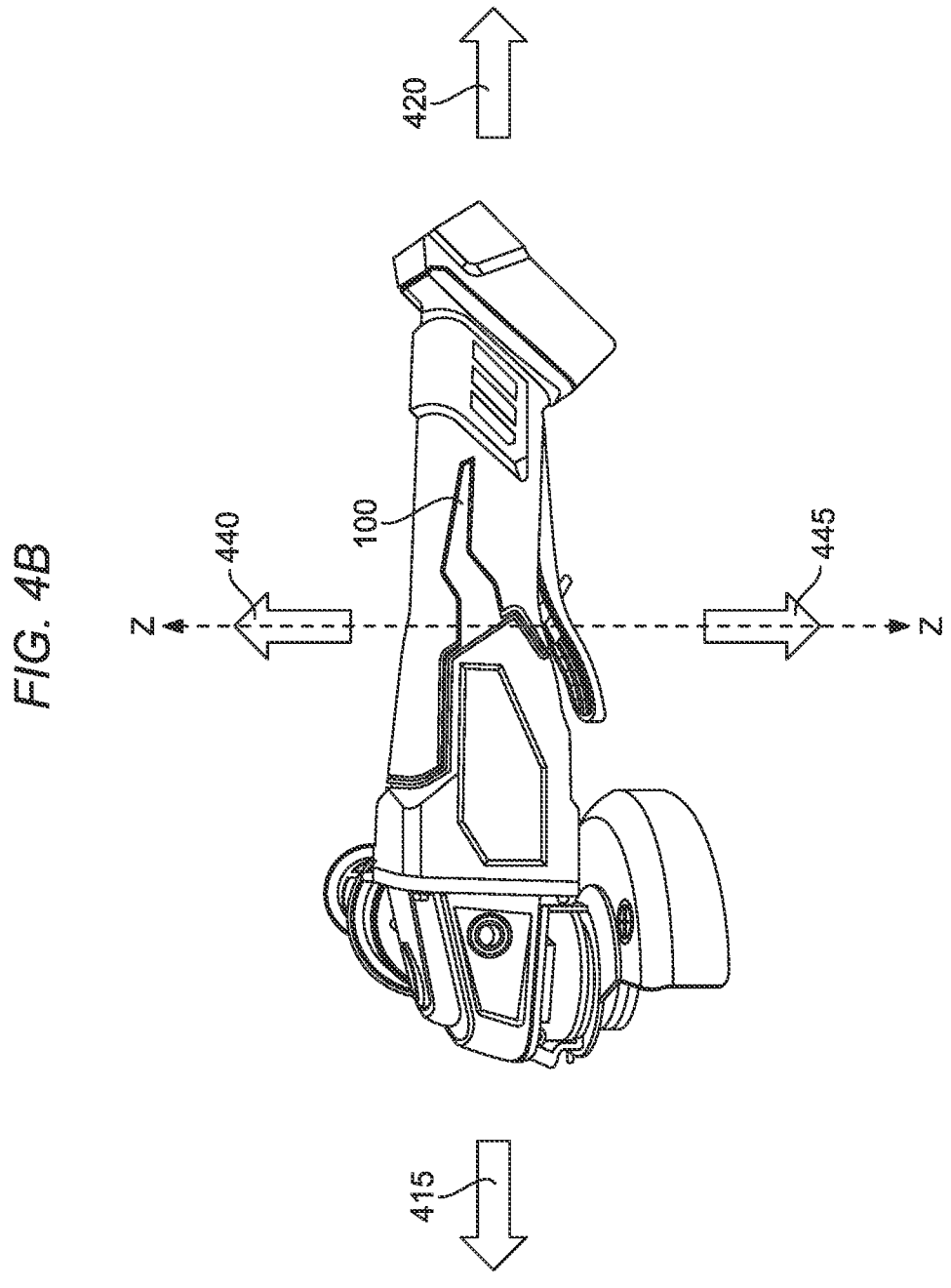
Figure 5:
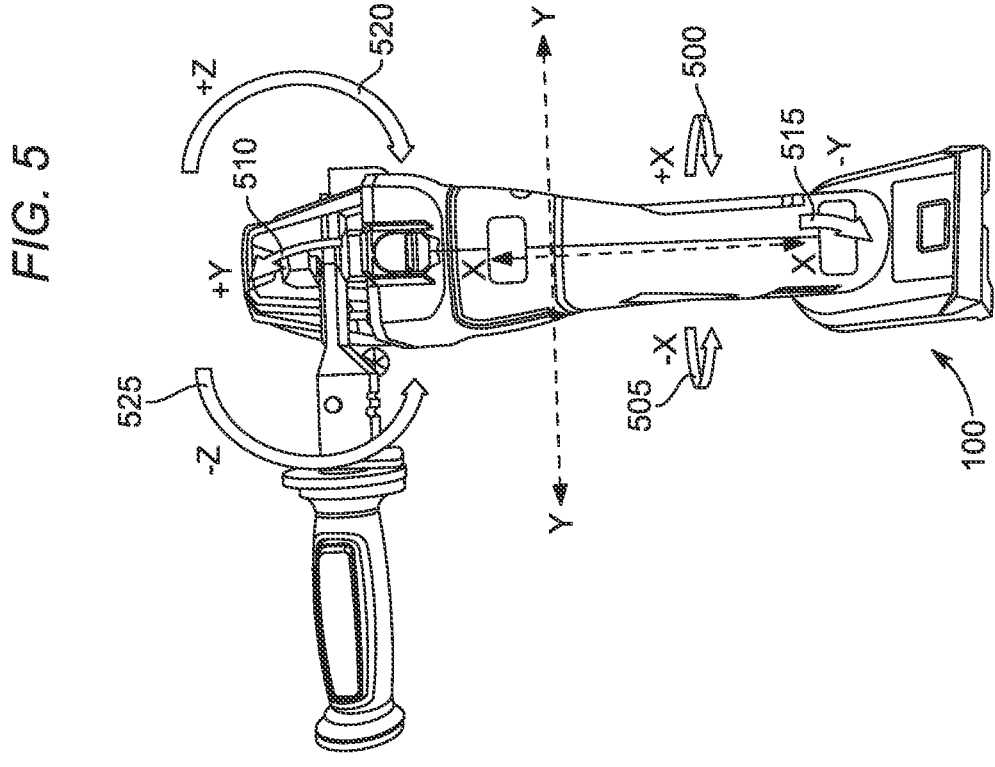

In some instances, the controller 300 (or the sensing circuit 325, or a printed circuit board included in the controller 300 containing the sensing circuit 325) is configured to detect the fault condition based on motion of the grinder 100. More specifically, the sensing circuit 325 is operable to generate output signals that include an X-component, a Y-component, and a Z-component. These features are illustrated in FIGS. 4A, 4B, and 5 and described below. In some examples, multiple sensors 405 are used to obtain the X-component, the Y-component, and the Z-component information. In some implementations, when the operator of the grinder 100 moves the grinder 100 across a workpiece, the controller 300 uses the sensing circuit 325 to detect the linear motion of the grinder 100, such as, for example, linear acceleration. Linear motion of the grinder 100 may be described as a forward motion, a reverse motion, and a lateral motion with respect to a workpiece. Such lateral motion may be used to detect a fault condition, such as, for example, a loss of control event. Rotational motion of the grinder 100 may also be detected, and, as described below, rotational velocity may be used to detect a fault condition, such as, for example, a loss of control event. Further still, in some embodiments, both velocity and acceleration (in one or more directions) may be used to detect a fault condition, such as, for example, a loss of control event.

FIGS. 4A, 4B, and 5 illustrate various motion of the grinder 100. It should be understood that the grinder 100 may be engaged with any number of workpieces in any number or orientations, dimensions, or planes. As illustrated in FIG. 4A (providing a top-down view of the grinder 100) and 4B (providing a side view of the grinder 100), the sensing circuit 325 may detect the linear motion in a first linear direction 415 and a second linear direction 420, which may be understood as the X-component and may represent forward and backward movement (e.g., longitudinal movement) of the grinder 100. The sensing circuit 325 may also detect the linear motion in a third linear direction 425 and a fourth linear direction 430, which may be understood as the Y-component and may represent lateral movement of the grinder 100. As illustrated in FIG. 4B, the sensing circuit 325 may further detect a fifth linear direction 440 and a sixth linear direction 445, which may be understood as the Z-component, which may represent linear movement of the grinder 100 into or away from a workpiece 450 (see, e.g., FIG. 4A illustrating the results of moving the grinder 100 into the workpiece 450) positioned underneath the grinder 100 (i.e., in a top-down view of the grinder 100). The first linear direction 415, second linear direction 420, third linear direction 425, fourth linear direction 430, fifth linear direction 440, and sixth linear direction 445 should all be understood as six possible directions of linear motion in a Cartesian coordinate (e.g., X-Y-Z-components) system.

The grinder 100 may also move rotationally, and the sensing circuit 325 (e.g., a gyroscope of the IMU) may be configured to detect such rotational movement. For example, as illustrated in FIG. 5, the grinder 100 may rotate in an +X direction 500 or a −X direction 505 representing rotation around an axis X (a front-to-back axis of rotation) defined by the first linear direction 415 and the second linear direction 420 (i.e., the X-component as described and illustrated in FIGS. 4A and 4B). As also illustrated in FIG. 5, the grinder 100 may rotate in a +Y direction 510 or a −Y direction 515 representing rotation around an axis Y (a side-to-side axis of rotation) defined by the third linear direction 425 and the fourth linear direction 430 (i.e., the Y-component as described and illustrated in FIG. 4A). Similarly, the grinder 100 may rotate in a +Z direction 520 or a −Z direction 525 representing rotation around an axis Z (see FIG. 4B) (a vertical axis of rotation) defined by the fifth linear direction 440 and the sixth linear direction 445 (i.e., the Z-component as described and illustrated in FIG. 4B). In other words, when a workpiece is positioned under the grinder 100 as illustrated in FIG. 5, rotation in the +X direction 500 or the −X direction 505 may represent roll of the grinder 100 toward the workpiece. In this same example, rotation in the +Y direction 510 or the −Y direction 515 may represent pitch of the grinder 100 toward the workpiece, and rotation in the +Z direction 520 or the −Z direction 525 may represent yaw of the grinder 100 (e.g., in a plane parallel to the workpiece).

It should be understood that the sensing circuit 325 may generate and output signals representing one or more of the motions described above with respect to the grinder 100. The sensing circuit 325 may be configured to output (e.g., to the controller 300) such signals as individual signals, as a motion vector, or in other formats that may represent a direction of movement, an amount of movement, a velocity, an acceleration, or a combination thereof. Alternatively, the controller 300 may be configured to calculate one or more motions of the grinder 100 (e.g., a velocity or an acceleration) based on signals output by the sensing circuit 325. For example, in embodiments where the sensing circuit 325 includes the IMU, the sensing circuit 325 may output a signal representing velocities and/or accelerations in one or more of the directions described above with respect to FIGS. 4A, 4B, and 5.

Loss of Control Event Detection

Figure 6:
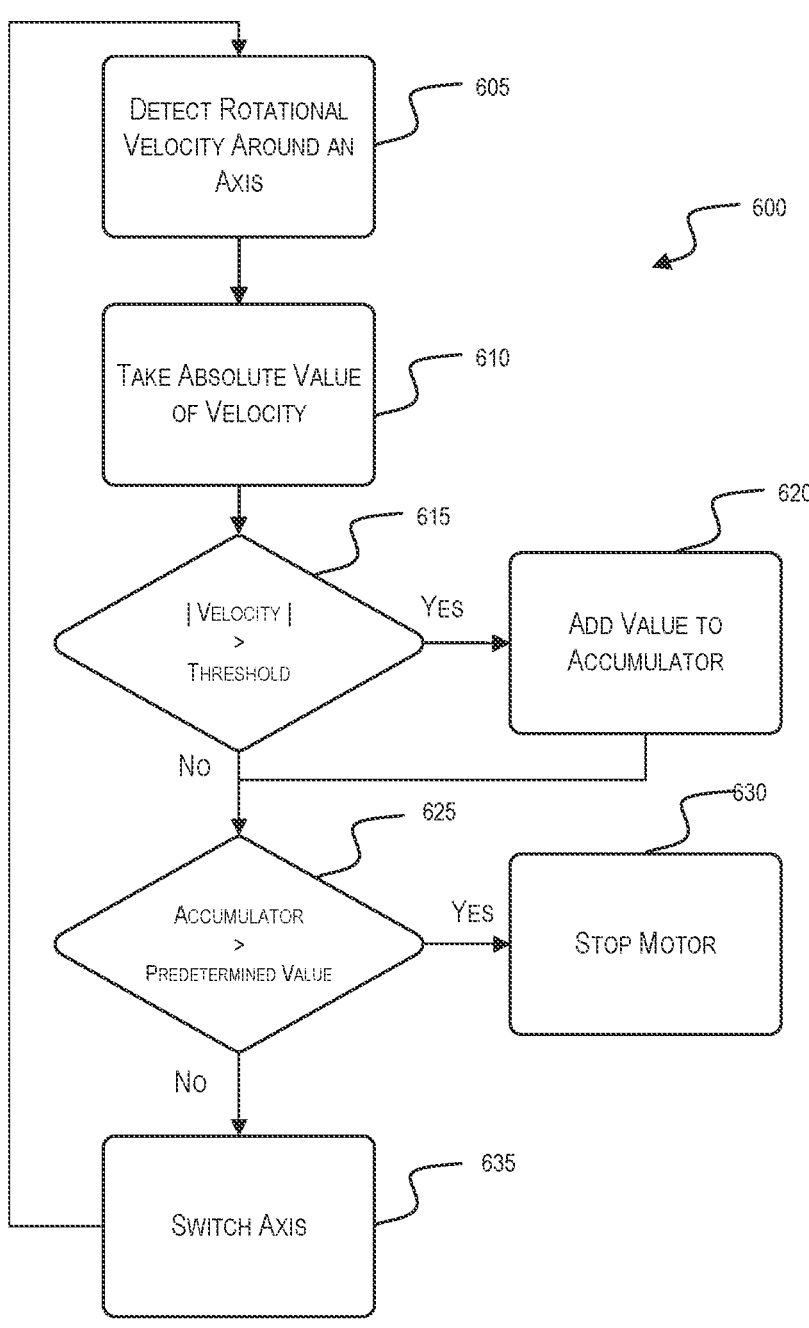
FIG. 6 is a flowchart illustrating a method of detecting a loss of control event for a power tool, according to some embodiments.

For example, FIG. 6 illustrates a method 600 for detecting a loss of control event of the grinder 100. The method 600 may be implemented on the grinder 100 including the sensing circuit 325, which monitors movement of the grinder 100, and the controller 300, wherein the controller 300 the controller 300 (or the sensing circuit 325, or a printed circuit board included in the module 400 containing the sensing circuit 325) is configured to detect a loss of control per the method 600 via one or more output signals from the sensing circuit 325.

In some embodiments, the sensing circuit 325 detects a first value for a first axis, which is provided to or received by the controller 300 (block 605). In some embodiments, the first value is a rotational velocity value around the first axis (e.g., measured using an IMU). In some embodiments, the first axis is the Z component. The controller 300 takes an absolute value of the first value, which allows both directions of movement to be checked together, (block 610) and compares the absolute value to a first threshold (block 615). In response to the first value exceeding the first threshold, the controller 300 adds an incremental value associated with the first threshold to an accumulator (counter) (block 620). In response to the first value being at or below the first threshold, the controller 300 does not add the incremental value to the accumulator but may in some embodiments, add a decremental value to the accumulator (e.g., if the accumulator has a non-zero value). The controller 300 checks the accumulator to determine whether the count on the accumulator has reached or exceeds a predetermined value (block 625). In response to the accumulator reaching the predetermined value, the controller 300 determines that a loss of control event has occurred (block 630). In response to the detected loss of control event, the controller 300 reduces power to the motor 210 by stopping (i.e., braking) the motor 210.

In response to the accumulator being at or below the predetermined value, the controller 300 switches to detecting movement for a different axis (a second value in a second axis) (block 635), which may be detected via the sensing circuit 325. In some embodiments, a state variable may be used to store a value representing what axis should be checked next, which can be updated upon each loop. This variable may also be used by the controller 300 to determine what thresholds, accumulator values, and the like should be applied to detected motion for a particular axis.

In some embodiments, the second value is a rotational velocity value around the second axis (e.g., measured using an IMU). In some embodiments, the second axis is the X component. The controller 300 may perform a similar check on the second value as performed on the first value. For example, the controller 300 may take an absolute value of the second value and compares the absolute value to a second threshold, which may be the same or different than the first threshold. In response to the second value exceeding the second threshold, the controller 300 adds an incremental value associated with the second threshold to an accumulator (counter), which may be a dedicated accumulator for the second axis from the accumulator for the first axis). In response to the second value not exceeding the second threshold, the controller 300 does not add the value to the accumulator. The controller 300 checks the accumulator to determine whether the accumulator has reached a predetermined value. In response to the accumulator reaching the predetermined value, the controller 300 determines that a loss of control event has occurred. In response to the detected loss of control event, the controller 300 reduces power to the motor 210 by stopping (i.e., braking) the motor 210.

In response to the accumulator not reaching the predetermined value, the controller 300 switches to detecting movement in a different axis (a third value for a third axis) (block 635), which may be detected via the sensing circuit 325. In some embodiments, the third value is a rotational velocity value around the third axis (e.g., measured using an IMU). In some embodiments, the third axis is the Y component. The controller 300 may perform a similar check on the third value as performed on the first value and the second value. For example, the controller 300 may take an absolute value of the third value and compares the absolute value to a third threshold, which may be the same as the first threshold or the second threshold or different from the first threshold and the second threshold. In response to the third value exceeding the third threshold, the controller 300 adds an incremental value associated with the third threshold to an accumulator (counter), which may be a dedicated accumulator for the third axis from the accumulator for the first axis and the second axis). In response to the third value not exceeding the third threshold, the controller 300 does not add the value to the accumulator. The controller 300 checks the accumulator to determine whether the accumulator has reached a prede-termined value. In response to the accumulator reaching the predetermined value, the controller 300 determines that a loss of control event has occurred. In response to the detected loss of control event, the controller 300 reduces power to the motor 210 by stopping (i.e., braking) the motor 210. In response to the accumulator not reaching the pre-determined value, the controller 300 switches axis. Specifi-cally, the controller 300 may loop to recheck the first axis, the second axis, the third axis, or a combination thereof and the controller may continuously perform such rechecking until a loss of control event is detected, the grinder 100 is stopped or turned off (powered off), a fault is detected, or a combination thereof. It should be understood that the con-troller 300 may check the first, second, and third axes in sequence or may check two or more of the axes in parallel. It should also be understood that the controller 300 may be configured to check the three axes in various sequences and is not limited to checking the axes in the order described above. In addition, the controller 300 may be configured to check each axis and add any applicable incremental values to the associated accumulators and then check the values of all of the accumulators to determine whether a loss of control event has been detected.

Also, in some embodiments, multiple thresholds may be used. For example, a detected velocity value in a particular direction (around a particular axis) may be compared to three or four different thresholds. Each threshold may be associated with a different accumulator value such that detected velocity values that exceed a larger threshold may be associated with a larger accumulator value than when the detected velocity value exceeds a smaller threshold. Thus, one or more control loops may be implemented to not only cycle through the different axes but also cycle through the different thresholds. For example, in some embodiments, the largest threshold may increase the accumulator such that it takes 1-4 accumulations to trip loss of control functionality, and the smallest threshold may take 90-100 accumulations to trip loss of control functionality. In some embodiments, the one or more thresholds may also differ between different axes. For example, in the Z and Y directions, the thresholds may range from 4500 to 6500, wherein in the X direction, the thresholds may range from 10000 to 11500. In some embodiments, when one or more thresholds are used for a particular axis, in response to a detected velocity value for the axis not satisfying any of the applicable thresholds, the controller 300 may be configured to decrement the associ-ated accumulator as a way to recover or reset from previous high rotations that may no longer be occurring.

Also, in some embodiments, signals received from the sensing circuit 325 and used in the method 600 (or other methods described herein) may be filtered. For example, in some embodiments, a rotational velocity of the grinder 100 obtained for one axis (e.g., as read from a gyroscope associated with the axis) is filtered by computing an average of the last 9 or other predetermined number of reads of such data. Other types of filtering are also envisioned and may be used in various implementations to establish delays, remove extraneous or potentially erroneous data values, or the like.

Although further features and functions associated with detecting a loss of control event are described below as being implemented within method 600 (or portions thereof) including, for example, the use of accumulators, it should be understood that the features and functions described herein may be used alone or with other base method including methods where an accumulator value may not be used (e.g., an individual value exceeding a threshold may trip loss of control functionality to address the detected loss of control event). It should also be understood that the features and functions described below may be implemented indepen-dently or in various combinations and, in some embodi-ments, the set of such features implemented by a power tool may be configurable (e.g., by a manufacturer, an end user, or the like).

As described in more detail below, as there are many ways to operate the grinder 100 (e.g., many different motions that may be used), there are many ways to loss control during operation of the grinder 100. Accordingly, the method 600 maybe combined with or modified to include one or more additional features for detecting loss of control on the grinder 100.

Sign Detection

In some instances, the controller 300 (or the sensing circuit 325, or a printed circuit board included in the module 400 containing the sensing circuit 325, or a combination thereof) implements a sign detection feature. For example, some directions in which the grinder 100 rotates have higher sensitivities than other directions. The rotational directions that have a higher sensitivity are the directions most likely to experience high velocities during a loss of control event. Therefore, those directions more easily trip loss of control functionality. In some embodiments, the more sensitive directions (i.e., the critical directions) are the –X, +Y, and –Z directions. For example, given the direction of blade rota-tion, the grinder 100 may rotate in the –Z direction 525 (see FIG. 5) when the blade is caught. Similarly, when a user is applying pressure to the flat side of the blade and the grinder 100 slips off a workpiece, the grinder 100 may rotate toward the +Y direction 510. Also, while rotation in both the –X direction 505 and the +X direction 500 during a loss of control event may be less likely than rotation in other directions, rotation in the –X direction 505 may be (e.g., based on empirical evidence) more likely to occur in such a situation.

Figure 7:
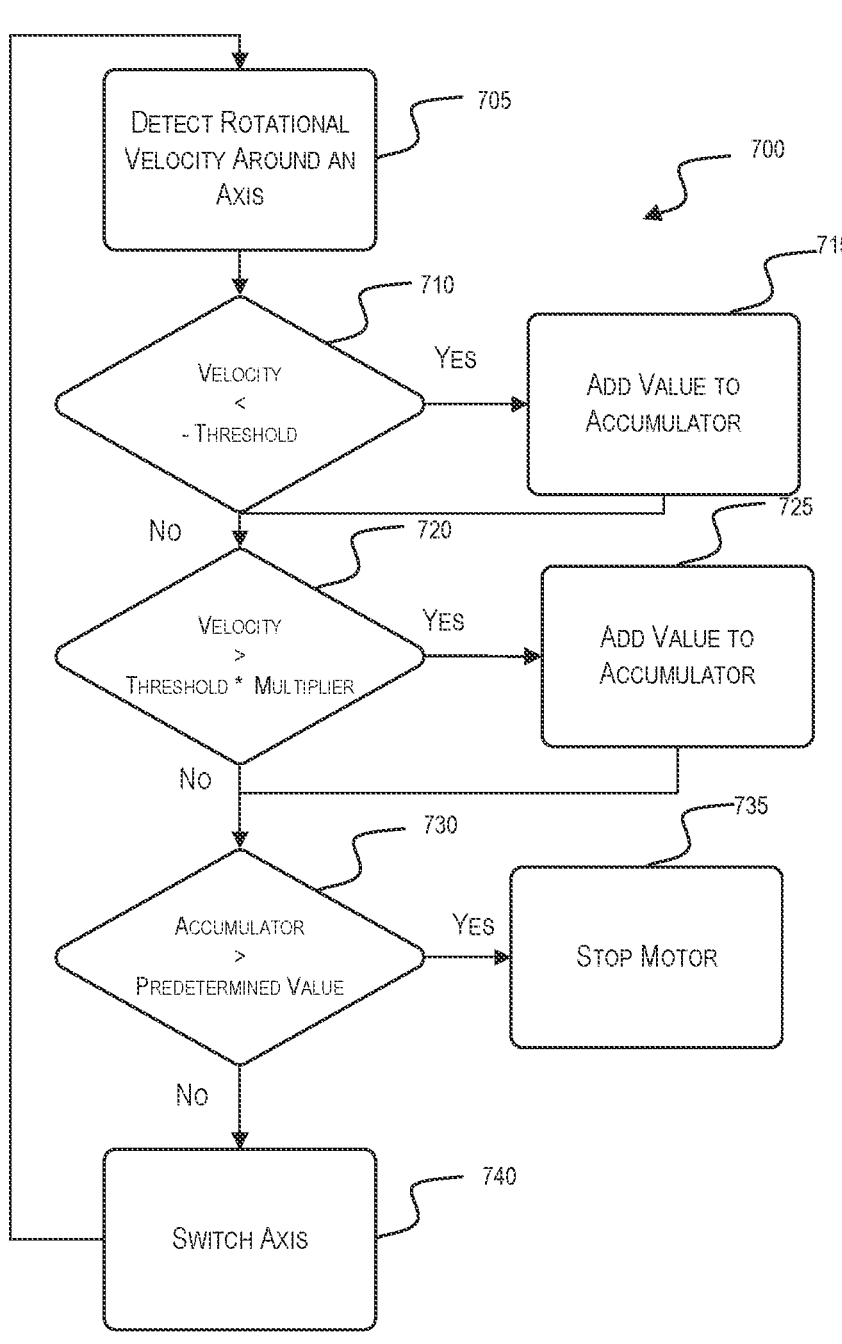
FIG. 7 is a flowchart illustrating a method of detecting a loss of control event for a power tool using signed direction, according to some embodiments.

FIG. 7 illustrates a method 700 for detecting a loss of control event of the grinder 100 based on direction sensi-tivities. The method 700 may be implemented via the grinder 100 including the sensing circuit 325, which moni-tors the movement of the grinder 100, and the controller 300, wherein the controller 300 (or the sensing circuit 325, or a printed circuit board included in the module 400 containing the sensing circuit 325, or a combination thereof) is config-ured to perform the method 700 to detect a loss of control via the output signals from the sensing circuit 325.

As illustrated in FIG. 7, in the method 700, the sensing circuit 325 detects a first value for a first axis (block 705).

In some embodiments, the first value is a rotational velocity value around the first axis (e.g., measured using an IMU). In some embodiments, the first axis is the Z component. As illustrated in FIG. 7, as compared to the method 600, the absolute value of the first value is not taken, which means that the first value can be positive or negative (representing rotational velocity in the +Z or the −Z direction). Accordingly, in the method 700, the first value is compared to a first threshold associated with a first direction of rotation around the first axis (e.g., a positive threshold value associated with positive rotation around the first axis) and a second threshold associated with a second direction of rotation around the first axis (e.g., a negative threshold value associated with negative rotation around the first axis), wherein the second direction of rotation is opposite the first direction. The first and second thresholds have different signs, and their values (absolute values) may be different. For example, a threshold associated with a non-critical direction can be set to a higher value than a threshold associated with a critical direction, and, in some embodiments, a multiplier can be used to distinguish these values. Using a multiplier allows the thresholds and accumulator values to remain the same while just applying the multiplier to non-critical directions. As described herein, loss of control functionality can be tripped based on whether the rotational velocity exceeds both versions of the threshold and, in some embodiments, an accumulator can be used to detect when to trip loss of control functionality. However, in other embodiments, the rotational velocity as compared to both versions of the threshold can be used to trip loss of control functionality without using an accumulator.

For example, as illustrated in FIG. 7 which provides an example of processing a value of the Z component, the −Z direction is set as the critical direction and the +Z direction is set as the non-critical direction. Accordingly, to check the velocity in the −Z direction (the critical direction), the first value is compared to a negative version of the first threshold value (since the direction is negative and no absolute value was taken) (at block 710). For example, in response to the first value being less than the negative version of the first threshold value, the controller 300 may add an incremental value associated with the first threshold value to the associated accumulator (block 715). Similarly, to check the velocity in the +Z direction (non-critical direction), the first value is compared to the positive version of the first threshold multiplied by a multiplier (block 720), and, in response to the first value being greater than the positive version of the first threshold multiplied by the multiplier, the controller 300 adds the incremental value associated with the first threshold to the accumulator (block 725). As noted above, the non-critical direction is a direction less likely to experience a high velocity during a loss of control event. Accordingly, the multiplier increases the first threshold such that the non-critical direction is less likely to trip loss of control functionality (i.e., less like to add value to the accumulator). More specifically, since the non-critical direction is less likely to indicate a loss of control event, the multiplier increases the threshold in the non-critical direction, which makes it harder for the first value to satisfy the first threshold and add a value to the accumulator. Accordingly, as noted above, the use of the multiplier allows the thresholds for the critical directions (e.g., and the accumulator values if desired) to remain the same and just the thresholds for the non-critical directions are adjusted by applying the multiplier to the existing thresholds. In some embodiments, the multiplier has a value between 2 and 4; however, other values may be used depending on the threshold values. It should also be understood that a multiplier may be applied in an opposite manner wherein the threshold values associated with the critical direction may be reduced or represented as a fraction of the threshold value used for the non-critical direction.

As illustrated in FIG. 7, after comparing the first value to the first threshold values in both the positive and negative direction, the controller 300 checks the accumulator to determine whether the accumulator has reached a predetermined value (block 730). In response to the accumulator reaching the predetermined value, the controller 300 determines that a loss of control event has occurred (block 735). In response to the accumulator not reaching the predetermined value, the controller 300 switches axis (block 740). The controller 300 may perform the same blocks for the X component and the Y component. In some embodiment, for the X component, the −X direction 505 is the critical direction and the +X direction 500 is the non-critical direction. This is because the −X direction 505 is more likely to experience a high velocity during a loss of control event than the +X direction 500. In some embodiments, for the Y component, the +Y direction 510 is the critical direction and the −Y direction 515 is the non-critical direction. This because the +Y direction 510 is more likely to experience a high velocity during a loss of control event than the −Y direction 515.

Again, as described above with respect to FIG. 6, it should be understood that multiple thresholds may be compared to a detected velocity value and different accumulation values may be associated with the different thresholds. Accordingly, threshold comparisons illustrated in FIG. 7 may be repeated for additional threshold values and the method 700 may be implemented via one or more control loops that cover not only the different thresholds but also the different axes.

Motor Speed and Current Detection

In some instances, the controller 300 (or the sensing circuit 325, or a printed circuit board included in the module 400 containing the sensing circuit 325, or a combination thereof) is configured to detect the fault condition based on an operating characteristic of the motor 210. The operating characteristic of the motor 210 may be motor acceleration, a battery current (representing power draw on the battery by the motor 210), or a combination thereof. When loss of control of the grinder 100 occurs, a load may be removed from the grinder 100. Removing the load increases the rotational velocity of the grinder 100. Accordingly, when the load is removed and the rotational velocity increases, the motor acceleration and the battery current also increase. Therefore, an increase in the motor acceleration, an increase in the battery current, or both may indicate that the load has been removed from the grinder 100 associated with a loss of control event.

For example, the controller 300 may be configured to receive a motor speed value from the sensing circuit 325, which the controller 300 uses to determine a motor acceleration. Specifically, the controller 300 may be configured to use a predetermined number of previous motor speeds (e.g., stored in a buffer with a variable size to account for various number of prior speeds) in combination with a current motor speed to determine the acceleration of the motor over an amount of time. In some embodiments, the predetermined number of previous motor speeds may be two to five and, in some embodiments, a new (current) motor speed may be compared with the oldest previous speed (stored in the buffer) to determine a motor acceleration to compare against a threshold, which may be, for example, between 300 and 700. In other embodiments, the predetermined number of previous motor speeds may be configurable (e.g., by a manufacturer, an end user, etc.).

Alternatively or in addition, the controller 300 receives a battery current value (e.g., from the sensing circuit 325 or other battery management systems or devices). The controller 300 checks the battery current value against a predetermined battery threshold, which may be for example, 10 amps but may be a different value depending on the power tool and/or battery pack characteristics. In some embodiments, the controller 300 uses the motor acceleration and/or the battery current to detect a loss of control event and may trip loss of control functionality (to handle a detected loss of control event) in response to one or both of these values exceeding associated thresholds. Alternatively, in response to the motor acceleration and/or the battery current exceeding associated thresholds, the controller 300 may add a value to an accumulator as described herein and may use the accumulator to detect whether a loss of control event has occurred. The value added to the accumulator may vary based on whether the motor acceleration threshold is satisfied, the battery current threshold is satisfied, or both thresholds are satisfied, and, in some embodiments, one or both of the motor acceleration and the battery current may be compared to multiple thresholds, each with different thresholds. In yet other embodiments, the controller 300 may use the motor acceleration and/or the battery current check as a preliminary check before performing one or more loss of control checks on the power tool, such as, for example, one of the methods 600, 700, 900, or 1100 described above. For example, in some embodiments, the operating characteristic of the motor (acceleration and/or battery current) may be compared to a threshold and whether the operating characteristic exceeds the threshold may be used to determine whether to perform a loss of control check on the grinder 100 or skip performing a loss of control check (e.g., wait for a subsequent cycle). Further still, in some embodiments, the controller 300 may use the motor acceleration and/or the battery current checks to set one or more thresholds for one or more loss of control detection checks or methods as described herein.

Figure 8:
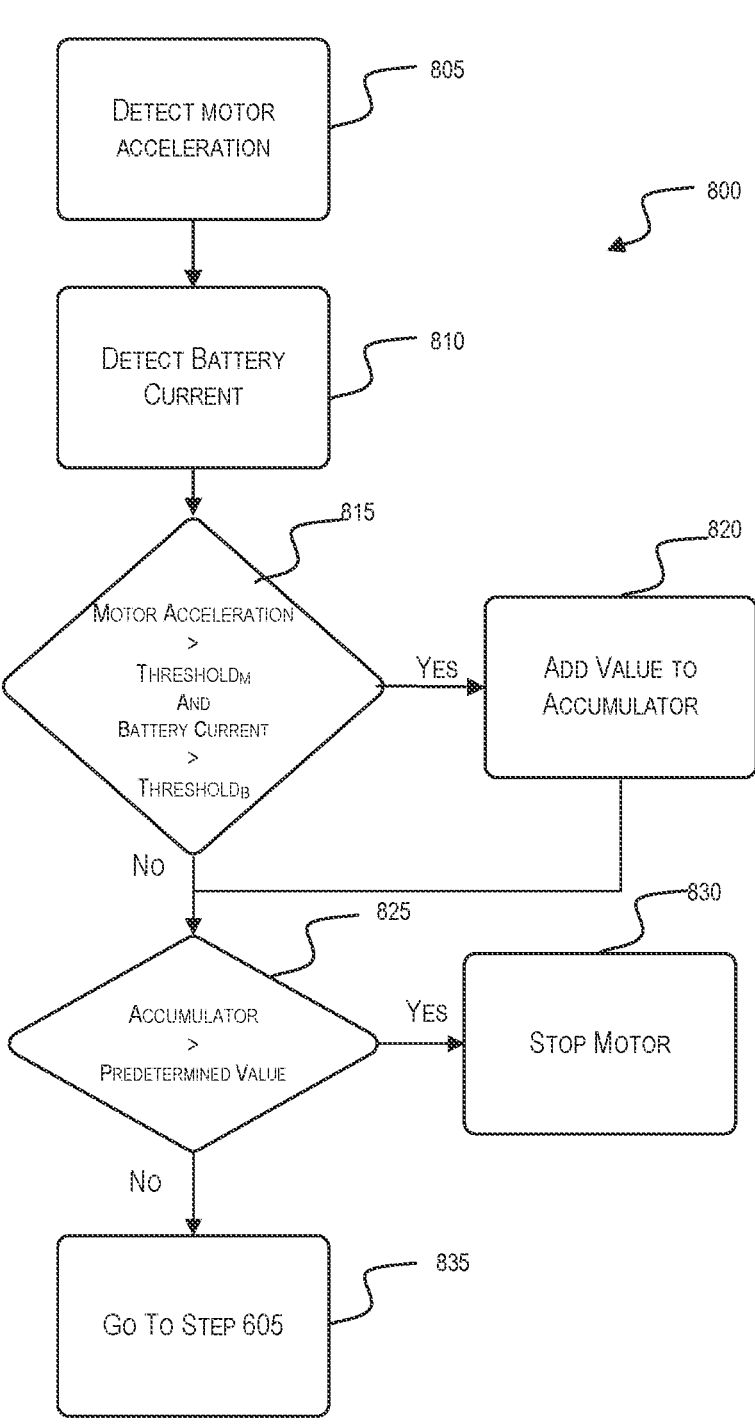
FIG. 8 is a flowchart illustrating a method of detecting a loss of control event for a power tool using motor acceleration and/or battery current, according to some embodiments.

FIG. 8 illustrates a method 800 for detecting a loss of control event of the grinder 100 based on battery current and motor acceleration. The method 800 may be implemented via the grinder 100 including the sensing circuit 325, which monitors movement of the grinder 100, and the controller 300, wherein the controller 300 (or the sensing circuit 325, or a printed circuit board included in the module 400 containing the sensing circuit 325, or a combination thereof) is configured to perform the method 800 to detect a loss of control via the output signals from the sensing circuit 325.

As illustrated in FIG. 8, the method 800 includes determining a motor acceleration of the motor 210 (block 805). As noted above, the controller 300 may determine a motor acceleration of the motor 210 based on a plurality of motor speed values detected via the sensing circuit 325 (or separate motor controls or sensors). The controller 300 compares the motor acceleration to a predetermined acceleration threshold (Threshold$_M$) (block 815).

The sensing circuit 325 also detects a battery current value of the battery (e.g., via the sensing circuit 325, a battery management system, or other sensing device) (block 810). The controller 300 compares the battery current value to a predetermined battery current threshold (Threshold$_B$) (block 815).

In response to both the motor acceleration exceeding the predetermined threshold and the battery current value exceeding the predetermined threshold, the controller 300 adds an incremental value to the accumulator (at block 820) and checks the accumulator to determine whether the accumulator has reached a predetermined value (block 825). In response to the accumulator reaching the predetermined value, the controller 300 determines that a loss of control event has occurred (block 830).

As noted above, in other embodiments, the motor acceleration and/or battery current values may be used as a preliminary check (independently or through use of an accumulator) before performing a loss of control check, such as, for example, using one of the methods 600, 700, 900, or 1100 as described above. For example, changes in motor speed and/or battery current can be used in conjunction with rotation velocity checking as described herein (see, e.g., methods 600, 700, and 900) and, in some embodiments, may be used to reduce nuisance trips while positioning the grinder 100 and continuously working on a workpiece. Alternatively, changes in motor speed and/or battery current can be used in conjunction with linear acceleration checking as also described herein (see, e.g., method 1100).

In some embodiments, when the motor acceleration and/or battery current checks are performed as part of an additional loss of control function (e.g., the method 600 or 700) the motor acceleration and the battery current are solely checked as part of checking rotational velocity in one axis, such as, for example, the Z component. In particular, the motor acceleration and/or battery current check may be performed as a preliminary check before checking a rotational velocity in the first axis or may be checked and used to add a value to the accumulator for the first axis (wherein velocity in the first axis may also increment this same accumulator). In other embodiments, the motor acceleration and the battery current are also checked as part of checking the velocity for additional and/or alternative axes. In implementations where motor acceleration and battery current are used in multiple axes, the calculations of motor acceleration and battery current may be performed once and used for each of the axes and, in some embodiments, the number of prior motor speeds (and associated buffer size) used to determine motor acceleration may be modified. In particular, the number of prior motor speeds influences a response time of the controller 300. For example, when a greater number of motor speeds are used to determine motor acceleration, the controller 300 is less sensitive to changes in motor speeds and, therefore, the response time of the controller 300 increases. The number of prior motor speeds used to determine motor acceleration may be modified for each tool the controller 300 is used therewith to obtain a desired sensitivity and associated response time.

Vector Magnitude of Rotational Velocity

In some instances, the controller 300 (or the sensing circuit 325, or a printed circuit board included in the module 400 containing the sensing circuit 325, or a combination thereof) implements a vector magnitude feature. In this feature, the controller 300 is configured to apply (e.g., multiply) a sensitivity value to the rotational velocity around each axis, wherein the sensitivity values may vary for one or more of the axes, and square the result, wherein the squares are summed for the axes and the sum is compared to a single set of one or more squared thresholds (e.g., similar to the use of multiple thresholds for one axis as described above with respect to FIGS. 6 and 7). In some embodiments, bit shifting, rather than multiplication, may be used to apply a sensitivity value and reduce the effect of an axis, which allows thresholds to remain the same and not be scaled with the sensitivity. When bit shifting is used, the bit shift may vary between 0 and 3, wherein a larger number of shifts reduces the sensitivity of the particular axis more than a smaller number of shifts and, wherein each axis may be associated with a different sensitivity (e.g., to reduce the effect of one or more axes). For example, using different sensitivity values may create a loss of control process where, when the X-axis is the majority contributor, it takes more velocity to trip loss of control functionality than when another axis is the majority contributor.

As noted, using bit shifting to reduce the effect of an axis (as compared to multiplying) may allow thresholds to remain the same (i.e., without having to scale the thresholds with the sensitivity adjustments). Also, using bit shifting limits the amount of multiplication needed, such as, for example, limiting the added multiplication statement to the squaring (i.e., reducing the size and complexity of the control code).

Using such sensitivity multipliers (values), axes that are more likely to have high rotational velocities during a loss of control event are subjected to a higher sensitivity value than an axis less likely to experience high rotational velocities. Therefore, certain axes may trip loss of control functionality more easily than other axes. Additionally, as noted above, in some embodiments, the axis velocities are summed. In such embodiments, the loss of control functionality may be tripped despite unintended motion occurring in multiple axes that individually may not trip loss of control functionality.

Figure 9:
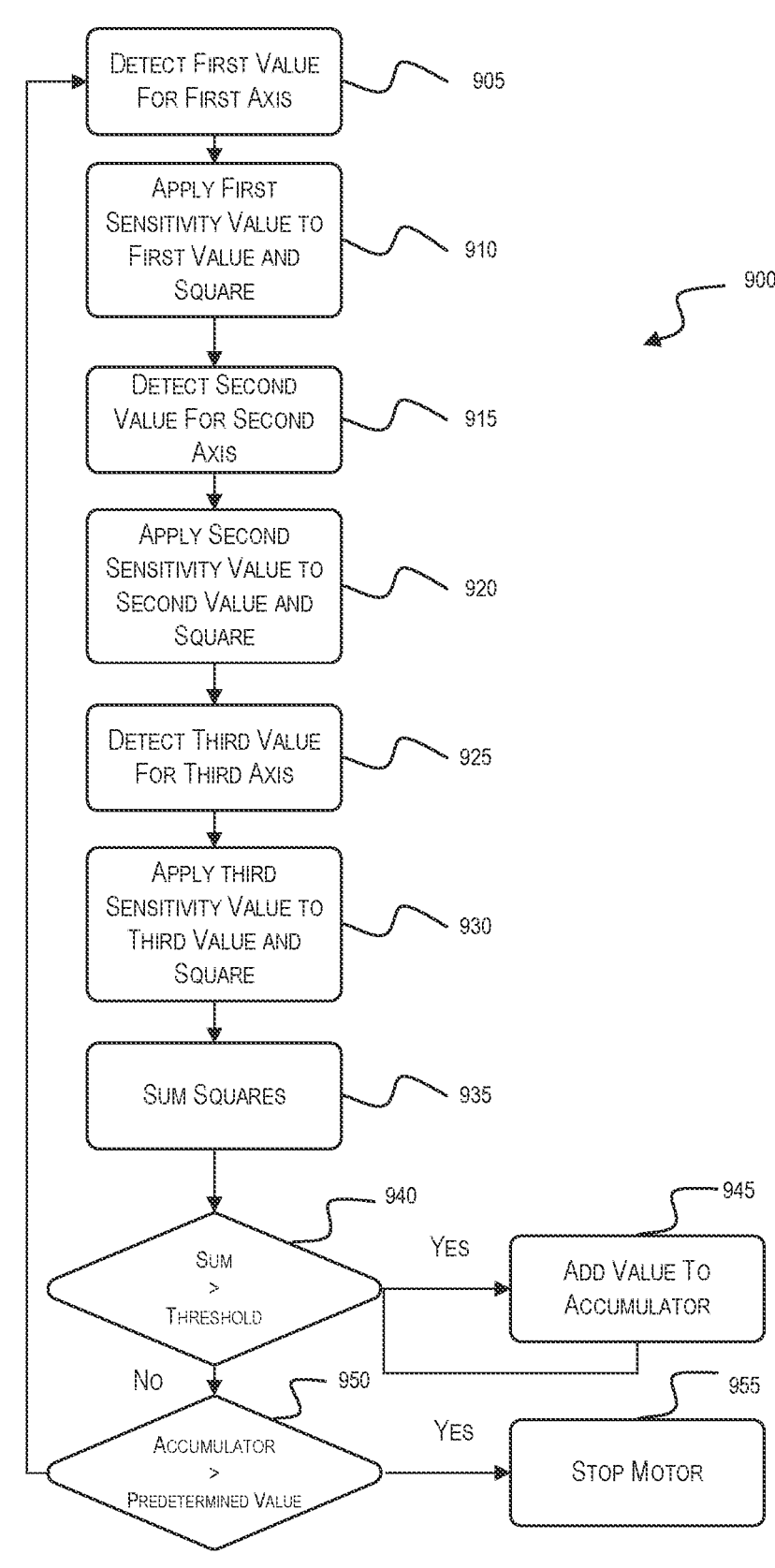
FIG. 9 is a flowchart illustrating a method of detecting a loss of control event for a power tool using a vector magnitude, according to some embodiments.

FIG. 9 illustrates a method 900 for detecting a loss of control event of the grinder 100 based on axis sensitivities. The method 900 may be implemented via the grinder 100 including the sensing circuit 325, which monitors movement of the grinder 100, and the controller 300, wherein the controller 300 (or the sensing circuit 325, or a printed circuit board included in the module 400 containing the sensing circuit 325, or a combination thereof) is configured to perform the method 900 to detect a loss of control via the output signals from the sensing circuit 325.

As illustrated in FIG. 9, the method 900 includes the sensing circuit 325 detecting a first value for a first axis (block 905). In some embodiments, the first value is a rotational velocity value around the first axis (e.g., measured using an IMU). In some embodiments, the first axis is the Z component. A first sensitivity value is applied to the first rotational velocity value (e.g., via the controller 300) to obtain a first adjusted rotational velocity and the first adjusted rotational velocity squared (block 910).

The sensing circuit 325 also detects a second value for a second axis (block 915). In some embodiments, the second value is a rotational velocity value around the second axis (e.g., measured using an IMU). In some embodiments, the second axis is the X component. The controller 300 applies a second sensitivity value to the second rotational velocity value to obtain a second adjusted rotational velocity, which is squared (block 920). The second sensitivity value may be the same or different than the first sensitivity value.

The sensing circuit 325 also detects a third value for a third axis (block 925). In some embodiments, the third value is a rotational velocity value around the third axis (e.g., measured using an IMU). In some embodiments, the third axis is the Y component. The controller 300 applies a third sensitivity value to the third rotational velocity to obtain a third adjusted rotational velocity, which is squared (block 930). The first, second, and third sensitivity values may have the same or different values. For example, in some embodiments, at least two of the first, second, and third sensitivity values are different. Additionally, in other embodiments, at least two of the first, second, and third sensitivity values may be the same. The controller 300 sums the first, second, and third squared values (block 935). The controller 300 compares the sum to a threshold (block 940). In response to the sum exceeding a threshold, the controller 300 adds an incremental value to an accumulator (block 945). In response to the sum not exceeding the threshold, the controller 300 does not add the value to the accumulator.

It should be understood that, as noted above with respect to methods 600 and 700, in some embodiments, the sum may be compared to multiple thresholds, which may be associated with different accumulator values. Also, in some embodiments, the thresholds used in the method 900 may be adjusted (as compared to the methods 600 and 700) to account for the fact that the accumulator can increment three times as fast as the methods 600 and 700 as described above. For example, in some embodiments, the thresholds used in the method 900 may be between 4500 and 6500. In addition or alternatively, the accumulator values associated with the thresholds used in the method 900 may be adjusted (e.g., reduced) to account for the fact that the accumulator may increment faster (e.g., three times as fast) than other methods (e.g., the methods 600 and 700). It should also be understood that the detecting, application of a sensitivity value, and squaring of the individual velocity values for each axis may be performed serially (in various orders) or in parallel.

As illustrated in FIG. 9, the controller 300 checks the accumulator to determine whether the accumulator has reached a predetermined value (block 950) and may trip loss of control functionality based on the accumulator value (i.e., trip loss of control functionality based on whether the sum exceeds the threshold). In response to the accumulator reaching the predetermined value, the controller 300 determines that a loss of control event has occurred and trips loss of control functionality (block 955). In response to the accumulator not reaching the predetermined value, the controller 300 continues to check the first, second, and third axes while the grinder 100 is powered on. As noted above, in some embodiments, as compared to the methods 600 and 700, the predetermined value checked against the accumulator may be adjusted (e.g., increased) to account for the fact that the accumulator may be increment more frequently than as compared to the methods 600 and 700.

Accordingly, the method 900 considers all three components of rotational velocity to determine whether to trip loss of control functionality while continuing to allow for tunable sensitivity of each axis. For example, by squaring the detected velocities and checking the results against a square of the threshold (vector magnitude without the square root), the threshold checks are moved out of the individual axis readings (which reduces individual axis functions as compared to, for example, methods 600 and 700) and allows one set of thresholds to be used for the vector sum. Using the vector sum and associated thresholds reducing the effect of one or more axes and may help control nuisance trips of loss of control functionality.

Drop Detection

In some instances, the controller 300 (or the sensing circuit 325, or a printed circuit board included in the module 400 containing the sensing circuit 325, or a combination thereof) may be configured to detect when the grinder 100 is dropped as a particular type of loss of control event.

To determine whether the grinder 100 is dropped, the controller 300 may be configured to use one or more acceleration readings to determine whether the grinder 100 is in free fall and whether to trip loss of control functionality. Specifically, the sensing circuit 325 may be configured to measure acceleration in the X-component, the Y-component, and the Z-component. When in free fall, the acceleration of the grinder 100 sums to zero due to the grinder 100 accelerating with gravity. Therefore, the controller 300 determines whether the acceleration is zero as summed for all of the axes. In response to the controller 300 determining that the acceleration is zero, a fault condition (drop event) may have occurred.

Figure 10:
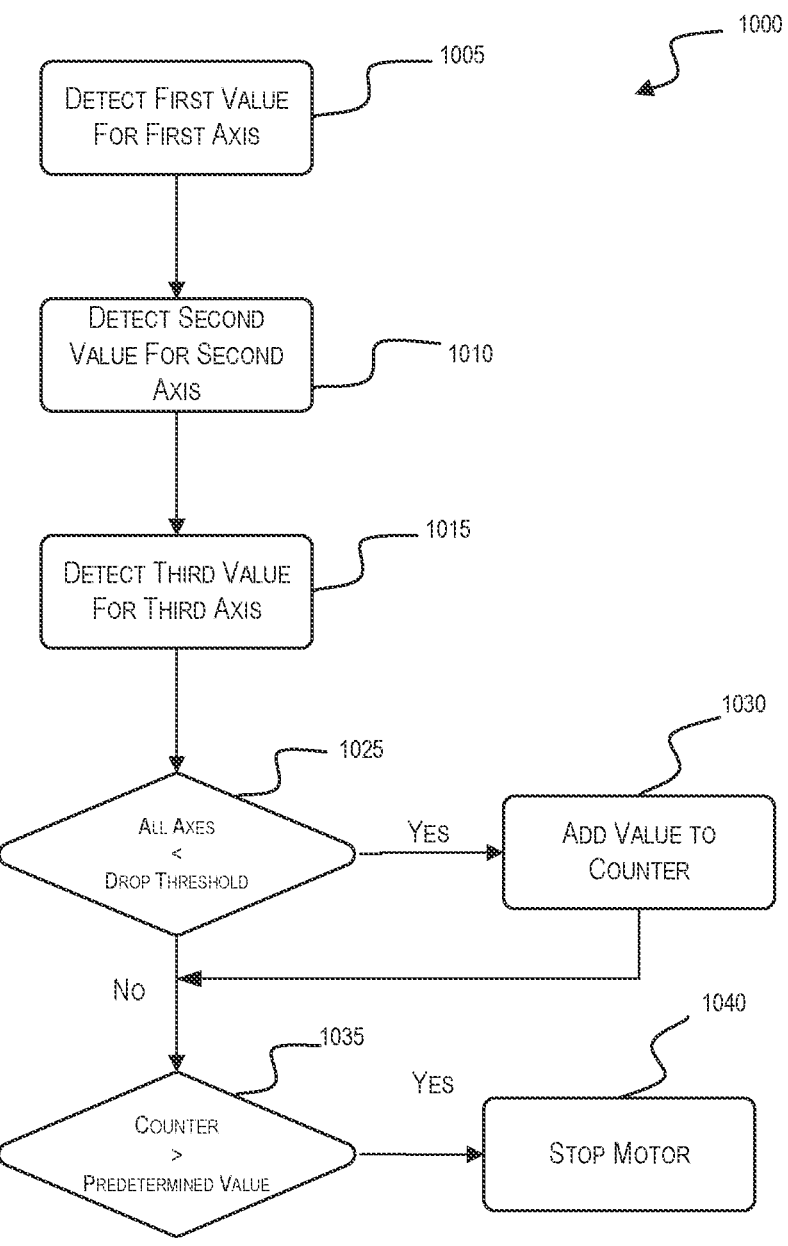
FIG. 10 is a flowchart illustrating a method of detecting a loss of control event for a power tool using drop detection, according to some embodiments.

FIG. 10 illustrates a method 1000 for detecting a loss of control event of the grinder 100 and, in particular, detecting a drop event. The method 1000 may be implemented via the grinder 100 including the sensing circuit 325, which monitors movement of the grinder 100, and the controller 300, wherein the controller 300 (or the sensing circuit 325, or a printed circuit board included in the module 400 containing the sensing circuit 325, or a combination thereof) is configured to perform the method 1000 to detect a loss of control via the output signals from the sensing circuit 325.

As illustrated in FIG. 10, the method 1000 includes detecting (e.g., with the sensing circuit 325) a first value for a first axis (block 1005). In some embodiments, the first value is a linear acceleration value along the first axis (e.g., measured using an IMU, for example, via a gyroscope associated with the first axis). In some embodiments, the first axis is the Z component. The sensing circuit 325 also detects a second value for a second axis (block 1010). In some embodiments, the second value is a linear acceleration value along the second axis (e.g., measured using an IMU, for example, via a gyroscope associated with the second axis). In some embodiments, the second axis is the X component. The sensing circuit 325 also detects a third value for a third axis (block 1015). In some embodiments, the third value is a linear acceleration value along the third axis (e.g., measured using an IMU, for example, via a gyroscope associated with the third axis). In some embodiments, the third axis is the Y component.

The method 1000 may check each acceleration value against a drop threshold (block 1025). In some embodiments, the drop threshold may range from 0.05G to 0.5G. In other embodiments, the drop threshold may be less than 0.05G. In other embodiments, the drop threshold may be greater than 0.5G. Furthermore, in some embodiments, each acceleration value may be positive or negative (i.e., no absolute value is taken), and, thus, each acceleration reading may be compared to a positive acceleration threshold and a negative acceleration threshold (establishing a drop acceleration range). In response to all of the acceleration values falling within the drop acceleration range, the drop detect counter can be incremented (e.g., by 1; block 1030). In response to less than all of the acceleration values being within the drop acceleration ranges and the drop detect count being above 0 (e.g., meaning a prior drop event had been detected), the drop detect counter may be decremented (e.g., by 1) to avoid building up drop detections over an extended period of time that may be unrelated to an actual drop event. It should be understood that the increment and decrement values used with the method 1000 may vary and may be configured or tuned for particular power tool as can the predetermined value compared with the drop detect counter that is used to detect whether to trip loss of control functionality. Accordingly, the method 1000 is similarly tunable as the other methods described herein.

The controller 300 checks the drop detect counter to determine whether the drop detect counter has reached a predetermined value (block 1035). In response to the counter reaching the predetermined value (e.g., representing that a drop condition has been detected for a certain number of cycles (which may occur approximately every millisecond), such as, for example 10), the controller 300 determines that a drop event has occurred and trips loss of control functionality (block 1040), such as, for example, by stopping the motor 210. In some embodiments, the controller 300 continues to check the first, second, and third axes while the grinder 100 is powered on.

It should be understood that the drop detection method 1000 may be used in combination with another loss of control method, such as, for example, the methods 600, 700, or 900, or 1100. For example, in each axis-specific loop, the acceleration value may be obtained (e.g., from the IMU as a gyroscope reading) and optionally filtered, and the method 1000 may be performed after each axis-specific loop is performed using the obtained acceleration data before the control cycle loops and starts over. Accordingly, the drop detect counter used in the method 1000 may be checked like other axis-specific accumulators or combined axis accumulators as described herein.

Also, in some embodiments, the method 1000 may implement one or more checks to ensure that loss of control functionality using linear acceleration is not erroneously tripped at start up (e.g., when a switch or trigger is pressed). For example, a data structure may be used to track read acceleration values. As one non-limiting example, a data structure may be created that includes a bit for each of axis, where each bit is initially set to 0. This bit can be cleared when a new, non-zero reading comes in and, thus, when all of the bits have a value of 0, the method 1000 may know that start-up is occurring and acceleration values may need to be ignored. For example, before comparing individual acceleration values (or the sum of such values), the method 1000 may check whether all readings have been updated after a restart by checking whether the bits in the data structure are still set to 0. In such a situation, the drop detect counter may not be incremented (regardless of the actual acceleration values). A similar data structure may be used for linear acceleration detection as described below, such as, for example, to make sure all three axes are read before performing a calibration on a power switch cycle.

As noted above, in some embodiments, obtained acceleration values are filtered. This filtering may include creating a filter buffer that holds values and creating a running average. For example, a sum of the values in the buffer may be divided by the number of values in the buffer to obtain a running average for an acceleration value. On resets, filtered values may be lower than expected because 0s in the buffer may be filtered in. To address this, a count may be determined of non-zero values and the buffer sum may be divided by this count (as compared to the size of the buffer). This allows the buffer to initialize to the first reading as compared to sloping down to actual reading as buffer fills up.

Linear Acceleration

Losing control of the grinder 100 may not always involve rotational movement. Accordingly, linear acceleration detection may be used to detect a loss of control event, which may be separate from drop detection, which is configured to detect a particular type of loss of control.

In some instances (in combination with or separately from drop detection), the controller 300 (or the sensing circuit 325, or a printed circuit board included in the module 400 containing the sensing circuit 325, or a combination thereof) may determine that a loss of control event has occurred based on linear acceleration of the grinder 100. In some embodiments, obtained acceleration values can be adjusted for gravity by applying a calibration offset to the obtained value (e.g., by subtracting a calibration offset from an absolute value of the obtained acceleration value). For example, depending on the position of the grinder 100, the gravity vector will be in a different location and will affect detected linear acceleration values differently. Using stored calibration offsets allows calibrated linear acceleration values to be generated and such calibration offsets can be recalibrated in response to the grinder 100 rotating above a predetermined distance.

A calibrated acceleration value can be compared to one or more thresholds and, in response to the calibrated acceleration value exceeding the threshold, a value can be added to an accumulator, which may be used to detect a loss of control event as described for other methods herein. Thus, rather than performing complex vector math to keep track of the position of the grinder 100 relative to the ground, in some embodiments, the controller 300 saves a "calibration offset" that is subtracted out of detected acceleration values (e.g., obtained from the IMU). The calibration offsets may be determined upon start-up of the grinder 100. However, the controller 300 may also be configured to track how much rotational movement has occurred since calibration offsets were determined and, in response to the rotational movement exceeding a threshold amount, may perform re-calibration to obtain new calibration offsets.

For example, in some embodiments, to generate the calibration offsets, upon startup of the grinder 100, calibration offsets are taken (e.g., determined and stored by the controller 300 for subsequent use). The calibration offsets may be based on data received from the sensing circuit 325 regarding acceleration in the first linear direction 415, the second linear direction 420, the third linear direction 425, the fourth linear direction 430, the fifth linear direction 440, the sixth linear direction 445, or a combination thereof. In other words, acceleration in the X-component, the Y-component, and the Z-component may be initially measured at startup of the grinder 100 and used to establish the calibration offsets. For example, the calibration offsets may be determined by the controller 300 at a steady state such that the grinder 100 is not moving while the calibration offsets are determined. In particular, the controller 300 may be configured to recalibrate the calibration offsets by setting the calibration offset to a current detected linear acceleration of the power tool in response to a magnitude of a current acceleration vector of the power tool being within a predetermined range of a gravity value.

For example, to determine that the grinder 100 is at the steady state, the sensing circuit 325 may measure a current acceleration of the grinder 100 in the X-component, the Y-component, and the Z-component, and the controller 300 may compare each measured acceleration to gravitational acceleration in that particular axis. In some embodiments, the current acceleration of the grinder 100 may be measured at a frequency in the range of 10 Hz to 7000 Hz. In other embodiments, the current acceleration of the grinder 100 may be measured at a frequency less than 10 Hz. In other embodiments, the current acceleration of the grinder 100 may be measured at a frequency greater than 7000 Hz. In response to the acceleration equaling gravitational acceleration (or being within a range of such a gravity value) in each axis, the controller 300 stores the detected acceleration as the calibration offset. In response to the current acceleration being different than gravitational acceleration (e.g., for one or more axes), the controller 300 waits to store new calibration offsets (i.e., waits until current acceleration values are within a predetermined range of a gravity value). In some embodiments, the controller 300 does not store any new calibration offsets until the acceleration equals gravitational acceleration in each axis. For example, in some embodiments, rather than comparing individual accelerations to associated gravitational values, the controller 300 is configured to square the magnitude of each of the three acceleration vectors and sum the squares. The sum can then be compared against a squared gravity value to determine whether the experienced acceleration is close to gravity. In some embodiments, the controller 300 is also configured to wait until rotational velocity is at a particular state (e.g., low velocity) before storing new calibration offsets (e.g., regardless of the obtained acceleration values). In addition, as noted above, in some embodiments, the controller 300 is configured to wait until new values have been read on each axis and may use a data structure with individual bit values as described above to track this condition.

Accordingly, the controller 300 ensures that the grinder 100 is not accelerating when the new calibration measurements are determined such that the new calibration offsets solely account for gravity, and, thus, the measured accelerations on the X-component, the Y-component, and the Z-component are due to gravity and not movement of the grinder 100. As described in further detail below, the calibration offsets may be subtracted from subsequent linear acceleration measurements, mitigating effects of gravity on the acceleration measurements and, consequently, improving the accuracy of the linear acceleration measurements.

In some embodiments, new calibration offsets are determined for the X-component, the Y-component, or the Z-component when the grinder 100 has rotated above a predetermined threshold in that particular axis. Therefore, new calibration offsets may be needed for one or more of the X-component, the Y-component, or the Z-component during operation of the grinder 100. An angular distance travelled by the grinder 100 may be measured by a gyroscope and added to a distance accumulator to keep track of the amount of rotational travel that has occurred since the last calibration. Each axis may have a distinct accumulator. Therefore, each of the accumulators measures the angular distance travelled in one particular axis and when any of the accumulators reaches the predetermined value, recalibration may be performed. Also, in some embodiments, signed (e.g., pre-absolute) value measurements may be tracked (i.e., added to the distance or movement accumulators) so that opposite directions of travel cancel out.

In response to the grinder 100 traveling an angular distance above a predetermined threshold, the controller 300 determines new calibration offsets. At each of new calibration, the controller 300 may validate that the acceleration of the grinder 100 is at zero. In other words, the controller 300 validates that the only acceleration of the grinder 100 is due to gravity. Therefore, the controller 300 ensures that the grinder 100 is not accelerating when the new calibration offsets are determined such that the new calibration offsets solely account for gravity. New calibration offsets may be determined as described above each time the grinder 100 rotates above the predetermined threshold. In other embodiments, new calibration offsets may be determined at different or additional times, such as, for example, power resets, trigger cycles, and the like. Determining the new calibration offsets during operation of the grinder 100 helps mitigate negative effects from rotation of the grinder 100 during loss of control detection.

During operation of the grinder 100, the sensing circuit 325 measures acceleration in the X-component, the Y-component, and the Z-component and provides those measurements to the controller 300. The controller 300 also receives rotational movement measurements (e.g., from the sensing circuit 325), which the controller 300 uses to determine whether the grinder 100 has rotated above the predetermined threshold in the X-component, the Y-component, or the Z-component. In response to the rotation being above the predetermined threshold, the controller 300 determines new calibration offsets as explained above. Alternatively, in response to rotation not being above the predetermined threshold, the previous calibration offsets are used, and, in particular, the controller 300 subtracts the calibration offsets from the acceleration measurements, removing effects of gravity. After subtracting the calibration offsets, the controller 300 compares the calibrated acceleration values to one or more thresholds to determine whether a loss of control has occurred similar to how velocity measurements are compared to one or more thresholds as described above with respect to methods 600 and 700. As described above, in response to detecting such a loss of control, the motor 210 may be turned off such that operation of the grinder 100 is stopped.

Figure 11:
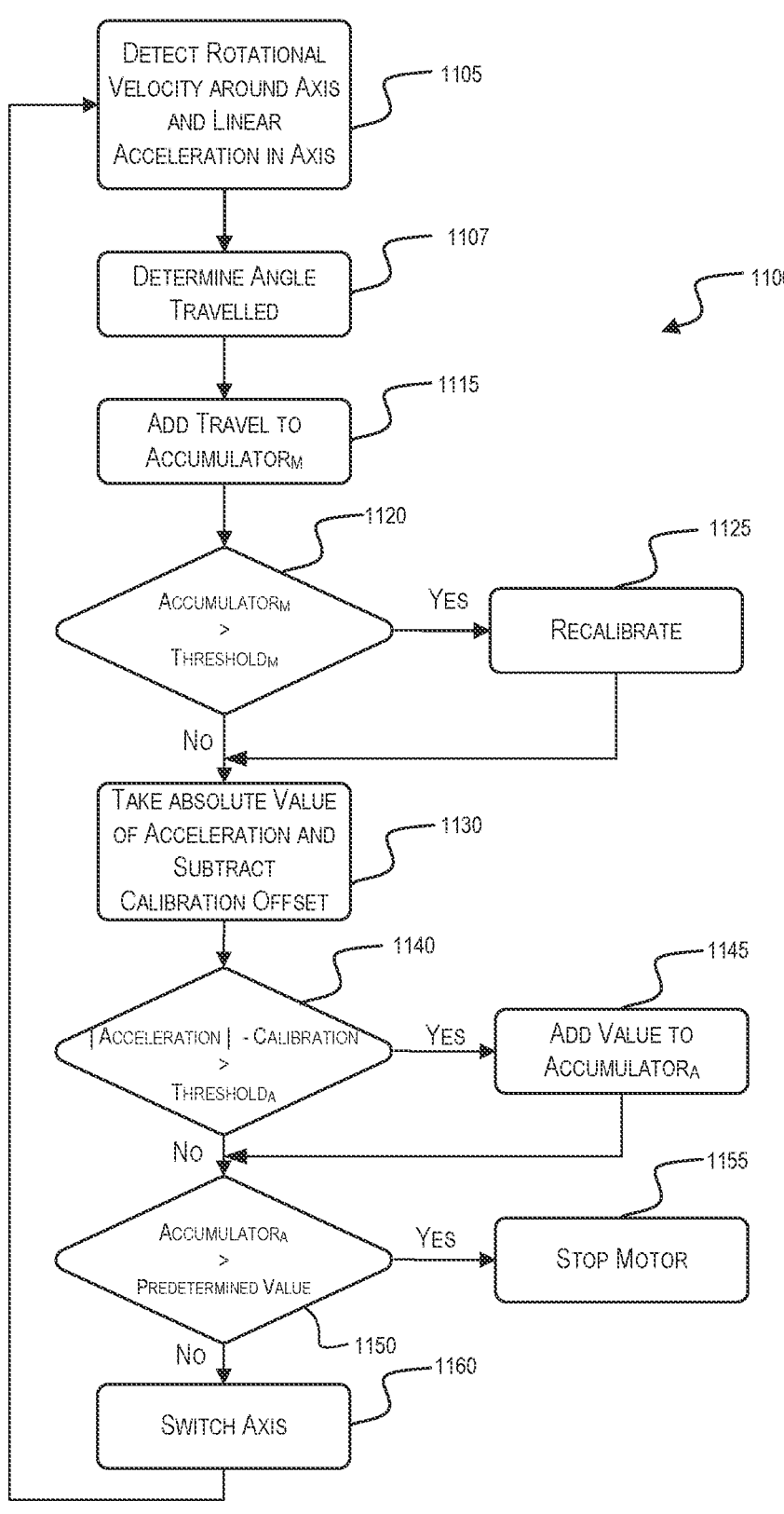
FIG. 11 is a flowchart illustrating a method of detecting a loss of control event for a power tool using linear acceleration, according to some embodiments.

FIG. 11 illustrates a method 1100 for detecting a loss of control event of the grinder 100 using the calibration offsets described above. The method 1100 may be implemented via the grinder 100 including the sensing circuit 325, which monitors movement of the grinder 100, and the controller 300, wherein the controller 300 (or the sensing circuit 325, or a printed circuit board included in the module 400 containing the sensing circuit 325, or a combination thereof) is configured to perform the method 1100 to detect a loss of control via the output signals from the sensing circuit 325.

As illustrated in FIG. 11, the method 1110 includes detecting (e.g., with the sensing circuit 325) a first rotational velocity value for a first axis via the gyroscope (block 1105). In some embodiments, the first axis is the Z component, and the first rotational velocity value represents a rotational velocity around the Z component (Z axis). The sensing circuit 325 may also detect a first linear acceleration value of the first axis (block 1105). The controller 300 determines a first angle traveled with respect to the first axis based on the first rotational velocity value (block 1107). The first angle traveled is added to a first movement accumulator (Accumulator$_M$) (block 1115). In some embodiments, the first angle traveled is added to the first movement accumulator by bit shifting down the received first velocity value (e.g., as read from the gyroscope for the Z component) and adding the resulting value to the first movement accumulator.

The controller 300 checks the first movement accumulator to determine whether the first movement accumulator has reached a predetermined value (Threshold$_M$ representing a rotational threshold) (block 1120). In response to the first movement accumulator reaching the predetermined value, the controller 300 determines that a new calibration offset is needed (block 1125, representing a recalibration process). As described above, the controller 300 obtains a new calibration offset by determining whether the grinder 100 is only being acted on by gravitational acceleration. In response to the grinder 100 only being acted on by gravitational acceleration, the controller 300 saves the current acceleration value as the new calibration offset, resets the angle measurements (e.g., to zero), and resets a flag tracking whether calibration has been completed (which may be used to control whether loss of control detection via linear acceleration is enabled).

After obtaining a new calibration offset or when a previous calibration offset is still valid based on the tracked rotational movement of the grinder 100, the controller 300 takes an absolute value of the first acceleration value and subtracts the calibration offset from the absolute value of the first acceleration value (to obtain a first calibrated acceleration value) (block 1130), and compares the first calibrated acceleration to a first acceleration threshold (Threshold$_A$) (block 1140). In response to the first calibrated acceleration value exceeding the first acceleration threshold, the controller 300 adds a value to an accumulator (Accumulator$_A$) (block 1145). The controller 300 checks the accumulator to determine whether the accumulator has reached a predetermined value (block 1150). In response to the accumulator reaching the predetermined value, the controller 300 determines that a loss of control event has occurred (block 1155). In response to the accumulator not reaching the predetermined value, the controller 300 may decrement the accumulator (e.g., if the Accumulator$_A$ has a non-zero value) and switches the axis (block 1160) and blocks 705-750 are repeated for a second axis and a third axis. The controller 300 may continue to check the first, second, and third axes while the grinder 100 is powered on.

It should be understood that the acceleration thresholds used in the method 1100 may vary for different axes and may be associated with different accumulator values. Also, in some embodiments, as described above with respect to the methods 600 and 700, multiple thresholds may be used with the calibrated acceleration values. Accordingly, similar the velocity-checking methods described herein, the linear acceleration method 1100 may be tunable and different axes may have different sensitivities. Also, it should be understood that the linear acceleration check may be performed separately or in combination with any of the other loss of control detection methods described herein. For example, in some embodiments, since the rotational velocity is obtained as part of the method 1100, the rotational velocity can also be checked (e.g., as described above with respect to method 600 or 700) and may use a separate or shared accumulator with the accumulator used with the acceleration values.

IMU Wake Up Feature

In some embodiments, when the grinder 100 goes into sleep mode, every general-purpose input/output (GPIO) pin is disabled. Then, the wake sources are re-enabled to be interrupt triggers. Accordingly, the controller 300 goes into low power mode and enter a wait-for-interrupt (WFI) loop. When one of the interrupt sources is triggered, the MCU resets the code and execution of the main program starts from the beginning again, including initialization. In some embodiments, the sensing circuit 325, such as, for example, the IMU, is used as a wake-up source, wherein an interrupt is generated from the IMU to be detected by the controller 300. The IMU may have to configurable interrupt pins and routing at least one of these pins to the controller 300 can be used to wake up the controller 300.

Figure 12:
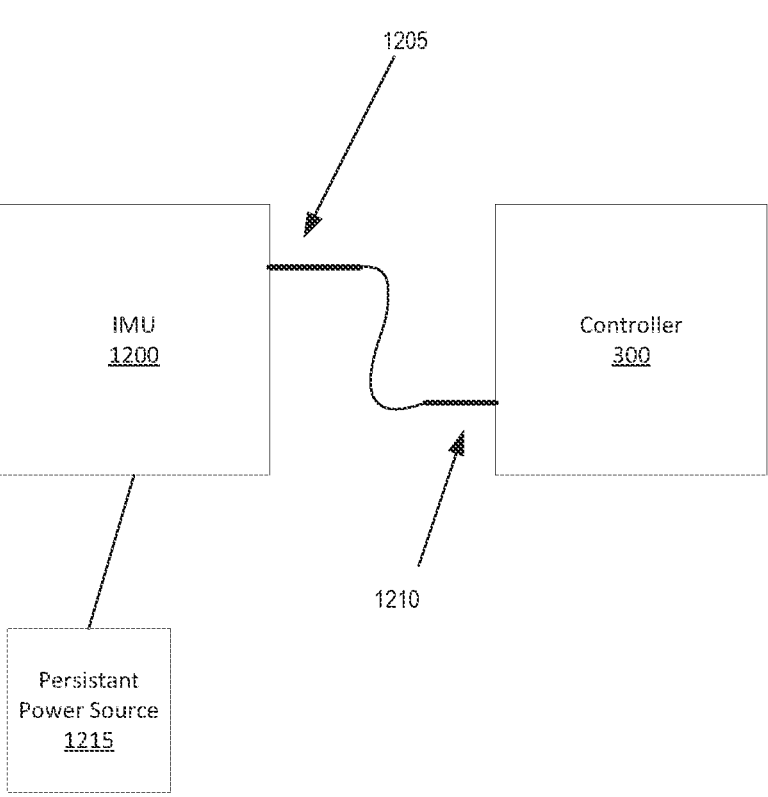
FIG. 12 schematically illustrates an inertial measurement unit (IMU) configured to provide a wake-up interrupt to a controller of the power tool of FIG. 1, according to some embodiments.

For example, as illustrated in FIG. 12, to have the IMU 1200 stay on (i.e., powered on) after the controller 300 goes to sleep, the IMU 1200 can be powered by a power source 1215 that stays on during sleep mode, such as, a 3.3V low-dropout (LDO) power source, which remains on when the controller 300 goes to sleep (referred to herein as a persistent power source). Also, to get the interrupt to register in the controller 300, one of the interrupt pins 1205 of the IMU 1200 is routed to a pin 1210 (e.g., a GPIO pin) on the controller 300. The interrupt generated from the IMU 1200 may be a push-pull configuration, which means that no pull-up or pull-down resistors may be needed. After routing the interrupt pin, the GPIO pin 1210 on the controller 300 tied to the interrupt is defined as a wake source, wherein the trigger may be set as a rising and falling edge.

In some embodiments, when the IMU 1200 is configured as a wake-up source, the interrupt may be generated by the IMU 1200 even when the controller 300 is not in sleep mode, wherein the controller 300 may be limited to looking for this interrupt when in sleep mode. Thus, to improve the efficiency of this IMU interrupt (e.g., efficiency in terms of power draw), the IMU 1200 may be placed in low power mode just before the controller 300 goes to sleep. In a low power mode, motion readings (e.g., acceleration readings) may be determined at a low power mode frequency (e.g., 52 Hz or less). Alternatively or in addition, wake up interrupts generated by the IMU 1200 may be disabled during normal operation of the controller 300 and may be enabled just before the controller 300 goes to sleep (e.g., wherein interrupts may be disabled again when the controller 300 comes out of sleep mode). The sensitivity of the IMU wake up may be configurable, such that the thresholds or samples needed to generate the interrupt may be configurable as part of configuration the IMU 1200.

Accordingly, the grinder 100 may include an IMU wake up feature. When the grinder 100 is not in use for a predetermined period, the grinder 100 enters a sleep mode. In the sleep mode, the controller 300 waits for an interrupt trigger, and the sensing circuit 325 may include an IMU 1200 that acts as one such trigger. For the IMU 1200 to act as an interrupt trigger, the IMU 1200 remains powered on after the controller 300 enters the sleep mode. Therefore, the IMU 1200 is configured to detect motion of the grinder 100 despite the controller 300 entering the sleep mode. The IMU receives power from a power source 1215 that remains on despite the controller 300 entering the sleep mode, such as, for example, a dedicated or shared battery or other power source of the grinder 100. Before the controller 300 enters the sleep mode, the controller 300 may set the IMU 1200 to a low power mode such that the IMU 1200 receives less power when the controller 300 is in the sleep mode. In operation, when the grinder 100 is unmoved for a predetermined amount of time, the grinder 100, and therefore the controller 300, enters the sleep mode. When the user picks up the grinder 100, the IMU 1200 detects motion of the grinder 10 and subsequently interrupts the sleep mode of the controller 300. Thereafter, the grinder 100 is usable and one or more loss of control detection methods may be initialized so that they can be ready to implement during operation of the grinder.

One-Handed Grinder

Figure 13A:
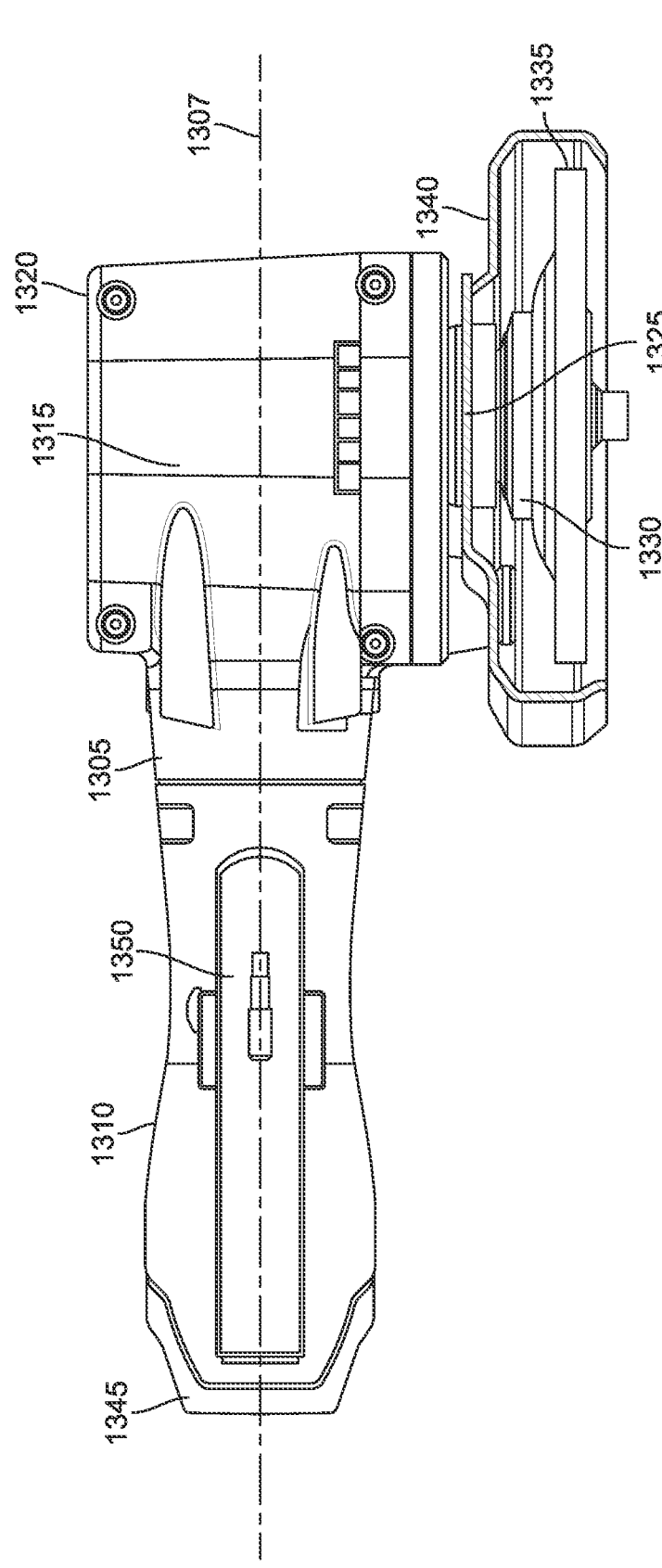
FIG. 13A is a side view of a power tool according to some embodiments.

FIG. 13A illustrates an alternative design for a portable rotary power tool, such as a grinder 1300 configured for one-handed operation. The grinder 1300 may include a main tool housing 1305 and a handle or hand grip 1310 that extends along the main tool housing 1305 between a first end and a second end of the grinder 1300 defining a body axis 1307 of the grinder 1300. In some instances, the grinder 1300 is configured to be operated by one hand of an operator (i.e., is configured for one-handed operation). For example, the handle 1310 may have a grip length of approximately 100 millimeters and may be configured to be operated by only one hand of the operator. In other words, as compared to other grinders, the grinder 1300 does not include a handle extending radially from the main tool housing 1305 (i.e., radially from the body axis 1307). It should be understood that although some methods of controlling a power tool are described herein with respect to the grinder 1300 configured for one-handed operation, the methods described herein may be used with other types of portable rotary power tools, including, for example, grinders with multiple handles.

A motor 1315 is located within a motor housing 1320 of the main tool housing 1305. An output shaft 1325 is couplable to a tool holder 1330 is configured to receive an accessory 1335, such as a cutting tool, a grinding disc, a rotary burr, a sanding disc, etc. Various types of accessories may be interchangeably attached to the tool holder 1330 and may be designed with different characteristics to perform different types of operations. For example, the accessory 1335 may be made of a material and have dimensions suitable for performing a specific type of task. For instance, an accessory (e.g., a grinder disc) may have a diameter of 100 millimeters (or 4 inches) or less. In some instances, the output shaft 1325, the tool holder 1330, or both may limit the size or shape of the accessory 1335 that can be attached and used with the grinder 1300. The characteristics of an accessory 1335 coupled to the tool holder 1330 may affect the performance of the grinder 1300 or may impose constraints on operation of the tool. For example, different accessory types may be configured to work at different rotational speeds or applied torques depending on the characteristics of the accessory and the task to be performed. During operation of the grinder 1300, the motor 1315 and the output shaft 1325 may be controlled to rotate at a range of speeds, and, as noted above, the speed may vary based on the type of accessory 1335 coupled to the tool holder 1330, one or more user inputs, a type of working surface or substance interfacing with the tool 1300, or other parameters.

In some embodiments, the grinder 1300 may include a guard 1340 that at least partially covers an accessory 1335 attached to the tool holder 1330. In some embodiments, the guard 1340 prevents a user from contacting the accessory 1335. In some embodiments, the guard 1340 also blocks, for example, sparks, spraying debris, or unintentional contact between the accessory 1335 and a workpiece. In some examples, the guard 1340 is configured to limit the size of the accessory 1335. In other examples, the guard 1340 is sized to receive a particular accessory, such as grinder disc. In some instances, such as for example when the grinder 1300 is configured for one-handed operation, the guard 1340 forms the widest radial dimension of the grinder 1300 with respect to the body axis 1307 of the main tool housing 1305.

In some embodiments, the handle 1310 may define a battery pack receptacle 1345, which is positioned on an end of the handle 1310 opposite the motor housing 1320. The battery pack receptacle 1345 is configured to selectively, mechanically, and electrically connect to a rechargeable battery pack (i.e., a power supply) for powering the motor 1315. The battery pack is insertable into or attachable to the battery pack receptacle 1345. The battery pack may include any of a number of different nominal voltages (e.g., 12V, 18V, 24V, 36V, 40V, 48V, etc.), and may be configured having any of a number of different chemistries (e.g., lithium-ion, nickel-cadmium, etc.). In some embodiments, the battery pack (e.g., when operating as a 12V power source) has a current draw of at least 60 Amperes. In other embodiments, the battery pack (e.g., when operating as a 12V power source) has a current draw of 60 Amperes to 90 Amperes. In still other embodiments, the battery pack may be configured to operate between 35 Amperes and 40 Amperes. In some embodiments, the grinder 1300 operates at a power level of at least 500 Watts. In other embodiments, the grinder 1300 operates at a power level of at least 600 Watts. In still other embodiments, the grinder 1300 operates at a power level of 600 Watts to 800 Watts. In yet other embodiments, the grinder 1300 operates at a power level of between 375 Watts and 475 Watts. In some embodiments, the motor 1315 may be powered by a remote power source (e.g., an AC electrical outlet) through a power cord and a power interface of the grinder 1300 in addition to or as an alternative to receiving power from an attached battery pack.

Figure 13B:
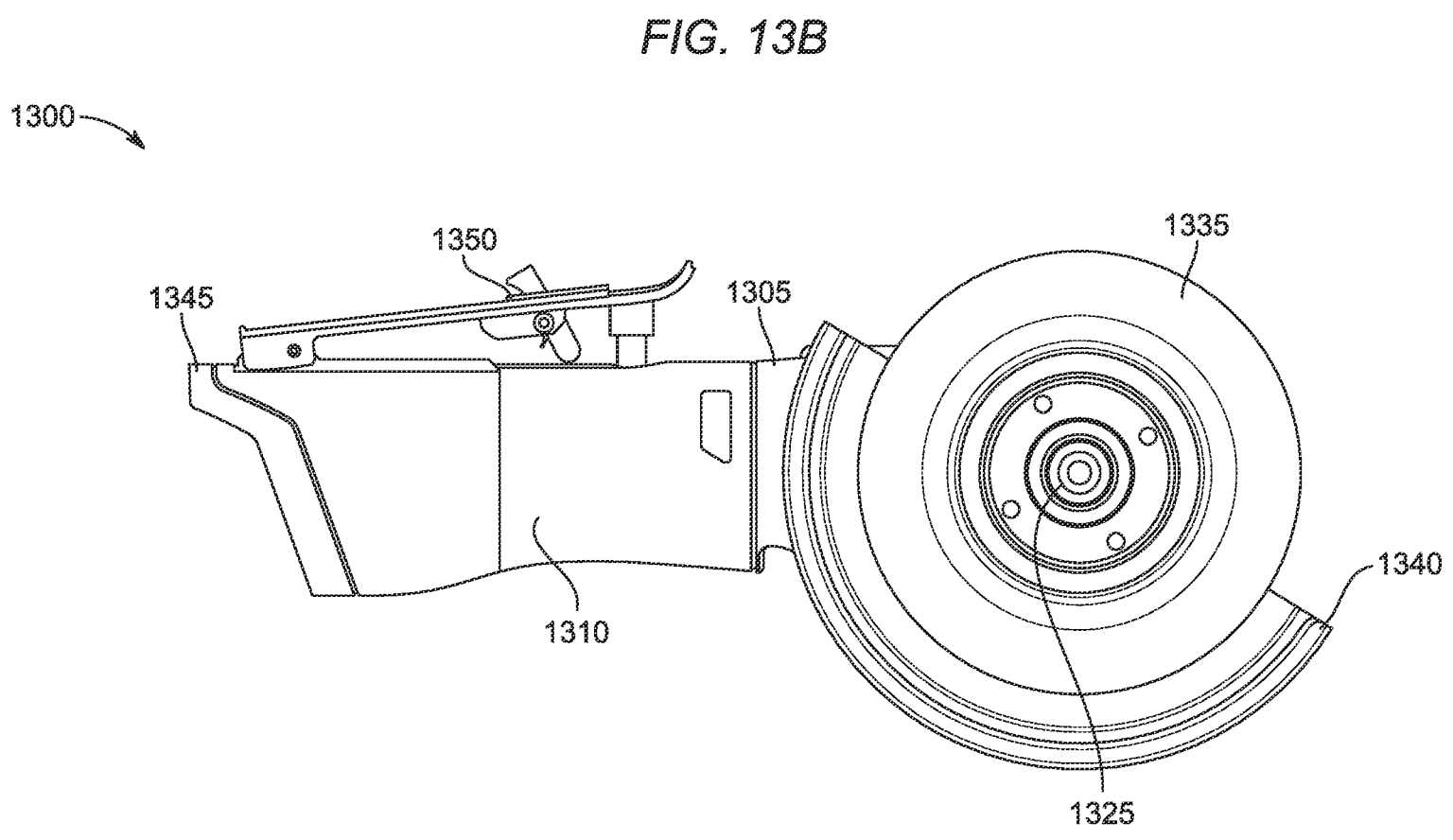

The handle 1310 may contain control electronics for the grinder 1300, and, in some embodiments, a trigger 1350 is attached to the handle 1310 (see, e.g., FIG. 13B). The trigger 1350 is used to control the motor 1315, which receives control signals from a controller 300 (described below and illustrated in FIG. 15) to control the output shaft 1325 and other aspects of the grinder 1300. The trigger 1350 may be positioned on a bottom of the handle 1310 (defined as facing a potential workpiece) or, as illustrated in FIG. 13B, may be positioned on a side of the handle 1310. The controller 300 (e.g., located on a printed circuit board) may be located within the handle 1310. In some embodiments, one or more sensors may also be located within the handle 1310 or in other positions on the grinder 1300. In some embodiments, the motor 1315 is located between the output shaft 1325 and the battery pack receptacle 1345 within the main tool housing 1305.

FIG. 13B is a bottom view of the grinder 1300. As illustrated in FIG. 13B, the output shaft 1325 protrudes downwards, towards a potential workpiece. In some embodiments, the accessory 1335 (e.g., a grinder blade) may be attached to the output shaft 1325 (directly or indirectly through the tool holder 1330). In some embodiments, the guard 1340 is also attached to the output shaft 1325 and extends around at least a portion of the circumference of the accessory 1335. The guard 1340 may be coupled to the output shaft 1325 such that the guard 1340 does not rotate with the output shaft 1325. However, in some embodiments, the guard 1340 is movable (e.g., around the output shaft 1325) to allow an operator to position the guard 1340 at a desired orientation.

Figure 14:
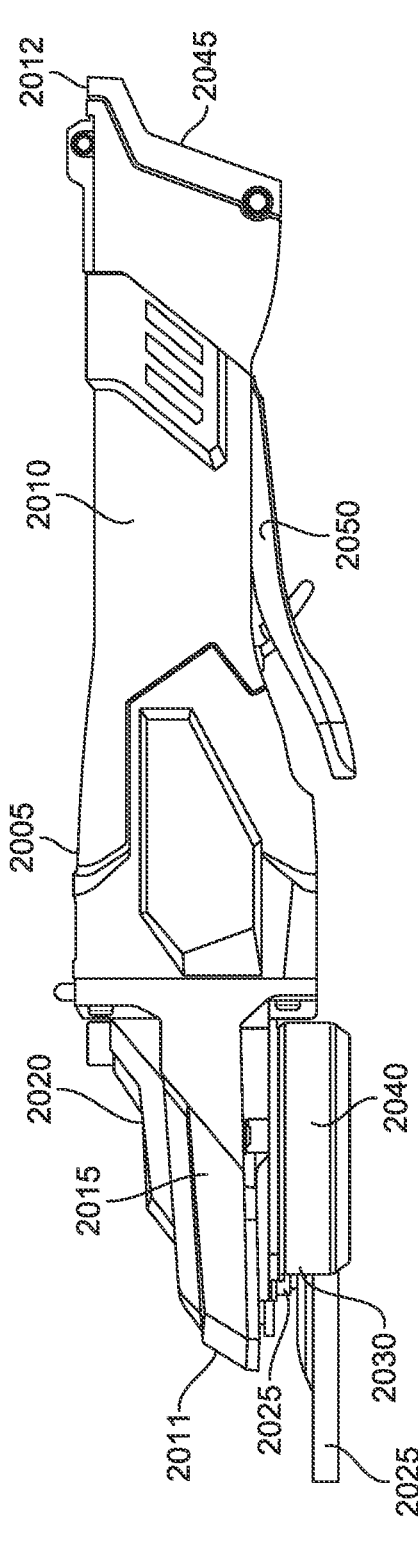
FIG. 14 is a side view of a power tool according to some embodiments.

FIG. 14 illustrates an alternative design for a portable rotary power tool, such as a grinder 2000 configured for one-handed operation. Similar to the grinder 1300, the grinder 2000 includes a main tool housing 2005 and a handle 2010 that extends along the main tool housing 1305 between a first end 2011 (also referred to as a front or work end of the grinder 2000) and a second end 2012 (also referred to as a back or battery end) of the grinder 2000. In some instances, the first end 2011 may include a scaled down flathead form factor. Like the grinder 1300, the handle 2010 may have a grip length of approximately 100 millimeters and may only include a single grip (i.e., without a grip extending radially from the main tool housing 1305). A motor 2015 is located within a motor housing 2020 of the main tool housing 2005. An output shaft 225 is couplable to a tool holder 2030 configured to receive an accessory 2035, similar to the accessory 1335 as previously described. In some embodiments, the grinder 2000 includes a guard 2040 similar to the guard 1340 described above.

The handle 2010 of the grinder 2000 may define a battery pack receptacle 2045, which is positioned on an end of the handle 2010 opposite the motor housing 2020. The battery pack receptacle 2045 is configured to selectively, mechanically, and electrically connect to a rechargeable battery pack (i.e., a power supply) for powering the motor 2015. The battery pack is insertable into or attachable to the battery pack receptacle 2045. The battery pack may include any of a number of different nominal voltages (e.g., 12V, 18V, 24V, 36V, 40V, 48V, etc.), and may be configured having any of a number of different chemistries (e.g., lithium-ion, nickel-cadmium, etc.). In some instances, the battery pack may be configured to operate between 60 Amperes and 90 Amperes. In other instances, the battery pack may be configured to operate between 35 Amperes and 40 Amperes. In some instances, the grinder 2000 operates at a power level of between 600 Watts and 800 Watts. In other instances, the grinder operates at a power level of between 375 Watts and 475 Watts. In some embodiments, the motor 2015 may be powered by a remote power source (e.g., an AC electrical outlet) through a power cord and a power interface of the grinder 2000 in addition to or as an alternative to receiving power from an attached battery pack.

The handle 2010 may contain control electronics for the grinder 2000, and, in some embodiments, a trigger 2050 is attached to the handle 1310. In some examples, the trigger 25 is a dual actuation paddle trigger. Similar to the previously described trigger 1350, the trigger 2050 is used to control the motor 2015, which receives control signals from a controller 300 to control the output shaft 225 and other aspects of the grinder 2000. The controller 300 (e.g., located on a printed circuit board) may be located within the handle 2010. In some embodiments, one or more sensors may also be located within the handle 2010 or in other positions on the grinder 2000. In some embodiments, the motor 1315 is located between the output shaft 225 and the battery pack receptacle 2045, and beneath the trigger 2050 within the main tool housing 2005. As noted for the grinder 1300, the trigger 2050 may be positioned on a bottom of the main tool housing 2005 or a side of the main tool housing 2005.

Figure 15:
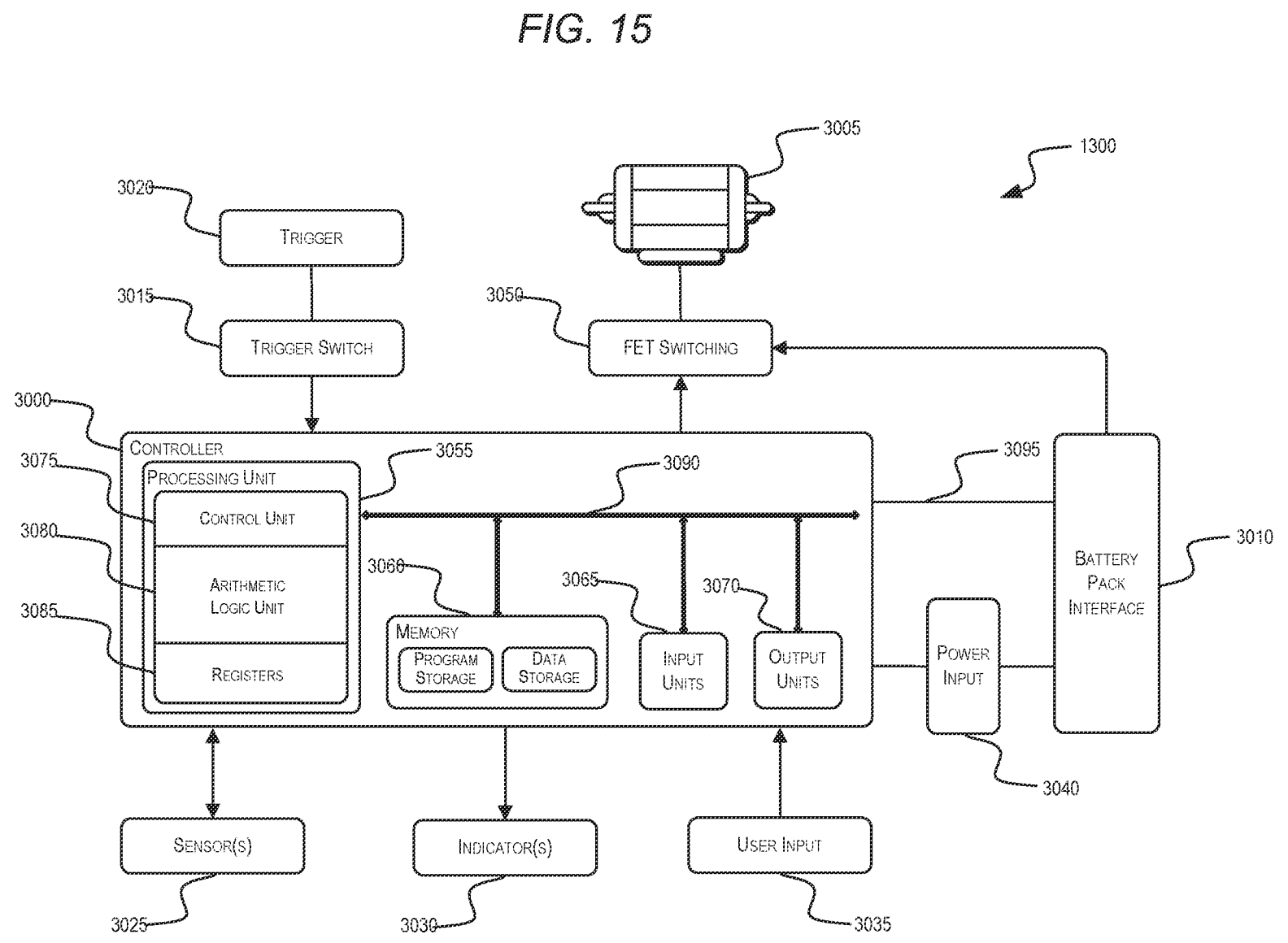

FIG. 15 illustrates a control system for the grinder 1300 or 2000. The control system includes a controller 3000. The controller 3000 is electrically and/or communicatively connected to a one or more modules or components of the grinder 1300 or 2000. For example, the illustrated controller 3000 is electrically connected to a motor 3005 (e.g., motor 1315 or 2015), a battery pack interface 3010, a trigger switch 3015 (connected to a trigger 3020), one or more sensors or sensing circuits 3025, one or more indicators 3030, a user input module 3035, a power input module 3040, and a FET switching module 3050 (e.g., including a plurality of switching FETs). The controller 3000 includes combinations of hardware and software that are operable to, among other things, control the operation of the grinder 1300 or 2000, monitor the operation of the grinder 1300 or 2000, activate the one or more indicators 3030 (e.g., an LED), etc.

The controller 3000 includes a plurality of electrical and electronic components that provide power, operational control, and protection to the components and modules within the controller 3000 and/or the grinder 1300 or 2000. For example, the controller 3000 includes, among other things, a processing unit 3055 (e.g., a microprocessor, a microcontroller, an electronic processor, an electronic controller, or another suitable programmable device), a memory 3060, one or more input units 3065, and one or more output units 3070. The processing unit 3055 includes, among other things, a control unit 3075, an arithmetic logic unit ("ALU") 3080, and a plurality of registers 3085, and is implemented using a known computer architecture (e.g., a modified Harvard architecture, a von Neumann architecture, etc.). The processing unit 3055, the memory 3060, the input units 3065, and the output units 3070, as well as the various modules or circuits connected to the controller 3000 are connected, such as, for example, by one or more control and/or data buses (e.g., common bus 3090). The use of one or more control and/or data buses for the interconnection between and communication among the various modules, circuits, and components would be known to a person skilled in the art in view of the embodiments described herein.

The memory 3060 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 3055 is connected to the memory 3060 and executes software instructions that are capable of being stored in a RAM of the memory 3060 (e.g., during execution), a ROM of the memory 3060 (e.g., on a generally permanent basis), or another non-transitory computer readable medium such as another memory or a disc. Software included in the implementation of the grinder 1300 can be stored in the memory 3060 of the controller 3000. The software includes, for example, firmware, one or more applications, program data, filters, rules, one or more program modules, and other executable instructions. The controller 3000 is configured to retrieve from the memory 3060 and execute, among other things, instructions related to the control processes and methods described herein. In other constructions, the controller 3000 includes additional, fewer, or different components.

The motor 3005 includes a rotor and a stator that surrounds the rotor. In some embodiments, the motor 3005 is a brushless direct current ("BLDC") motor in which the rotor is a permanent magnet rotor and the stator includes coil windings that are selectively energized to drive the rotor. In other embodiments, the motor is a brushed motor. The stator is supported within the main tool housing 1305 or 2005 and remains stationary relative to the main tool housing 1305 or 2005 during operation of the grinder 1300 or 2000. The rotor is rotatably fixed to a rotor shaft and configured to rotate with the rotor shaft, relative to the stator, about a motor axis. A portion of the rotor shaft is associated with or corresponds to the output shaft 1325 or 225 extending from the main tool housing 1305 or 2005. In some embodiments, the motor 3005 is an outer rotor motor.

The battery pack interface 3010 includes a combination of mechanical components (e.g., rails, grooves, latches, etc.) and electrical components (e.g., one or more terminals) configured to and operable for interfacing (e.g., mechanically, electrically, and communicatively connecting) the grinder 1300 or 2000 with a battery pack. For example, power provided by the battery pack to the grinder 1300 or 2000 is provided through the battery pack interface 3010 to the power input module 3040. The power input module 3040 includes combinations of active and passive components to regulate or control the power received from the battery pack prior to power being provided to the controller 3000. The battery pack interface 3010 also supplies power to the FET switching module 3050 to provide power to the motor 3005. The battery pack interface 3010 also includes, for example, a communication line 395 for provided a communication line or link between the controller 3000 and the battery pack.

The indicators 3030 include, for example, one or more light-emitting diodes ("LEDs"). The indicators 3030 can be configured to display conditions of, or information associated with, the grinder 1300 or 2000. For example, the indicators 3030 are configured to indicate measured electrical characteristics of the grinder 1300 or 2000, the status of the grinder 1300 or 2000, etc. The user input module 3035 is operably coupled to the controller 3000 to, for example, select a forward mode of operation or a reverse mode of operation, a torque and/or speed setting for the grinder 1300 or 2000 (e.g., using torque and/or speed switches), etc. In some embodiments, the user input module 3035 includes a combination of digital and analog input or output devices required to achieve a desired level of operation for the grinder 1300 or 2000, such as one or more knobs, one or more dials, one or more switches, one or more buttons, etc.

The controller 3000 is configured to determine whether a fault condition of the grinder 1300 or 2000 is present and generate one or more control signals related to the fault condition. The controller 3000 may use input provided via the sensing circuits 3025 to determine whether a fault condition is present. In some embodiments, the sensing circuits 3025 include one or more current sensors, one or more speed sensors, one or more Hall Effect sensors, one or more temperature sensors, an accelerometer, a gyroscope, an inertial measurement unit ["IMU"], one or more pressure sensors, one or more object presence sensors, etc., or a combination thereof. The controller 3000 calculates or includes, within memory 3060, predetermined operational threshold values and limits for operation of the grinder 1300 or 2000. For example, in response to detecting or predicting a potential thermal failure (e.g., of a FET, the motor 3005, etc.), the controller 3000 may limit or interrupt power to the motor 3005 until the potential for thermal failure is reduced. In response to detecting one or more such fault conditions of the grinder 1300 or 2000 or detecting that a previously-detected fault condition of the grinder 1300 or 2000 no longer exists, the controller 3000 may be configured to provide information and/or control signals to another component of the grinder 1300 or 2000 (e.g. the battery pack interface 3010, the indicators 3030, etc.).

Figure 16:
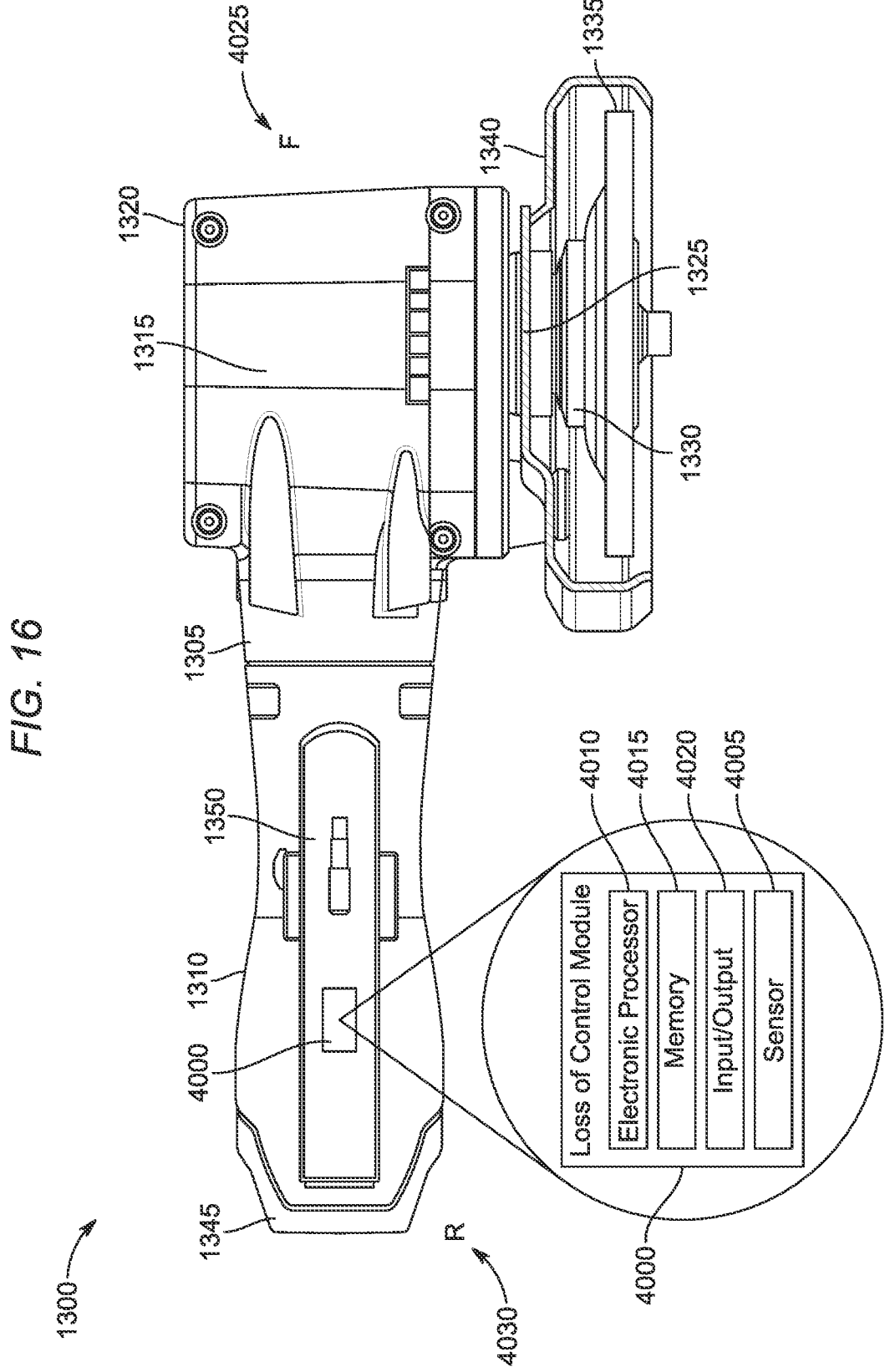
FIG. 16 illustrates the power tool of FIGS. 13A and 13B including a loss of control module, according to some embodiments.

In some embodiments, the controller 3000 or a separate controller included in the grinder 1300 or 2000 detects loss of control of the grinder 1300 or 2000, such as, for example, based on input provided via one or more of the sensing circuits 3025. For example, FIG. 16 illustrates the grinder 1300 including a loss of control module 4000, according to some aspects. It should be understood that the grinder 2000 may include a similar loss of control module 4000 and although some methods described herein may be described with respect to the grinder 1300, the methods may be similarly performed via the grinder 2000 or other types of power tools. The loss of control module 4000 includes a sensor 4005 (e.g., an accelerometer, a gyroscope, an inertial measurement unit ["IMU"]) and is configured to detect linear and/or rotational motion of the grinder 1300. In some examples, the loss of control module 4000 is located within the handle 1310 of the grinder 1300, and includes an electronic processor 4010, a memory 4015, and an input/output interface 4020 similar to those as previously described. In this example, the loss of control module 4000 is configured to communicate with controller 3000. In other examples, the loss of control module 4000 is integrated with the controller 3000 and uses some of the components of the controller 3000 described above.

In some instances, the loss of control module 4000 (or the sensor 4005, or a printed circuit board included in the module 4000 containing the sensor 4005) is angled with respect to a normal operating plane of the grinder 1300. In this configuration, the sensor 4005 is operable to generate output signals that include both an X-component and a Y-component. These features are illustrated in FIGS. 5-8 and described below. In some examples, multiple sensors are used to obtain the X-component and a Y-component information. For illustrative purposes, the grinder 1300 of FIG. 16 is shown including a front 4025 portion and a rear 4030 portion, with the motor 1315 and the accessory 1335 located at the front 4025 of the grinder 1300. When the operator of the grinder 1300 moves the grinder across a workpiece, the loss of control module 4000 uses the sensor 4005 to detect the linear motion of the grinder 1300. The linear motion may be described as a forward motion or a reverse motion with respect to a workpiece. In other examples, the linear motion may be described as lateral to the workpiece. If the linear motion, as detected by the sensor 4005, exceeds a predetermined linear threshold, a loss of control event is determined. In some embodiments, when the loss of control event is determined, the grinder 1300 is configured to control the motor 1315, such as, for example, stop the motor 1315.

The sensor 4005 may additionally be configured to generate output signals that include a rotational component associated with a rotational motion of the grinder 1300. The rotational motion of the grinder 1300 may be described as a revolution of the grinder 1300 about a central axis, the central axis extending from the front 4025 to the rear 4030 of the grinder 1300. Alternatively or additionally, the rotational motion of the grinder 1300 may be described as a revolution of the grinder 1300 about a fixed reference point. For instance, the fixed reference point may be located at the front 4025 of the grinder 1300, near the accessory 1335. In another instance, the fixed reference point may be located at the rear 4030 of the grinder 1300, near the battery pack receptacle 1345, also referred to as the battery foot. These features are illustrated in FIGS. 5-8 and described below. If the rotational motion, as detected by the sensor 4005, exceeds a predetermined rotational threshold, a loss of control event is determined. As previously mentioned, when the loss of control event is determined, the grinder 1300 is configured to control the motor 1315. In some instances, the predetermined linear threshold and the predetermined rotational threshold are the same threshold. In other instances, the predetermined linear threshold and the predetermined rotational thresholds are different thresholds. In some examples, there may be multiple linear thresholds and/or multiple rotational thresholds. The methods by which the loss of control module 4000 controls the motor 1315 are illustrated in FIGS. 9-10 and described below.

In some instances, the loss of control module 4000 periodically samples the sensor 4005 to obtain linear and/or rotational motion data. For example, instead of continuously monitoring the linear motion of the grinder 1300, the loss of control module 4000 may only receive data from the sensor 4005 while the motor 1315 is operational and at a predetermined sampling rate. In some instances, the loss of control module 4000 may only receive data from the sensor 4005 when the motor 1315 is engaged with a workpiece. For example, the sensing circuits 3025 may be a current sensor connected to the motor 1315 and configured to monitor motor current. When a motor current detected by the sensing circuits 3025 exceeds a current threshold, the controller may determine that the motor 1315 is engaged with a workpiece. In some examples, the loss of control module 4000 is configured to use the detected linear motion of the grinder 1300 to determine the angular acceleration of the grinder 1300.

Figure 17:
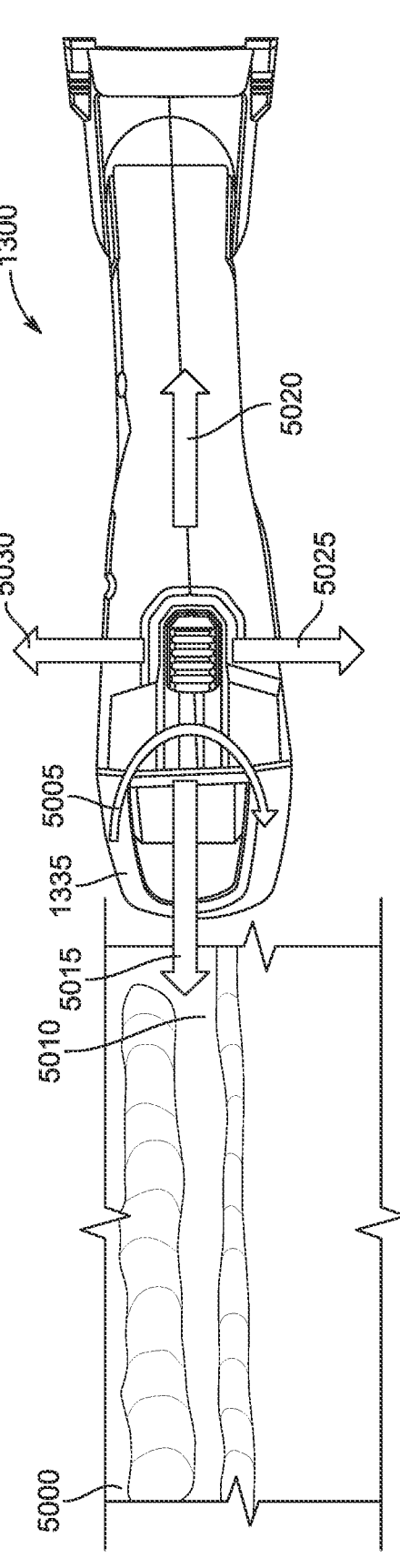
FIG. 17 illustrates the power tool of FIG. 16, according to some embodiments.

The one or more loss of control functions implemented via the loss of control module 4000 (described below with respect to FIGS. 21-22) may monitor (e.g., via the sensor 4005) movement of the grinder 1300 or 2000 in one or more directions. FIGS. 5-8 illustrate movement of the grinder 1300. Again, it should be understood that the grinder 2000 may be moved in similar directions as the grinder 1300 although separate illustrations of the grinder 2000 are not included herein for sake of brevity. For example, FIG. 17 illustrates the grinder 1300 proximate a workpiece 5000, which defines a plane of operation 510 of the grinder 1300 (e.g., a plane of grinding operation or application). It should be understood that the grinder 1300 may be engaged with any number of workpieces in any number or orientations, dimensions, or planes. The accessory 1335 of the grinder 1300 is actively engaged (e.g., in a clockwise direction 505) with the workpiece 5000, and while engaged with the workpiece 500 may be moved along the plane 5010 of the workpiece 5000 in two directions. As the grinder 1300 is moved along the plane 5010, the sensor 4005 detects the linear motion in a first linear direction 515 and a second linear direction 5020, which may be understood as the X-component and may represent forward and backward movement of the grinder 1300. The sensor 4005 also detects the linear motion a third linear direction 5025 and a fourth linear direction 5030, which may be understood as the Y-component and may represent lateral movement of the grinder 1300. The sensor 4005 may generate and output a single signal representing the detected X-component and the detected Y-component (e.g., a motion vector for the grinder 1300). As described below, in some embodiments, in response to the magnitude of the motion vector exceeding a predetermined linear threshold, the loss of control module 4000 may determine that the operator has experienced a loss of control of the grinder 1300. In other embodiments, the sensor 4005 may generate and output separate signals representing the detected X-component and the detected Y-component. As noted above, in some embodiments, sensor 4005 includes an accelerometer.

Figure 18:
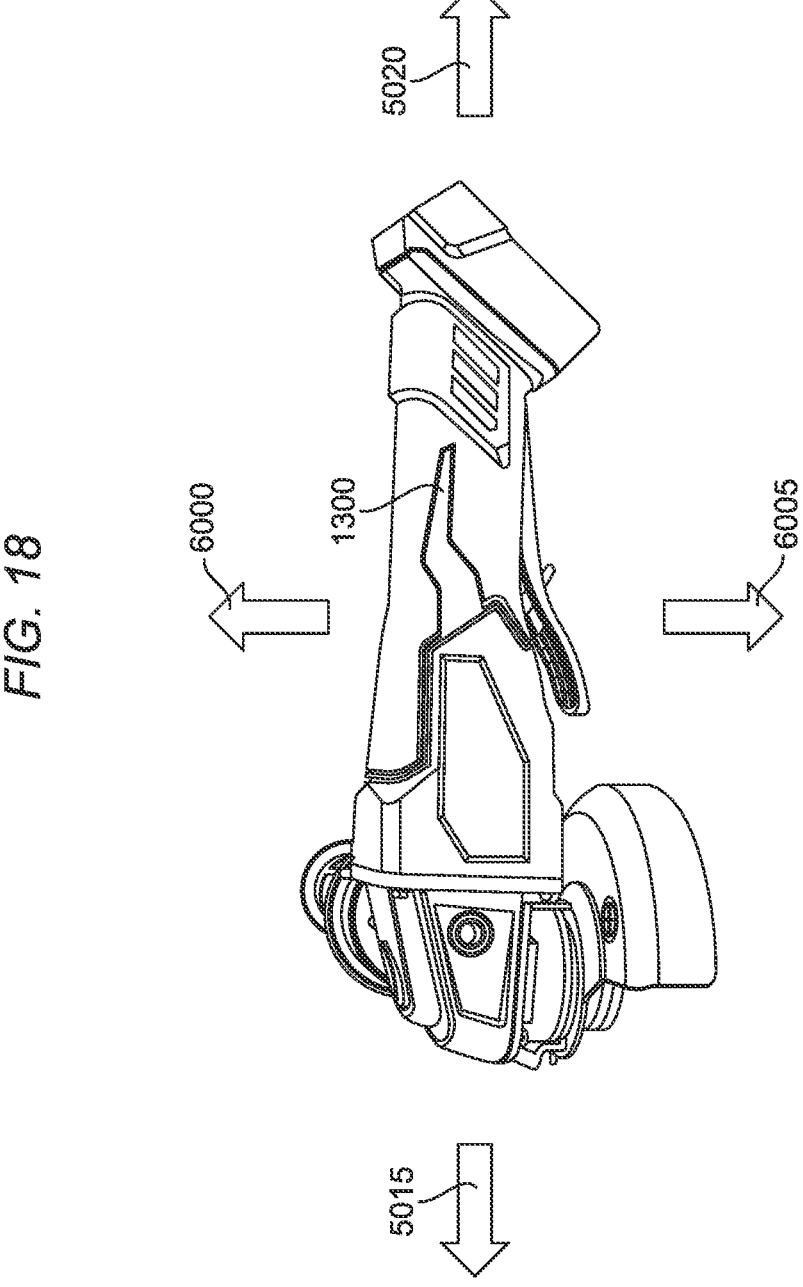
FIG. 18 illustrates the power tool of FIG. 16, according to some embodiments.

FIG. 18 illustrates the grinder 1300 moving in a fifth linear direction 6000 and a sixth linear direction 6005, which may be understood as a Z-component, which may represent linear movement of the grinder 1300 into or away from the workpiece 5000 (i.e., away or into the plane 510). For example, if the operator of the grinder 1300 lifts the grinder off the workpiece 500, the sensor 4005 detects motion in the fifth linear direction 6000. Likewise, if the operator of the grinder 1300 pushes through the workpiece 5000, the sensor 4005 detects motion in the sixth linear direction 6005. The first linear direction 5015, second linear direction 5020, third linear direction 5025, fourth linear direction 5030, fifth linear direction 6000, and sixth linear direction 6005 should all be understood as six possible directions of motion in a Cartesian coordinate (e.g., X-Y-Z-components) system.

Figure 19:
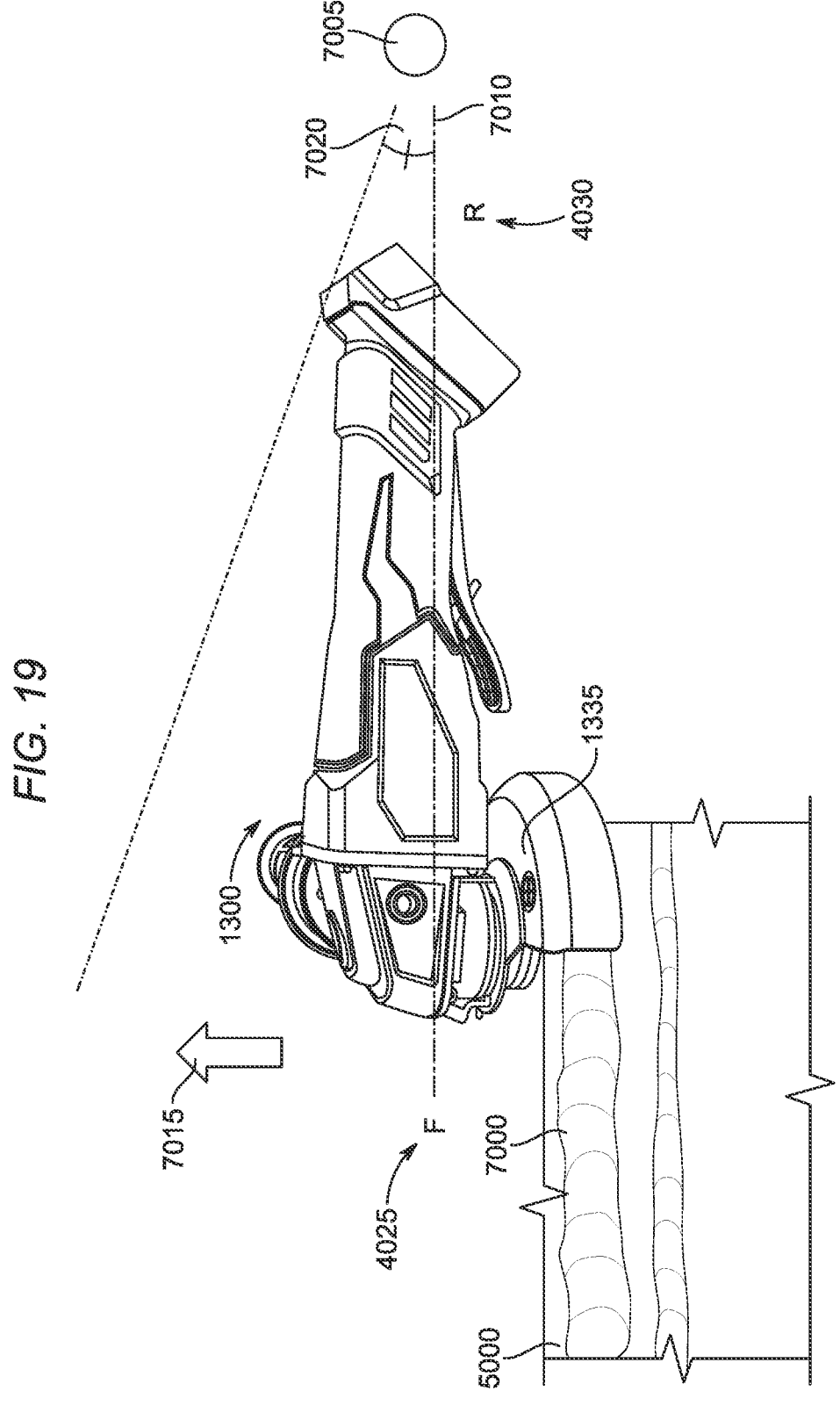
FIG. 19 illustrates the power tool of FIG. 16, according to some embodiments.

In addition to moving linearly away from or into the plane 5010 (i.e., up or down from the plane 5010), the grinder 1300 may rotate toward or away from the plane 5010 (i.e., angular rotation of the grinder 1300 about a point of reference). For example, FIG. 19 illustrates the grinder 1300 positioned proximate the workpiece 5000, with the accessory 1335 engaged with the workpiece 5000 and configured to move along a plane 7000 of the workpiece 5000. As the operator of the grinder 1300 engages with the workpiece 5000, the grinder 1300 may pivot (e.g., angularly rotate) around a reference point 7005 located at the rear 4030 of the grinder 1300, which may be positioned along a central axis 7010 of the grinder 1300 and defined by the battery foot, in a first rotational direction 7015 away from the workpiece 5000. This motion is detected and measured by the sensor 4005 as an angle of rotation, such as first rotational angle 7020. For example, as described above, the sensor 4005 may include a gyroscope configured to detect angular rotation.

Although only one angle of rotation is illustrated, it should be understood that there are many possible angles of rotation around the reference point 7005. For example, similar to the linear motion of the grinder 1300, the grinder 1300 may "pitch" around the reference point 7005, which may be understood as an X-component of rotational motion. The grinder 1300 may also "yaw" around the reference point 7005, which may be understood as the Y-component of rotational motion. The grinder 1300 may also "roll" around the reference point 7005, which may be understood as the Z-component of rotational motion. The reference point may be located on the grinder 1300, within the grinder 1300, or a distance away from the main tool housing of the grinder 1300.

Figure 20:
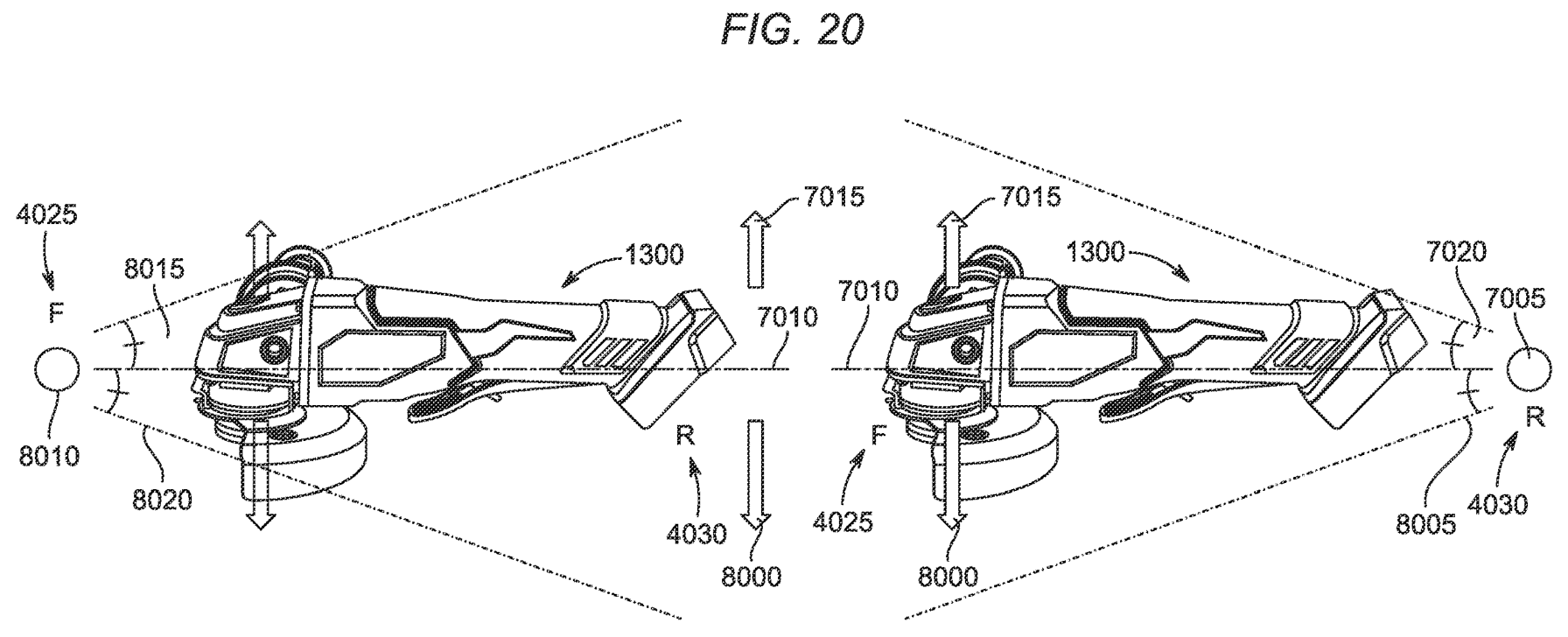

For example, FIG. 20 illustrates additional angles of rotation and reference points for the grinder 1300, according to some embodiments. As previously described, the grinder 1300 includes the reference point 7005 about which the grinder 1300 may rotate in the first rotational direction 7015. The grinder 1300 may also rotate in a second direction 8000, opposite the first rotational direction 7015, which is detected and measured by the sensor 4005 as a second rotational angle 8005. The first rotational direction 7015 and the second rotational angle 8005 are generally understood as the "roll," or Z-component, of the rotational motion of the grinder 1300.

In another instance, a second fixed reference point 8010 is located at the front 4025 of the grinder 1300. The grinder 1300 may similarly pivot roll around the second fixed reference point 8010. The sensor 4005 detects different rotational motions based upon the on the location of the reference point relative to the grinder 1300. For example, as the grinder 1300 rolls around the second fixed reference point 8010, the sensor 4005 detects a third rotational angle 815 and/or a fourth rotational angle 8020. The sensor 4005 then generates a signal that includes a motion vector, including angular acceleration, for the grinder 1300. If the magnitude of the motion vector exceeds the predetermined rotational threshold, the loss of control module may determine that the operator has experienced a loss of control of the grinder 1300. In some instances, both linear and rotational motion are detected and monitored for the loss of control condition simultaneously. In some instances, rotational motion is monitored prior to linear motion of the grinder 1300.

As noted above, the loss of control module 4000 may use detected movement of the grinder 1300 or 2000 to detect a loss of control event. For example, FIG. 21 is a flowchart illustrating a method 9000 for detecting a loss of control condition of the grinder 1300. The method 9000 may be performed by the loss of control module 4000 (e.g., the electronic processor 4010). However, it should be understood that the functionality described herein may be distributed among multiple modules or control units. For example, the functionality described herein with respect to the method 9000 may be performed by the loss of control module 4000 and the controller 3000. Also, although the method 9000 is described herein with respect to the grinder 1300, a similar method may be implemented for the grinder 2000.

As illustrated in FIG. 21, in response to detecting operation of the trigger (which the user activates to initiates or start use of the grinder 1300) (at block 9005), the motor 1315 included in the grinder 1300 is started to allow the grinder 1300 to be used on a workpiece. During operation of the motor, the method 9000 includes detecting linear acceleration of the grinder 1300 (e.g., the housing) (at block 9010) via the sensor 4005 (e.g., an accelerometer). The linear acceleration may be detected in a working plane parallel to a working surface. The loss of control module 4000 receives a signal from the sensor 4005 representing the linear acceleration as detected and compares the linear acceleration to a predetermined linear threshold (at block 9015). In response to the detected linear acceleration exceeding the predetermined linear threshold (at block 9015), the loss of control module 4000 detects a loss of control event and reduces power to the motor 1315 (at block 9020). In some embodiments, the loss of control module 4000 reduces power to the motor 1315 by stopping (i.e., braking) the motor 1315. However, in other embodiments, power to the motor 1315 is reduced without stopping the motor 1315.

Blocks 9010 through 9020 of the method 9000 represent one loss of control detection method. In some embodiments, the grinder 1300 may implement this loss of control detection method as the sole loss of control detection method. However, in other embodiments, the grinder 1300 may implement multiple loss of control detection methods. For example, as illustrated in FIG. 21, in some embodiments, the method 9000 combines multiple loss of control detection functions. When implementing multiple loss of control detection functions, the loss of control module 4000 may implement the functions in parallel or in series. For example, FIG. 21 illustrates two detection functions implemented in series wherein linear acceleration is used to check for loss of control before using angular rotation to check for loss of control. However, it should be understood that a different operation of serial implementation may be used in various embodiments. Also, in some embodiments, the grinder 1300 may be configured to implement multiple loss of control functions and may select one or more functions to activate or use based on operating parameters or conditions of the grinder 1300. For example, in some embodiments, in some embodiments, the grinder 1300 may use one of the detection functions (e.g., the linear acceleration function described with respect to blocks 9010 through 9020) when operation of the grinder 1300 is initial started (e.g., within a predetermine time after the motor is started or the trigger is actuated) and may use a different detection function (e.g., the angular acceleration function described below) after the initial starting time period. The grinder 1300 may also use one or more battery characteristics to select a loss of control function to activate. For example, the grinder 1300 may select (activate) a more sensitive loss of control function in response to the battery pack having a low state of charge (e.g., a charge below a predetermined level of charge). Also, in some embodiments, the grinder 1300 may select one or more loss of control functions to implement based on one or more user inputs. For example, a user may be able to activate one or more desired loss of control functions (and deactivate one or more loss of control functions). Similar to selecting a particular loss of control function to activate, the grinder 1300 may select one or more parameters of a particular loss of control function (e.g., threshold values, accumulator values, etc.), such as, for example, based on operating parameters or conditions, user inputs (including battery characteristics), or the like.

As illustrated in FIG. 21, in embodiments where two loss of control functions are implemented serially, in response to the linear acceleration not exceeding the predetermined linear first threshold, angular rotation of the grinder 1300 is detected (at block 9025). As described above, the angular rotation of the grinder 1300 may be detected via a gyroscope included in the grinder 1300 and may be measured with respect to the point of reference, which may be defined based on a battery foot of the grinder 1300. The loss of control module 4000 receives a signal from the sensor 4005 representing the angular rotation as detected and compares the angular rotation to a predetermined rotational threshold (at block 9030). In response to the detected angular rotation exceeding the predetermined rotational threshold (at block 930), the loss of control module 4000 detects a loss of control event and reduces power to the motor 1315 (at block 9035). In some embodiments, the loss of control module

4000 reduces power to the motor 1315 by stopping (i.e., braking) the motor 1315. However, in other embodiments, power to the motor 1315 is reduced without stopping the motor 1315. As illustrated in FIG. 21, in response to the angular rotation of the grinder 1300 not exceeding the predetermined rotational threshold (at block 9030), the method 9000 restarts to continue to check for a loss of control event.

As noted above, in some instances, both linear acceleration and angular rotational motion are detected and monitored to detect a loss of control event and these conditions may be checked in parallel or serially (in various sequences). However, as also noted above, in other instances, the grinder 1300 may implemented only a single loss of control function.

In some embodiments, as described above with respect to FIG. 21, a loss of control event may be detected by comparing detected motion of the grinder 1300 (e.g., linear acceleration, angular rotation, or both) to a predetermined threshold. In some instances, the loss of control module 4000 may use multiple predetermined thresholds. For instance, the loss of control module 4000 may control the motor 1315 to reduce the motor speed based upon a first predetermined threshold being satisfied and may control the motor 1315 to stop the motor based upon a second predetermined threshold being satisfied. The loss of control module 4000 may also be configured to generate a warning signal output by one or more indicators 3030 when a loss of control event is detected (or based on one or more thresholds being satisfied). Similarly, in some embodiments, the loss of control module 4000 may be configured to store, e.g., in memory, the number of times motion of grinder 1300 exceeds one or more thresholds, wherein the loss of control module 4000 may use the tracked number of times to control the motor 1315 (e.g., reduce or brake the motor 1315 in response to the number of times exceeding a predetermined number). In some instances, after the motor 1315 is stopped (at blocks 9020 or 9035), the motor 1315 will remain stopped until the trigger switch 3015 is cycled by the operator releasing and re-actuating the trigger 3020.

Figure 22:
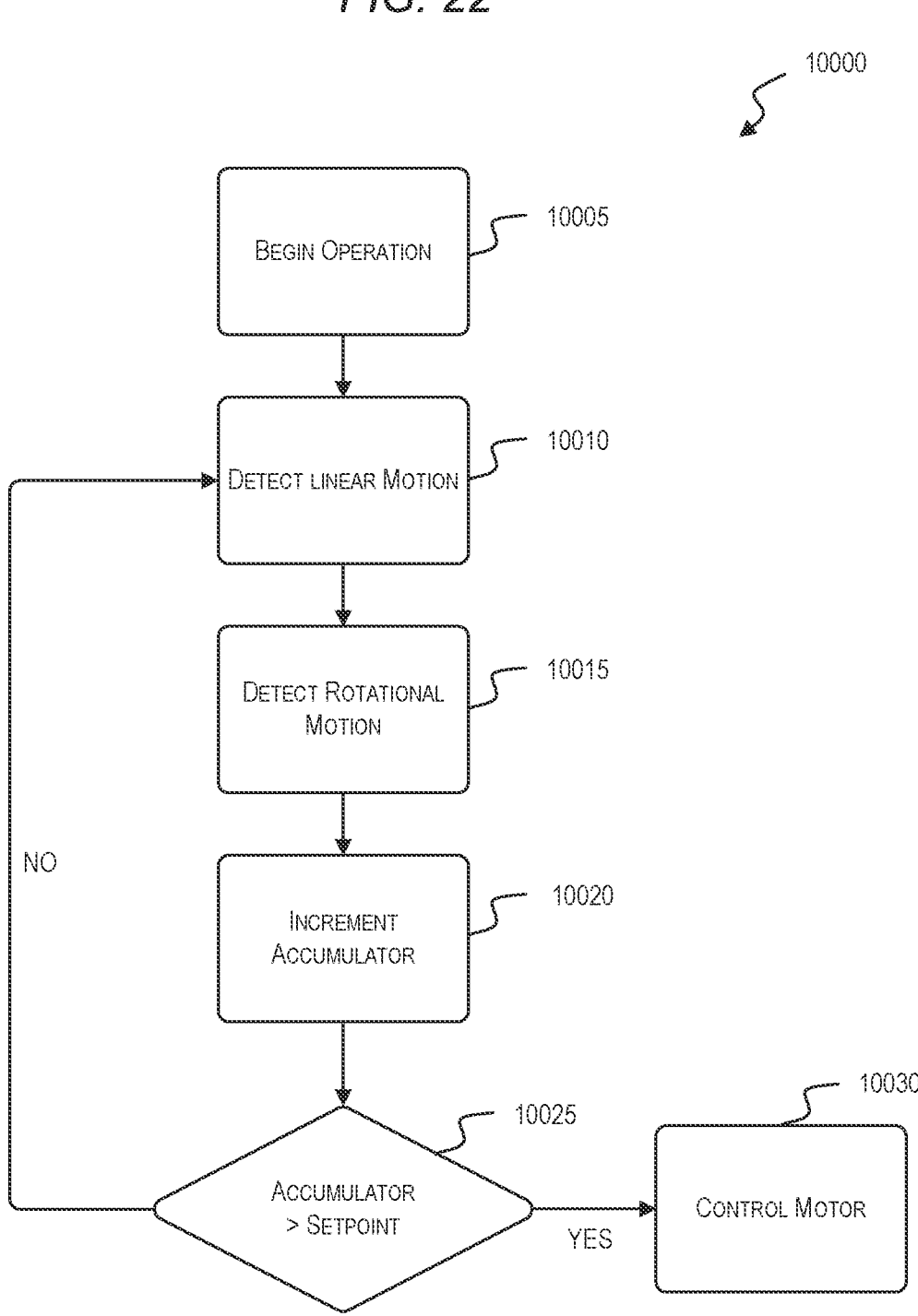
FIG. 22 is a flowchart illustrating a method of controlling a power tool, according to some embodiments.

Also, in some embodiments, detected motion of the grinder may be compared to a threshold and, in response to the motion exceeding or satisfying the threshold, a value may be added to an accumulator, wherein the accumulator is compared to a setpoint to determine whether a loss of control event has been detected. Also, in some embodiments, different thresholds may be associated with different values that are added to the accumulator to provide for more precise control (e.g., large amounts of motion may cause larger values to the added to the accumulator as compared to smaller amounts of detected motion). For example, FIG. 22 is a flowchart illustrating a method 10000 for detecting a loss of control condition of the grinder 1300 using an accumulator and multiple thresholds. The method 10000 may be performed by the loss of control module 4000 (e.g., the electronic processor 4010). However, it should be understood that the functionality described herein may be distributed among multiple modules or control units. For example, the functionality described herein with respect to the method 1000 may be performed by the loss of control module 4000 and the controller 3000. Also, although the method 10000 is described herein with respect to the grinder 1300, a similar method may be implemented for the grinder 2000. Also, although the method 10000 is described with respect to two loss of control functions sharing one accumulator, separate accumulators may be used (e.g., one for each loss of control function).

As illustrated in FIG. 22, in response to detecting operation of the trigger (which the user activates to initiates or start use of the grinder 1300) (at block 10005), the motor 1315 included in the grinder 1300 is started to allow the grinder 1300 to be used on a workpiece. During operation of the motor, the method 10000 includes detecting linear acceleration of the grinder 1300 (e.g., the housing) (at block 10010) via the sensor 4005 (e.g., an accelerometer). The linear acceleration may be detected in a working plane parallel to a working surface. The loss of control module 4000 receives a signal from the sensor 4005 (e.g., an accelerometer) representing the linear acceleration as detected.

As method 10000 represents implementing two loss of control functions (i.e., linear acceleration and angular rotation), the loss of control module 4000 also receives a signal from the sensor 4005 (e.g., a gyroscope) representing angular rotation of the grinder 1300 measured with respect to the point of reference, which may be defined based on a battery foot of the grinder 1300 (at block 10015). The loss of control module 4000 uses both the detected linear acceleration and the detected angular rotation to increment an accumulator (at block 10020). For instance, in response to the linear acceleration exceeding a first threshold, the loss of control module 4000 may add a first value to the accumulator. Similarly, in response to the angular rotation exceeding a second threshold, the loss of control module 4000 adds a second value to the accumulator. The first and second values may be the same or may be different.

In some instances, the value added to the accumulator may differ based on the detected motion of the grinder 1300. For example, the increment amount may be larger for higher sensor outputs, such as those associated with a large amount of motion, and smaller for lower sensor outputs, such as those associated with smaller amounts of motion. In particular, a loss of control function may be associated with a plurality of thresholds, wherein each threshold may be associated with an assigned increment value, which may vary for each threshold. For example, using the linear acceleration loss of control function, detected linear acceleration may be compared to one or more thresholds to determine what (if any) increment value should be added to the accumulator. In particular, the loss of control module 4000 may compare a detected linear acceleration value to a first threshold (which may represent a highest threshold associated with the highest increment value). In response to the linear acceleration satisfying (e.g., exceeding) the first threshold, the loss of control module 4000 adds the increment value or count associated with the first threshold to the accumulator. However, in response to the linear acceleration not satisfying the first threshold, the loss of control module 4000 compare the detected linear acceleration to a second threshold, wherein the second threshold is associated with a second increment count different than the first increment count. In response to the linear acceleration satisfying the second thresholds, the loss of control module 4000 adds the second increment count to the accumulator (counter). It should be understood that, when implementing multiple loss of control functions, the loss of control module 4000 may use a plurality of thresholds and increment counts for each of the plurality of control functions or only a subset of control functions. For example, in some embodiments, the loss of control module 4000 may use a plurality of thresholds for the linear acceleration loss of control function but may use a single threshold (and single associated increment value) for the angular rotation loss of control function (or vice versa). Similarly, when using multiple thresholds for multiple loss of control functions, each loss of control function may have different threshold value, different numbers of thresholds, different increment values, or a combination thereof.

Returning to FIG. 22, the loss of control module 4000 (after making any needed increments to the accumulator based on the detected linear acceleration, detected angular rotation, or both) compare the accumulator to a predetermined setpoint (at block 10025). In response to the accumulator exceeding the predetermined setpoint (at block 10025), the loss of control module 4000 detects a loss of control event and reduces power to the motor 1315 (at block 10035). In some embodiments, the loss of control module 4000 reduces power to the motor 1315 by stopping (i.e., braking) the motor 1315. However, in other embodiments, power to the motor 1315 is reduced without stopping the motor 1315. After reducing power to the motor 1315, the motor 1315 may return to normal operation after cycling of the trigger.

As illustrated in FIG. 22, in response to the accumulator not exceeding the predetermined setpoint (at block 10025), the method 10000 restarts to continue to check for a loss of control event. Also, in some instances, the accumulator may be decremented in response to various conditions (e.g., detected motion not satisfying any applicable thresholds for one or a predetermined number of cycles).

As noted above, multiple loss of control functions may provide input to a shared accumulator value or separate accumulator values may be used wherein when any one accumulator value satisfies a corresponding threshold, a loss of control event may be detected, and the motor may be controlled accordingly. Also, in some embodiments, an accumulator value may be compared to multiple setpoints, wherein different setpoints are associated with different responses (e.g., control indicator, reduce motor speed, brake motor, etc.). Also, as noted above, aspects of the loss of control functions (including what one or more functions to activate) as well as what thresholds, increment values, setpoints, or a combination thereof may be automatically determined by the loss of control function based on operating conditions or parameters of the grinder 1300, battery characteristics, user inputs, or a combination thereof.

The electronics and components used with the loss of control functions described above may similarly be used to detect a kickback or bind-up condition. For example, the grinder 1300 or 2000 (e.g., the controller 3000, the loss of control module 4000, a separate control module, or a combination thereof) may be configured to detect a stall condition of the accessory 1335 or 2035, the output shaft 1325 or 2025, or other power rotated component of the grinder 1300 or 2000. For example, a stall condition occurs when the accessory 1335 or 2035 becomes bound in a workpiece, which causes the grinder 1300 or 2000 (e.g., a housing of the grinder 1300 or 2000) to rotate. The stall condition can be detected based on parameters of the motor 1315 or 2015 (e.g., motor current, Hall effect sensor position monitoring, sensorless monitoring, etc.), which may be sensed via the sensing circuits 3025, the sensor 4005, or a combination thereof. In other embodiments, the sensor 4005, which, as noted above, may include an accelerometer, can be used to detect the stall condition. When the stall condition is detected, the grinder 1300 or 2000 may be configured to stop motor operation (e.g., brake the motor) as described above with respect to the loss of control functions. For example, the sensor 4005 (e.g., an accelerometer) may be configured to detect an acceleration of the grinder 1300 or 2000 (i.e., a housing of the grinder 1300 or 2000) about the output shaft 1325 or 225. An electronic processor included in the grinder 1300 or 2000 (e.g., the controller 3000, the loss of control module 4000, a separate control module, or a combination thereof) is configured to receive a signal from the sensor 4005 representing the acceleration as detected, compare the acceleration to a threshold, and, in response to the acceleration, exceeding the threshold, reducing power to the motor. This kickback detection function can be performed in combination with one or both of the above loss of control functions or separate from such functions. Also, in some embodiments, the kickback detection function can use an accumulator as described above, wherein, when detected acceleration exceeds a threshold, a value is added to the accumulator and, when the accumulator exceeds a predetermined setpoint, a kickback condition is detected, and the motor is controlled accordingly. Also, in some embodiments, different values can be added to the accumulator based on the amount of detected acceleration as also described above with respect to the loss of control functions. Furthermore, in some embodiments, detected accelerations below a minimum threshold may cause a value to be subtracted from the accumulator. In addition, in some embodiments, different setpoints may be used to provide different control responses for different accumulator values. For example, when the accumulator value reaches a first setpoint, motor speed may be reduced, and, when the accumulator value reaches a second setpoint, the motor may be stopped or braked.

Clause 1. A power tool comprising: a housing defining a body axis having a hand grip for a user, the hand grip positioned between a first end and a second end of the housing; a battery pack interface configured to receive a rechargeable battery pack; a motor positioned within the housing and powered via the rechargeable battery pack; an output shaft driven by the motor to rotate about a rotational axis, the output shaft configured to be coupled to an accessory for co-rotation thereof; a sensor configured to detect, during operation of the power tool, linear acceleration of the power tool in a working plane parallel to a working surface; an electronic processor configured to: receive a signal from the sensor representing the linear acceleration as detected, compare the linear acceleration to a first threshold, the first threshold associated with a first increment count, in response to the linear acceleration not exceeding the first threshold, compare the linear acceleration to a second threshold, the second threshold associated with a second increment count different than the first increment count and adding the second increment count to an accumulator in response to the linear acceleration exceeding the second threshold, and in response to the accumulator exceeding a setpoint, detecting a loss of control event and reducing power to the motor.

Clause 2. The power tool of clause 1, wherein the power tool is configured for one handed use, and wherein the hand grip has a length of 100 mm or less.

Clause 3. The power tool of clause 1, wherein the power output of the power tool is between 600 Watts and 800 Watts.

Clause 4. The power tool of clause 1, wherein the power output of the power tool is at least 600 Watts.

Clause 5. The power tool of clause 1, wherein the power output of the power tool is at least 500 Watts.

Clause 6. The power tool of clause 1, wherein the rechargeable battery pack is approximately 12 Volts.

Clause 7. The power tool of clause 1, wherein the rechargeable battery pack is configured to provide at least 60 Amperes of current.

Clause 8. The power tool of clause 1, wherein the rechargeable battery pack is configured to provide a current of between 60 Amperes and 90 Amperes.

Clause 9. The power tool of clause 1, wherein the sensor includes an accelerometer.

Clause 10. The power tool of clause 1, wherein the electronic processor is configured to reduce power to the motor in response to detecting the loss of control event by braking the motor.

Clause 11. A method of controlling a power tool, the method comprising: detecting, by a sensor included in the power tool, angular rotation of the power tool about a reference point; generating, by the sensor, a signal including data representing the angular rotation of the power tool; receiving, by an electronic processor, the signal including data representing the angular rotation of the power tool; incrementing, by the electronic processor, an accumulator value based upon the signal; comparing, by the electronic processor, the accumulator value to a predetermined threshold; and in response to the accumulator value exceeding the predetermined threshold, detecting, by the electronic processor, a loss of control event and reducing power to a motor of the power tool.

Clause 12. The method of clause 11, wherein the sensor includes a gyroscope.

Clause 13. The method of clause 11, wherein the reference point is defined by a battery foot of the power tool.

Clause 14. The method of clause 11, wherein the signal is a first signal and the method further comprising: receiving, by the electronic processor, a second signal including data representing linear acceleration of the power tool in a working plane parallel to a working surface.

Clause 15. The method of clause 14, wherein incrementing, by the electronic processor, the accumulator value includes incrementing the accumulator value based on the first signal and the second signal.

Clause 16. The method of clause 14, wherein the accumulator value is a first accumulator value and the predetermined threshold is a first predetermined threshold and the method further comprising: incrementing, by the electronic processor, a second accumulator value based upon the second signal; comparing, by the electronic processor, the second accumulator value to a second predetermined threshold, and in response to the second accumulator value exceeding the second predetermined threshold, reducing power to the motor.

Clause 17. The method of clause 11, wherein the power output of the power tool is between 600 Watts and 800 Watts.

Clause 18. The method of clause 11, wherein the power tool is a grinder configured for one handed use, and wherein the grinder includes a handle including a length of 100 mm or less.

Clause 19. A one-handed grinder tool comprising: a housing defining a body axis having a one-handed grip, the one-handed grip positioned between a first end and a second end of the housing; a battery pack interface configured to receive a rechargeable battery pack; a motor positioned within the housing and powered via the rechargeable battery pack; an output shaft driven by the motor to rotate about a rotational axis, the output shaft configured to be coupled to a grinding accessory for co-rotation thereof; a sensor configured to detect an acceleration of the one-handed grinder tool about the output shaft; and an electronic processor configured to: receive a signal from the sensor representing the acceleration as detected, compare the acceleration to a threshold, and in response to the acceleration exceeding the threshold, reducing power to the motor.

Clause 20. The one-handed grinder tool of clause 19, wherein the one-handed grip has a length of 100 mm or less.

Clause 21. The one-handed grinder tool of clause 19, wherein the power output of the one-handed grinder tool of is between 600 Watts and 800 Watts.

Clause 22. The one-handed grinder tool of clause 19, wherein the rechargeable battery pack is approximately 12 Volts.

Clause 23. The one-handed grinder tool of clause 19, wherein the rechargeable battery pack is approximately 18 Volts.

Clause 24. The one-handed grinder tool of clause 19, wherein the rechargeable battery pack is configured to provide a current of between 60 Amperes and 90 Amperes.

Clause 25. The one-handed grinder tool of clause 19, wherein the grinding accessory has a diameter of 100 mm or less.

Clause 26. The one-handed grinder tool of clause 19, further comprising a guard at least partially covering the grinding accessory, the guard forming the widest radial dimension of the one-handed grinder tool with respect to the body axis.

Uses and Combinations of Loss of Control Methods and Features

The controllers 300 and 3000 described herein may determine that a loss of control event has occurred based on any of the above disclosed features. Additionally, the controllers 300 and 3000 may use a combination of the above-described features. For example, the controller 300 or 3000 may include drop detection, linear acceleration detection, and motor speed and current detection. However, in other instances, a power tool may implement only a single loss of control function.

Also, the loss of control methods and features described herein may be used with or without accumulator values. For example, detected values may be compared to a threshold and, in response to the value exceeding or satisfying the threshold, a value may be added to an accumulator, wherein the accumulator is compared to a predetermined value (e.g., a setpoint) to determine whether a loss of control event has been detected. Alternatively, detected values may be compared to a threshold and, in response to the value exceeding or satisfying the threshold, a loss of control event can be detected. In either type of implementation, different thresholds may be used and, when accumulators are used, different thresholds may be associated with different values that are added to the accumulator to provide for more precise control (e.g., large amounts of motion may cause larger values to the added to the accumulator as compared to smaller amounts of detected motion). As also noted herein, in some embodiments, a single detected value may be compared to multiple thresholds and, in some embodiments, each threshold may be associated with a different accumulator value.

Also, in some embodiments, while the above-described features describe stopping a motor of the power tool when a loss of control event has occurred, various actions may be taken in response to detecting that a loss of control event has occurred. For example, the controller 300 or 3000 may slow a motor, disconnect a grinding disc from the motor, turn on one or more indicators, etc. Also, in some embodiments, when a loss of control event is detected, one or more responsive and/or mitigating actions may be taken (e.g., the motor may be stopped) and a particular action may be required to initiate a reset that allows the power tool to return to normal operation. For example, when the loss of control functionality stops of the motor, a complete trigger recycle may be needed before the motor can be restarted.

Clause 1. A power tool comprising: a housing; a battery pack interface configured to receive a rechargeable battery pack; a motor positioned within the housing and powered via the rechargeable battery pack; an output shaft driven by the motor, the output shaft configured to be coupled to an accessory for operation thereof; a sensing circuit configured to detect, during operation of the power tool, rotational velocity of the power tool around an axis; and a controller configured to: (a) receive a signal from the sensing circuit representing the rotational velocity of the power tool around the axis, (b) compare the rotational velocity to a first threshold associated with a first direction of rotation around the axis; (c) compare the rotational velocity to a second threshold associated with a second direction of rotation around the axis, the second direction opposite the first direction and the second threshold being different than the first threshold; and (d) trip loss of control functionality based on whether the rotational velocity exceeds the first threshold and whether the rotational velocity exceeds the second threshold.

Clause 2. The power tool of clause 1, wherein the first direction is a critical direction of rotation around the axis and the second direction is a non-critical direction of rotation around the axis, and wherein the second threshold is greater than the first threshold.

Clause 3. The power tool of clause 2, wherein first direction is at least one of a −Z direction of rotation, a −X direction of rotation, and a +Y direction of rotation.

Clause 4. The power tool of clause 1, wherein the controller is further configured to perform (a)-(d) for each respective axis of a plurality of axes.

Clause 5. The power tool of clause 1, wherein the second direction is a non-critical direction of rotation and wherein the second threshold has a value equal to a value of the first threshold multiplied by a multiplier.

Clause 6. The power tool of clause 1, wherein the first threshold and the second threshold have opposite signs.

Clause 7. The power tool of clause 1, wherein the controller is configured to trip the loss of control condition based on whether the rotational velocity exceeds the first threshold and whether the rotational velocity exceeds the second threshold by: adding a first value to an accumulator in response to the rotational velocity exceeding the first threshold; adding a second value to the accumulator in response to the rotational velocity exceeding the second threshold; comparing the accumulator to a predetermined value; and tripping the loss of control condition in response to the accumulator exceeding the predetermined value.

Clause 8. The power tool of clause 7, wherein the first value and the second value are different values.

Clause 9. The power tool of clause 1, wherein the controller is configured to trip the loss of control functionality by slowing or stopping the motor.

Clause 10. A power tool comprising: a housing; a battery pack interface configured to receive a rechargeable battery pack; a motor positioned within the housing and powered via the rechargeable battery pack; an output shaft driven by the motor, the output shaft configured to be coupled to an accessory for operation thereof; a sensing circuit configured to detect, during operation of the power tool, an operating characteristic of the motor, the operating characteristic being at least one of motor acceleration and battery current of the battery pack; and a controller configured to: receive a signal from the sensing circuit representing the operating characteristic of the motor, compare the operating characteristic of the motor to a first predetermined threshold, and in response to the operating characteristic exceeding the predetermined threshold, perform a loss of control check on the power tool, wherein performing the loss of control check includes: comparing a detected motion of the power tool to a second predetermined threshold, and tripping loss of control functionality based on whether the detected motion of the power tool exceeds the second predetermined threshold.

Clause 11. The power tool of clause 10, wherein the controller is configured to compare the operating characteristic of the motor to the first predetermined threshold by comparing the motor acceleration to an acceleration threshold and comparing the battery current to a battery threshold and wherein the controller is configured to perform the loss of control check on the power tool in response to the motor acceleration exceeding the acceleration threshold and the battery current exceeding the battery threshold.

Clause 12. The power tool of clause 10, wherein the controller is further configured to, in response to the operating characteristic of the motor not exceeding the predetermined threshold, skip performing the loss of control check.

Clause 13. The power tool of clause 10, wherein the controller is configured to compare the detected motion of the power tool to a second predetermined threshold by comparing a rotational velocity of the power tool around an axis to the second predetermined threshold.

Clause 14. The power tool of clause 10, wherein the controller is configured to compare the detected motion of the power tool to a second predetermined threshold by comparing a linear acceleration of the power tool along an axis to the second predetermined threshold.

Clause 15. The power tool of clause 10, wherein the controller is configured to trip the loss of control functionality by slowing or stopping the motor.

Clause 16. A power tool comprising: a housing; a battery pack interface configured to receive a rechargeable battery pack; a motor positioned within the housing and powered via the rechargeable battery pack; an output shaft driven by the motor, the output shaft configured to be coupled to an accessory for operation thereof; a sensing circuit configured to detect, during operation of the power tool, a first rotational velocity of the power tool around a first axis, a second rotational velocity of the power tool around a second axis, and a third rotational velocity of the power tool around a third axis; and a controller configured to: receive one or more signals from the sensing circuit representing the first rotational velocity, the second rotational velocity, and the third rotational velocity; apply a first sensitivity value to the first rotational velocity, a second sensitivity value to the second rotational velocity, and a third sensitivity value to the third rotational velocity to obtain a first adjusted rotational velocity, a second adjusted rotational velocity, and a third adjusted rotational velocity; sum a square of the first adjusted rotational velocity, a square of the second adjusted rotational velocity, and a square of the third adjusted rotational velocity; compare the sum to a predetermined threshold, and trip loss of control functionality based on whether the sum exceeds the predetermined threshold.

Clause 17. The power tool of clause 16, wherein the controller is configured to apply the first sensitivity to the first rotational velocity using bit shifting of the first rotational velocity.

Clause 18. The power tool of clause 16, wherein at least two of the first sensitivity value, the second sensitivity value, and the third sensitivity value differ.

Clause 19. The power tool of clause 16, wherein controller is configured trip the loss of control functionality based on whether the sum exceeds the predetermined threshold by: adding a value to an accumulator in response to the sum exceeding the predetermined threshold, comparing the accumulator to a predetermined value, and tripping the loss of control functionality in response to the accumulator exceeding the predetermined value.

Clause 20. The power tool of clause 19, wherein the controller is configured to compare the sum to the predetermined threshold by comparing the sum to each of a plurality of thresholds, wherein each respective threshold of the plurality of thresholds is associated with a different value to add to the accumulator in response to the sum exceeding the respective threshold.

Clause 21. A power tool comprising: a housing; a battery pack interface configured to receive a rechargeable battery pack; a motor positioned within the housing and powered via the rechargeable battery pack; an output shaft driven by the motor, the output shaft configured to be coupled to an accessory for operation thereof; a sensing circuit configured to detect, during operation of the power tool, linear acceleration of the power tool along an axis; and a controller configured to: (a) receive a signal from the sensing circuit representing the linear acceleration of the power tool along the axis, (b) compare the linear acceleration to a predetermined threshold, and (c) in response to the linear acceleration satisfying the predetermined threshold, stopping the motor.

Clause 22. The power tool of clause 21, wherein the controller is configured to perform (a)-(c) for each respective axis of a plurality of axes.

Clause 23. The power tool of clause 22, wherein the controller is configured to compare the linear acceleration in each respective axis of the plurality of axes to a different predetermined threshold.

Clause 24. The power tool of clause 22, wherein the controller is configured to compare the linear acceleration to the predetermined threshold by: subtracting a calibration offset from an absolute value of the linear acceleration to obtain a calibrated linear acceleration, and compare the calibrated linear acceleration to the predetermined threshold.

Clause 25. The power tool of clause 24, wherein the controller is further configured to: accumulate an angle of travel of the power tool; and in response to the angle of travel of the power tool exceeding a second predetermined threshold, recalibrate the calibration offset.

Clause 26. The power tool of clause 25, wherein the controller is configured to accumulate an angle of travel of the power tool based on rotational velocity of the power tool.

Clause 27. The power tool of clause 25, wherein the controller is configured to recalibrate the calibration offset by setting the calibration offset to a current detected linear acceleration of the power tool in response to a magnitude of a current acceleration vector of the power tool being within a predetermined range of a gravity value.

Clause 28. The power tool of clause 21, wherein the controller is configured to compare the linear acceleration to a predetermined threshold by comparing the linear acceleration to a drop acceleration range and wherein the controller is configured to stop the motor in response to the linear acceleration being within the drop acceleration range.

Clause 29. The power tool of clause 21, wherein the linear acceleration along the axis is a first linear acceleration along a first axis and wherein the controller is configured to compare the linear acceleration to a predetermined threshold by: computing a sum of the first linear acceleration in the first axis, a second linear acceleration in a second axis, and a third linear acceleration in a third axis; and comparing the sum to a predetermined gravity value, wherein the controller is configured to stop the motor in response to the sum satisfying the predetermined gravity value.

Clause 30. The power tool of clause 21, wherein the housing includes a one-handed grip, and wherein the power tool is configured for one handed use.

It should be understood that the thresholds described herein may be established based on expected or normal values to detect various unwanted conditions (e.g., loss of control, kickback condition, etc.). The thresholds may vary based on the type of power tool (e.g., type of motor, size of handle, weight of tool, etc.), the battery being used with the power tool, the workpiece being operated on with the power tool, a user (e.g., height, weight, experience level), or a combination thereof.

Thus, embodiments described herein provide, among other things, systems and methods for a grinder with loss of control mitigating aspects. Various features and advantages are set forth in the following claims.

What is claimed is:

1. A power tool comprising:
   a housing;
   a battery pack interface configured to receive a rechargeable battery pack;
   a motor positioned within the housing and powered via the rechargeable battery pack;
   an output shaft driven by the motor, the output shaft configured to be coupled to an accessory for operation thereof;
   a sensing circuit configured to detect, during operation of the power tool, an operating characteristic of the motor, the operating characteristic being at least one of motor acceleration and battery current of the battery pack; and
   a controller configured to:
      receive a signal from the sensing circuit representing the operating characteristic of the motor,
      compare the operating characteristic of the motor to a first predetermined threshold, and
      in response to the operating characteristic exceeding the first predetermined threshold, perform a loss of control check on the power tool, wherein performing the loss of control check includes:
      comparing a detected motion of the power tool to a second predetermined threshold, and
      tripping loss of control functionality based on whether the detected motion of the power tool exceeds the second predetermined threshold.

2. The power tool of claim 1, wherein the controller is configured to compare the operating characteristic of the motor to the first predetermined threshold by comparing the motor acceleration to an acceleration threshold and comparing the battery current to a battery threshold and wherein the controller is configured to perform the loss of control check on the power tool in response to the motor acceleration exceeding the acceleration threshold and the battery current exceeding the battery threshold.

3. The power tool of claim 1, wherein the controller is configured to compare the detected motion of the power tool to a second predetermined threshold by comparing a rotational velocity of the power tool around an axis to the second predetermined threshold.

4. The power tool of claim 1, wherein the controller is configured to compare the detected motion of the power tool to a second predetermined threshold by comparing a linear acceleration of the power tool along an axis to the second predetermined threshold.

5. The power tool of claim 1, wherein the housing includes a one-handed grip, and wherein the power tool is configured for one handed use.

6. The power tool of claim 1, wherein the controller is configured to compare the detected motion of the power tool to the second predetermined threshold by:

receiving one or more signals from the sensing circuit representing a first rotational velocity, a second rotational velocity, and a third rotational velocity;

applying a first sensitivity value to the first rotational velocity, a second sensitivity value to the second rotational velocity, and a third sensitivity value to the third rotational velocity to obtain a first adjusted rotational velocity, a second adjusted rotational velocity, and a third adjusted rotational velocity;

summing a square of the first adjusted rotational velocity, a square of the second adjusted rotational velocity, and a square of the third adjusted rotational velocity; and comparing the sum to the second predetermined threshold, and wherein the controller is configured to trip loss of control functionality based on whether the detected motion of the power tool exceeds the second predetermined threshold by tripping the loss of control functionality based on whether the sum exceeds the second predetermined threshold.

7. A power tool comprising:

a housing;

a battery pack interface configured to receive a rechargeable battery pack;

a motor positioned within the housing and powered via the rechargeable battery pack;

an output shaft driven by the motor, the output shaft configured to be coupled to an accessory for operation thereof;

a sensing circuit configured to detect, during operation of the power tool, a first rotational velocity of the power tool around a first axis, a second rotational velocity of the power tool around a second axis, and a third rotational velocity of the power tool around a third axis; and a controller configured to perform a loss of control check on the power tool by:

receiving one or more signals from the sensing circuit representing the first rotational velocity, the second rotational velocity, and the third rotational velocity;

applying a first sensitivity value to the first rotational velocity, a second sensitivity value to the second rotational velocity, and a third sensitivity value to the third rotational velocity to obtain a first adjusted rotational velocity, a second adjusted rotational velocity, and a third adjusted rotational velocity;

summing a square of the first adjusted rotational velocity, a square of the second adjusted rotational velocity, and a square of the third adjusted rotational velocity;

comparing the sum to a predetermined threshold, and tripping loss of control functionality based on whether the sum exceeds the predetermined threshold.

8. The power tool of claim 7, wherein the housing includes a one-handed grip, and wherein the power tool is configured for one handed use.

9. The power tool of claim 7, wherein controller is configured trip the loss of control functionality based on whether the sum exceeds the predetermined threshold by:

adding a value to an accumulator in response to the sum exceeding the predetermined threshold, comparing the accumulator to a predetermined value, and tripping the loss of control functionality in response to the accumulator exceeding the predetermined value.

10. The power tool of claim 9, wherein the controller is configured to compare the sum to the predetermined threshold by comparing the sum to each of a plurality of thresholds, wherein each respective threshold of the plurality of thresholds is associated with a different value to add to the accumulator in response to the sum exceeding the respective threshold.

11. The power tool of claim 7, wherein the controller is further configured to:

receive a signal from the sensing circuit representing the operating characteristic of the motor, compare the operating characteristic of the motor to a second predetermined threshold, and in response to the operating characteristic exceeding the second predetermined threshold, perform the loss of control check on the power tool.

12. A power tool comprising:

a housing;

a battery pack interface configured to receive a rechargeable battery pack;

a motor positioned within the housing and powered via the rechargeable battery pack;

an output shaft driven by the motor, the output shaft configured to be coupled to an accessory for operation thereof;

a sensing circuit configured to detect, during operation of the power tool, linear acceleration of the power tool along an axis; and a controller configured to:

(a) receive a signal from the sensing circuit representing the linear acceleration of the power tool along the axis, (b) compare the linear acceleration to a predetermined threshold, and (c) in response to the linear acceleration satisfying the predetermined threshold, stopping the motor;

wherein the linear acceleration along the axis is a first linear acceleration along a first axis and wherein the controller is configured to compare the linear acceleration to a predetermined threshold by:

computing a sum of the first linear acceleration in the first axis, a second linear acceleration in a second axis, and a third linear acceleration in a third axis; and comparing the sum to a predetermined gravity value, wherein the controller is configured to stop the motor in response to the sum satisfying the predetermined gravity value.

13. The power tool of claim 12, wherein the controller is configured to perform (a)-(c) for each respective axis of a plurality of axes, and wherein the controller is configured to compare the linear acceleration in each respective axis of the plurality of axes to a different predetermined threshold.

14. The power tool of claim 13, wherein the controller is configured to compare the linear acceleration to the predetermined threshold by:

subtracting a calibration offset from an absolute value of the linear acceleration to obtain a calibrated linear acceleration, and compare the calibrated linear acceleration to the predetermined threshold.

15. The power tool of claim 14, wherein the controller is further configured to:

accumulate an angle of travel of the power tool; and in response to the angle of travel of the power tool exceeding a second predetermined threshold, recalibrate the calibration offset.

16. The power tool of claim 15, wherein the controller is configured to accumulate an angle of travel of the power tool based on rotational velocity of the power tool.

17. The power tool of claim 15, wherein the controller is configured to recalibrate the calibration offset by setting the calibration offset to a current detected linear acceleration of the power tool in response to a magnitude of a current acceleration vector of the power tool being within a predetermined range of a gravity value.

18. The power tool of claim 12, wherein the controller is configured to compare the linear acceleration to a predetermined threshold by comparing the linear acceleration to a drop acceleration range and wherein the controller is configured to stop the motor in response to the linear acceleration being within the drop acceleration range.

19. The power tool of claim 12, wherein the housing includes a one-handed grip, and wherein the power tool is configured for one handed use.

\* \* \* \* \*